(12) United States Patent
Lum

(10) Patent No.: US 8,159,485 B2
(45) Date of Patent: Apr. 17, 2012

(54) CUSTOMER POLE DISPLAY AND INTERFACE

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 1112 days.

(21) Appl. No.: 11/192,996

(22) Filed: Jul. 29, 2005

(65) Prior Publication Data

US 2006/0022970 A1    Feb. 2, 2006

Related U.S. Application Data

(60) Provisional application No. 60/592,783, filed on Jul. 30, 2004.

(51) Int. Cl.
*G09G 5/00* (2006.01)
(52) U.S. Cl. ........ 345/211; 345/212; 345/213; 345/214; 709/203
(58) Field of Classification Search .......... 345/211–214; 709/203
See application file for complete search history.

(56) References Cited

U.S. PATENT DOCUMENTS

| | | | | |
|---|---|---|---|---|
| 5,974,486 A * | 10/1999 | Siddappa | ........................ | 710/53 |
| 6,125,455 A | 9/2000 | Yeo | | |
| 6,212,641 B1 * | 4/2001 | Frank et al. | .................... | 713/323 |
| D462,983 S | 9/2002 | Lum | | |
| 6,963,986 B1 * | 11/2005 | Briggs et al. | ................... | 713/320 |
| 7,028,133 B1 * | 4/2006 | Jackson | ........................ | 710/313 |
| 7,340,627 B1 * | 3/2008 | Harvey | ......................... | 713/330 |
| 7,458,825 B2 * | 12/2008 | Atsmon et al. | .................. | 439/78 |
| 2002/0109645 A1 * | 8/2002 | Hendrick | ........................ | 345/1.1 |
| 2003/0135418 A1 | 7/2003 | Shekhar et al. | | |
| 2004/0263522 A1 * | 12/2004 | Goodfellow | .................. | 345/530 |
| 2005/0012853 A1 * | 1/2005 | Wang | ............................ | 348/376 |
| 2005/0117952 A1 * | 6/2005 | Damery et al. | ............... | 400/109 |
| 2006/0015661 A1 * | 1/2006 | Dietz et al. | ........................ | 710/62 |
| 2007/0005685 A1 * | 1/2007 | Chau et al. | ........................ | 709/203 |

* cited by examiner

*Primary Examiner* — Richard Hjerpe
*Assistant Examiner* — Leonid Shapiro
(74) *Attorney, Agent, or Firm* — Hoffman & Baron, LLP

(57) ABSTRACT

A method of using a customer pole display, point-of-sale pole display, point-of sale display, or pole display includes connecting a Universal Serial Bus, inputting a power signal from the Universal Serial Bus, translating the power signal to a display power signal, and connecting the display power signal to the display. A Universal Serial Bus-compatible interface adapted to provide power to a point-of-sale display includes a connector adapted to be coupled to a Universal Serial Bus and a converter operatively coupled to the connector and adapted to translate a power signal input from the Universal Serial Bus to a display power signal. A point-of-sale display assembly includes a display, a connector adapted to be coupled to a Universal Serial Bus, and a converter operatively coupled to the connector and adapted to translate a power signal input from the Universal Serial Bus to a display power signal.

15 Claims, 13 Drawing Sheets

CUSTOMER POLE DISPLAY AND INTERFACE

CROSS REFERENCE TO RELATED APPLICATION

This application claims the benefit of U.S. Provisional Application No. 60/592,783 filed on Jul. 30, 2004, the disclosure of which is incorporated herein by reference.

COPYRIGHT NOTICE

A portion of the disclosure of this document contains material that is subject to copyright protection. The copyright owner has no objection to the facsimile reproduction of the patent disclosure, as it appears in the U.S. Patent and Trademark Office patent files or records, but otherwise reserves all copyright rights whatsoever.

BACKGROUND OF THE INVENTION

1. Field of the Invention

The present invention generally relates to customer pole displays which are referred to as point-of sale pole displays or pole displays, commonly used in Point-of-Sale (POS) systems, and more particularly to providing power to point-of sale pole displays without requiring connection to an alternating current power source.

2. Background of the Related Art

A customer pole display is a common peripheral device used with most point-of-sale (POS) terminals. A major function of the pole display is to show the customer retail transaction information, such as an identification or description of the item being purchased, the quantity being purchased, the corresponding unit price, the total price, and the like. In many states, the inclusion of a pole display in a POS terminal is required by law.

The current most popular method to interface a pole display to a computer, in cases where the POS application software is installed, is through an RS232 port. FIG. 1 shows a conventional pole display assembly 10 with an RS232 interface connector 12. However, since the RS232 interface does not provide sufficient power to energize a pole display, a power adaptor 14 is required to step down the 120VAC or 240VAC power obtained from a standard electrical outlet to about 7VAC, which is then rectified and regulated in the pole display assembly 10 to 5VDC. The power adaptor is shown as being attached to a pigtail cable connected to the RS232 interface connector 12.

FIG. 2 shows a block diagram of the conventional pole display assembly 10 with RS232 interface shown pictorially in FIG. 1. Display data and commands from the POS computer terminal enter into the pole display assembly 10 through the RS232 interface connector and an RS232 interface circuit 16. A microcontroller 18 processes the data and commands from the RS232 interface circuit 16 and transmits this information to a vacuum fluorescent display (VFD) 20 to illuminate appropriately addressed display pixels.

Most commercially available VFDs require two special voltages; approximately 4.7VAC for filament power and approximately 40VDC for anode power. These two voltages are ordinarily generated by a DC-DC converter 22. As indicated above, the primary source of power for the pole display assembly 10 is conventionally derived from the AC power line connected to the power adapter 14. The power adapter 14 steps down the line voltage to approximately 7VAC and an AC rectifier and voltage regulator 22 converts the 7VAC voltage to a stable 5VDC voltage, which is used to power the RS232 interface 16, microcontroller 18, and DC-DC converter 24. However, the array of peripheral connectors and electronics is costly, cumbersome, difficult to assemble, and subject to failure.

Thus, there is a need in the field of POS computer terminals for an alternative that would alleviate the need for a pigtailed external power adapter that reliably converts 120VAC power to the voltages required by the pole display assembly associated with a POS computer terminal and the corresponding peripheral components and electronics.

SUMMARY OF THE INVENTION

These and other goals, purposes, and objectives are met by the present invention, which provides a method of using a customer display, also referred to as point-of-sale pole display or pole display, including connecting a Universal Serial Bus to a point-of-sale display, inputting a power signal from the Universal Serial Bus, translating the power signal input from the Universal Serial Bus to a display power signal, and connecting the display power signal to the point-of-sale display. The display power signal is adapted to provide power to the point-of-sale display A Universal Serial Bus-compatible interface adapted to provide power to a point-of-sale display is also provided, which includes a connector adapted to be coupled to a Universal Serial Bus, and a converter operatively coupled to the connector and adapted to translate a power signal input from the Universal Serial Bus to a display power signal. A point-of-sale display assembly is provided, which includes a display, a connector adapted to be coupled to a Universal Serial Bus, and a converter operatively coupled to the connector and adapted to translate a power signal input from the Universal Serial Bus to a display power signal.

These and other objectives, features, and advantages of this invention will become apparent from the following detailed description of illustrative embodiments thereof, which is to be read in connection with the accompanying drawings.

Program code listings that direct the operation of a microcontroller in the point-of-sale pole display assembly shown in FIG. 5 are incorporated in this document as an appendix.

DETAILED DESCRIPTION OF THE PREFERRED EMBODIMENTS

Figure 3:
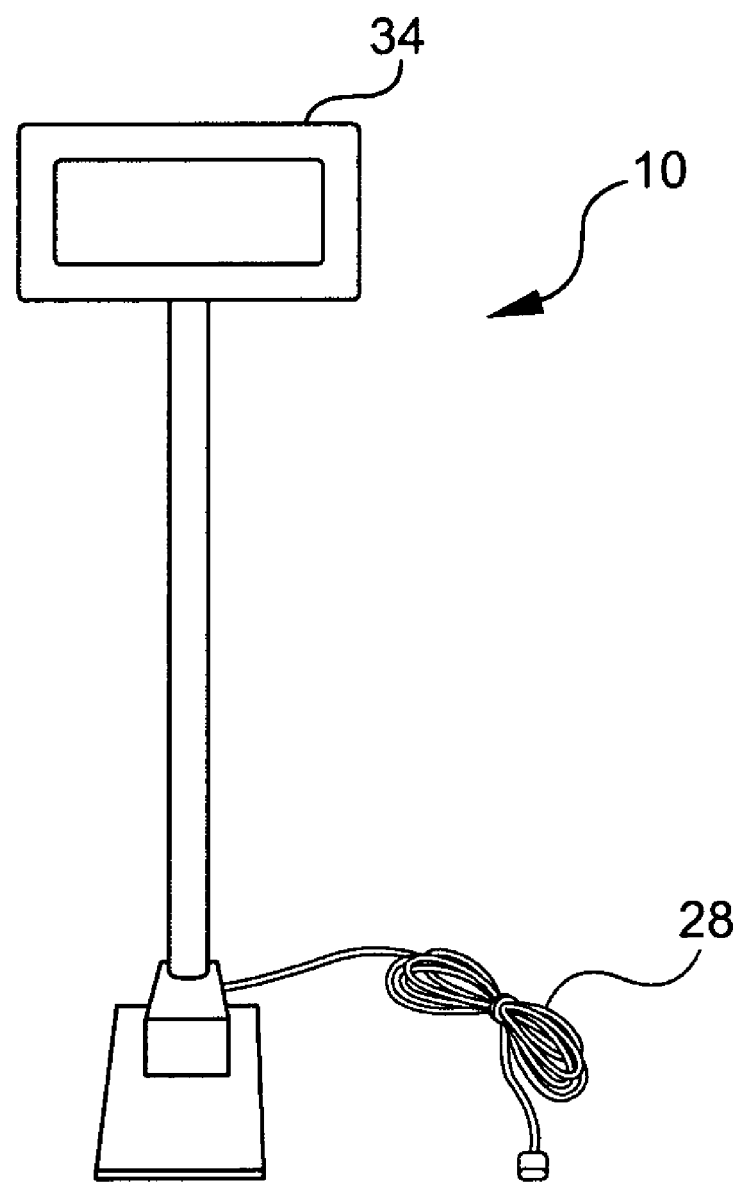
FIG. 3 is a pictorial view of an embodiment of the point-of-sale pole display and interface formed in accordance with the present invention.

In accordance with the present invention, a pole display assembly 26 is provided, the external appearance of which is disclosed in U.S. Pat. No. D462,983, issued Sep. 17, 2002, which is incorporated herein by reference, is shown in FIG. 3 and preferably incorporates a port powered Universal Serial Bus (USB) interface in accordance with the present invention. Although the most common physical configuration of a customer pole display includes a display unit mounted on a pole, this invention is equally applicable to other physical configurations without the use of a pole. Other common display configurations include table, wall, and ceiling mounted displays, such as display Model Nos. LT9000 and TD3000, which are commercially available from Logic Controls, Inc., New Hyde Park, N.Y. 10040.

Figure 1:
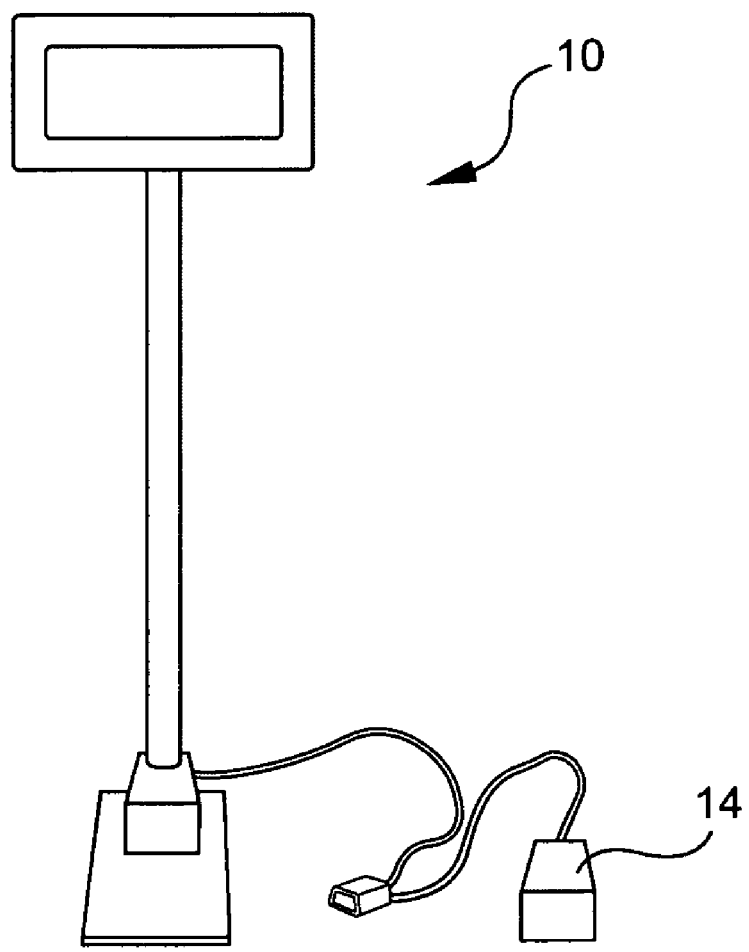
FIG. 1 is a pictorial view of a conventional point-of-sale pole display and interface.

Reference to USB specifications herein is intended to refer to all existing, as well as future, Universal Serial Bus (USB) specifications including without limitation the current USB 2.0 specification. The interface between the pole display assembly 26 and a point-of-sale (POS) computer terminal is preferably provided through a USB interface cable and connector 28 without the need for a separate power adapter, which is required in the conventional system shown in FIG. 1.

Figure 2:
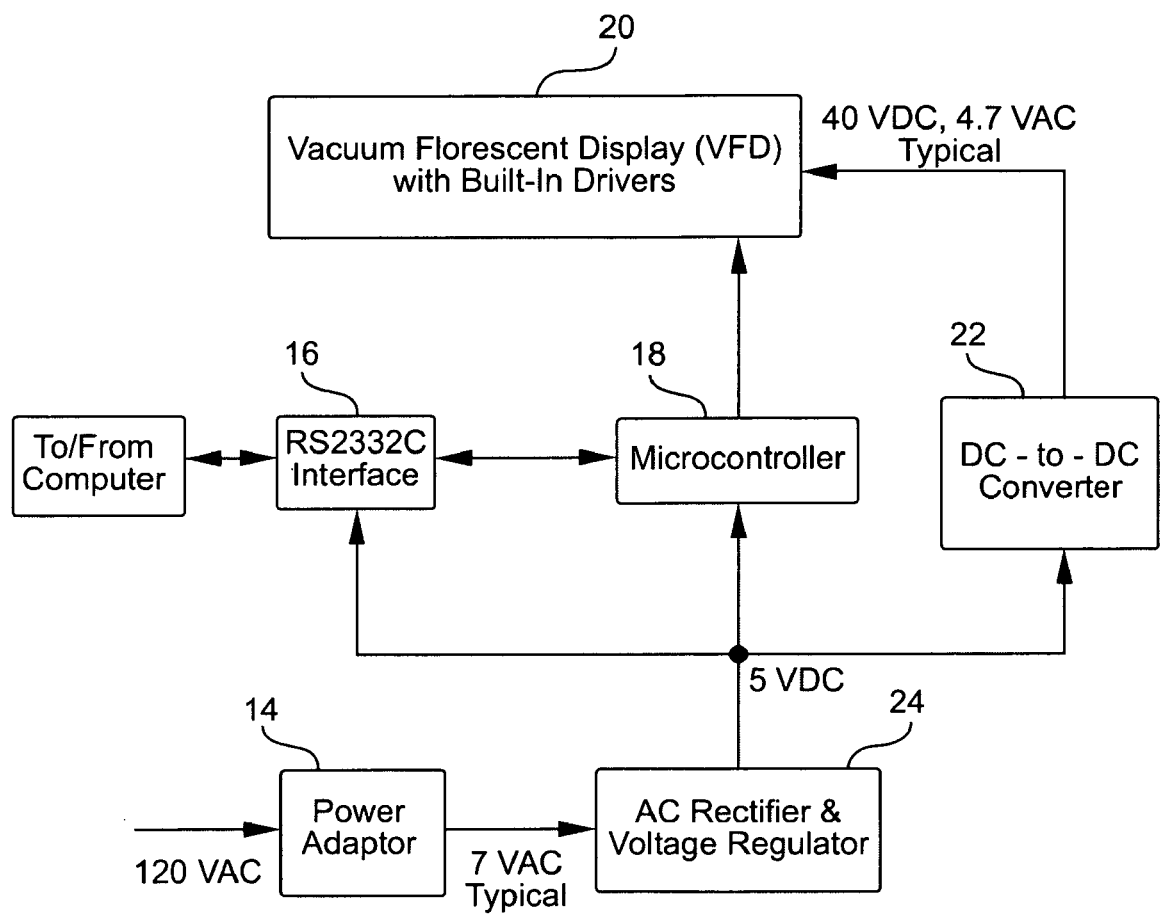
FIG. 2 is a block diagram of the conventional point-of-sale pole display and interface shown in FIG. 1.
Figure 4:
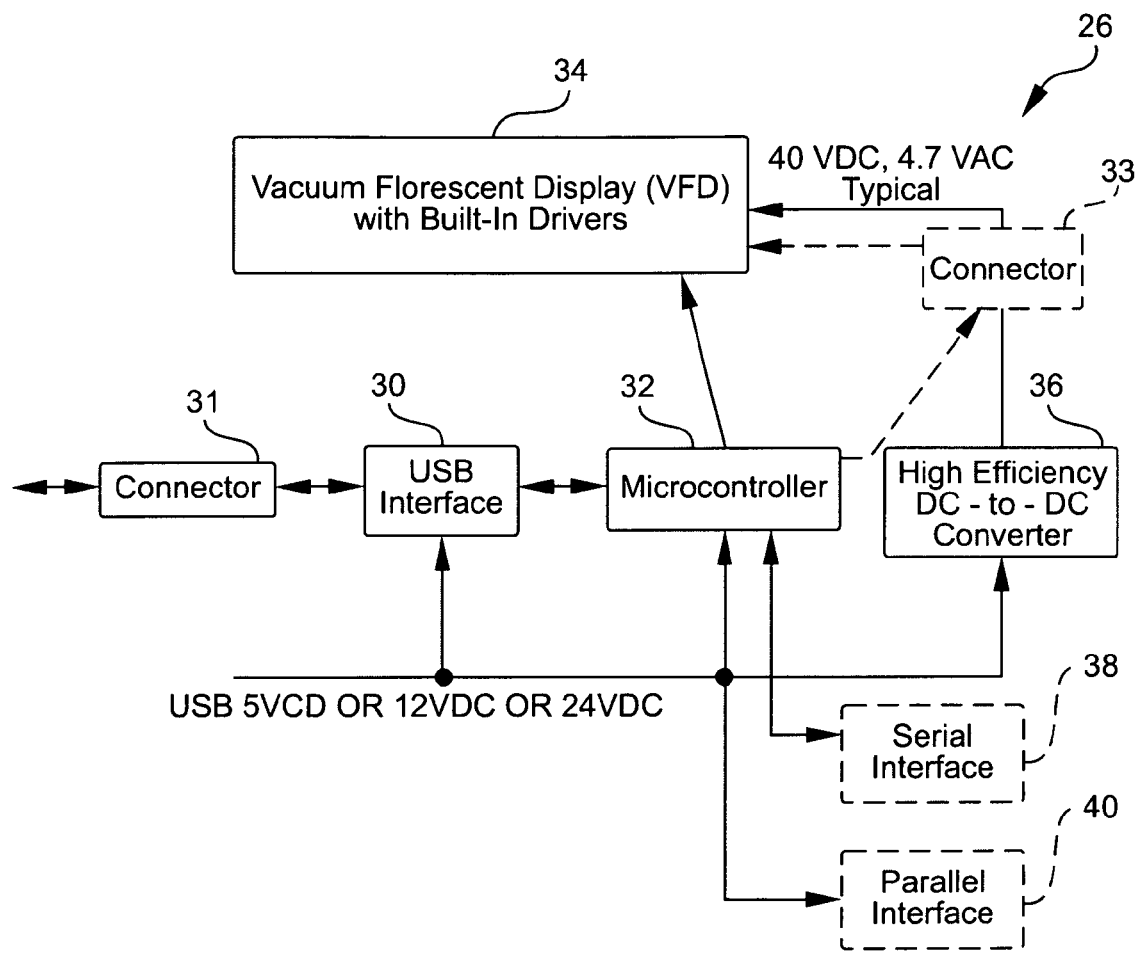
FIG. 4 is a block diagram of the point-of-sale pole display and interface shown in FIG. 3.
Figure 5A:
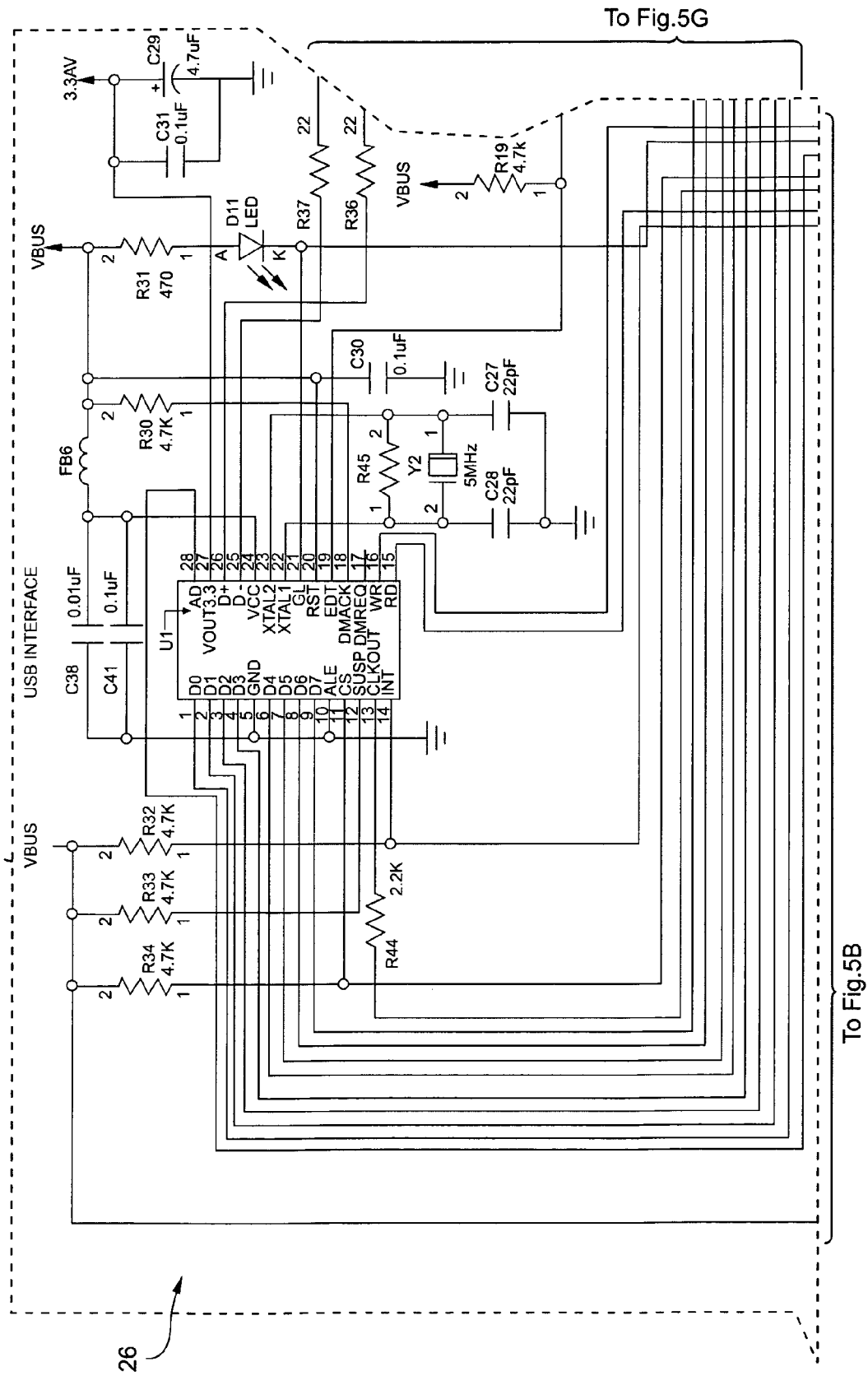
FIG. 5 is a schematic diagram of an embodiment of the point-of-sale pole display shown in FIG. 4.
Figure 5B:
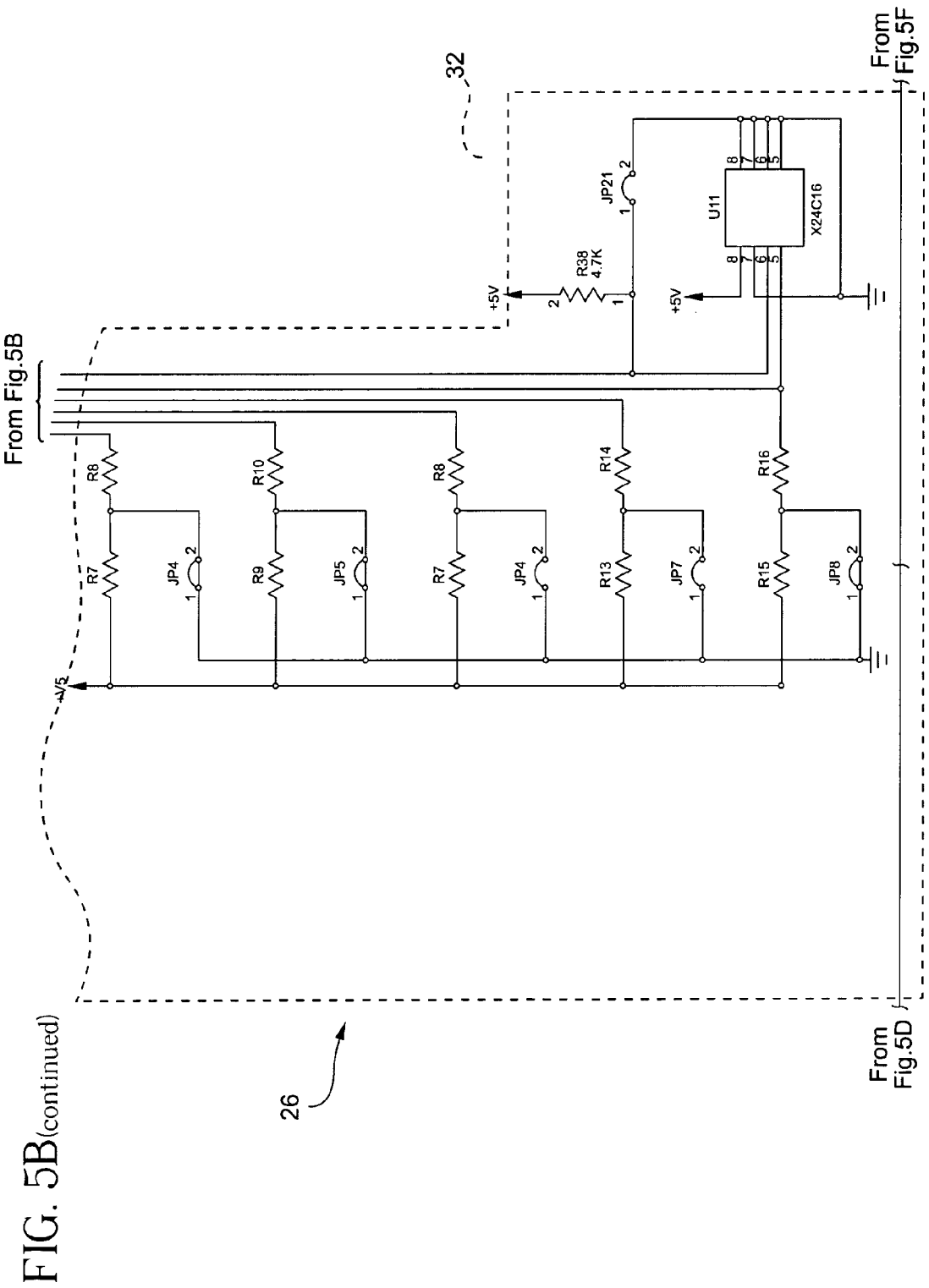
Figure 5C:
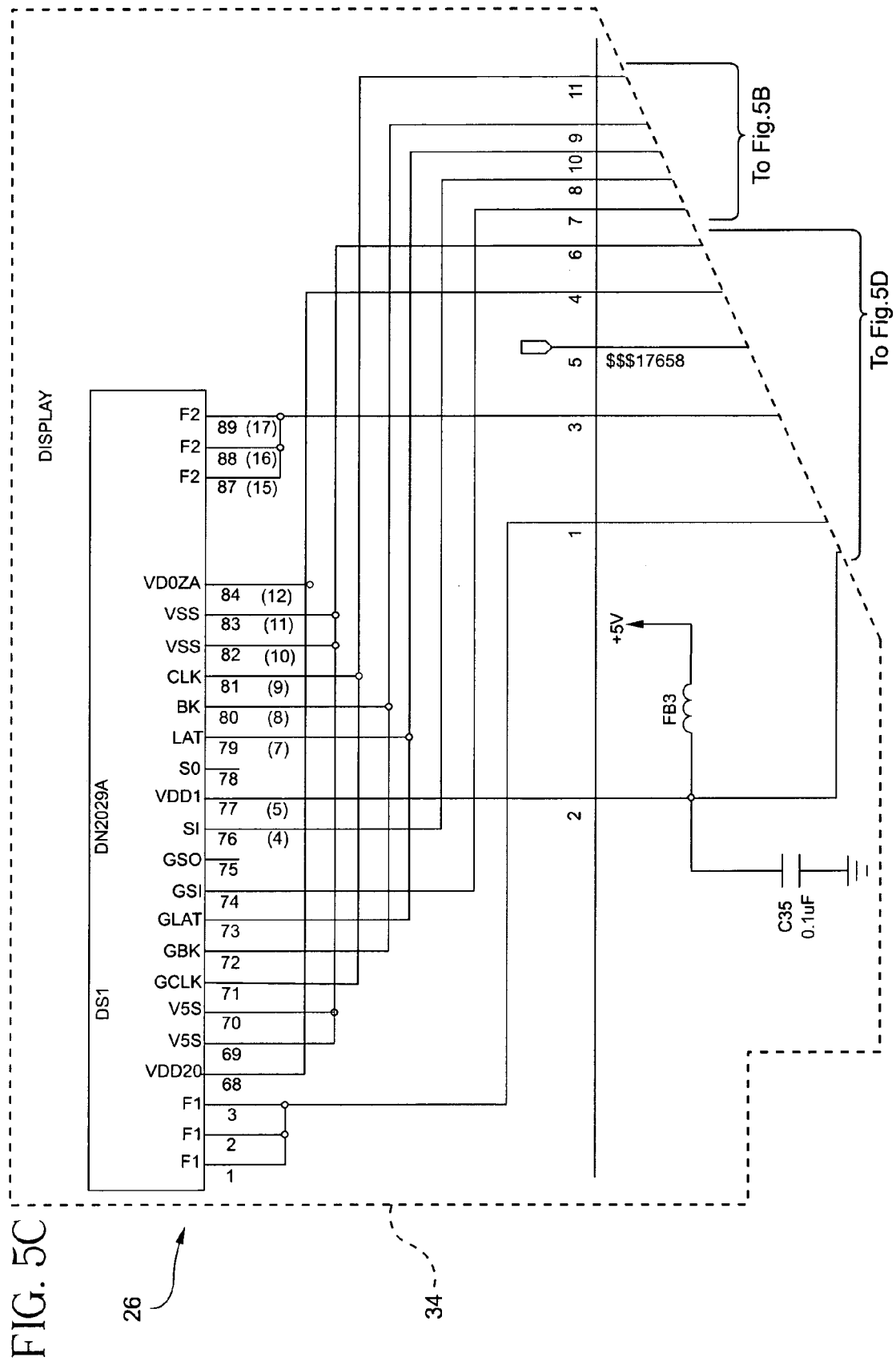
Figure 5D:
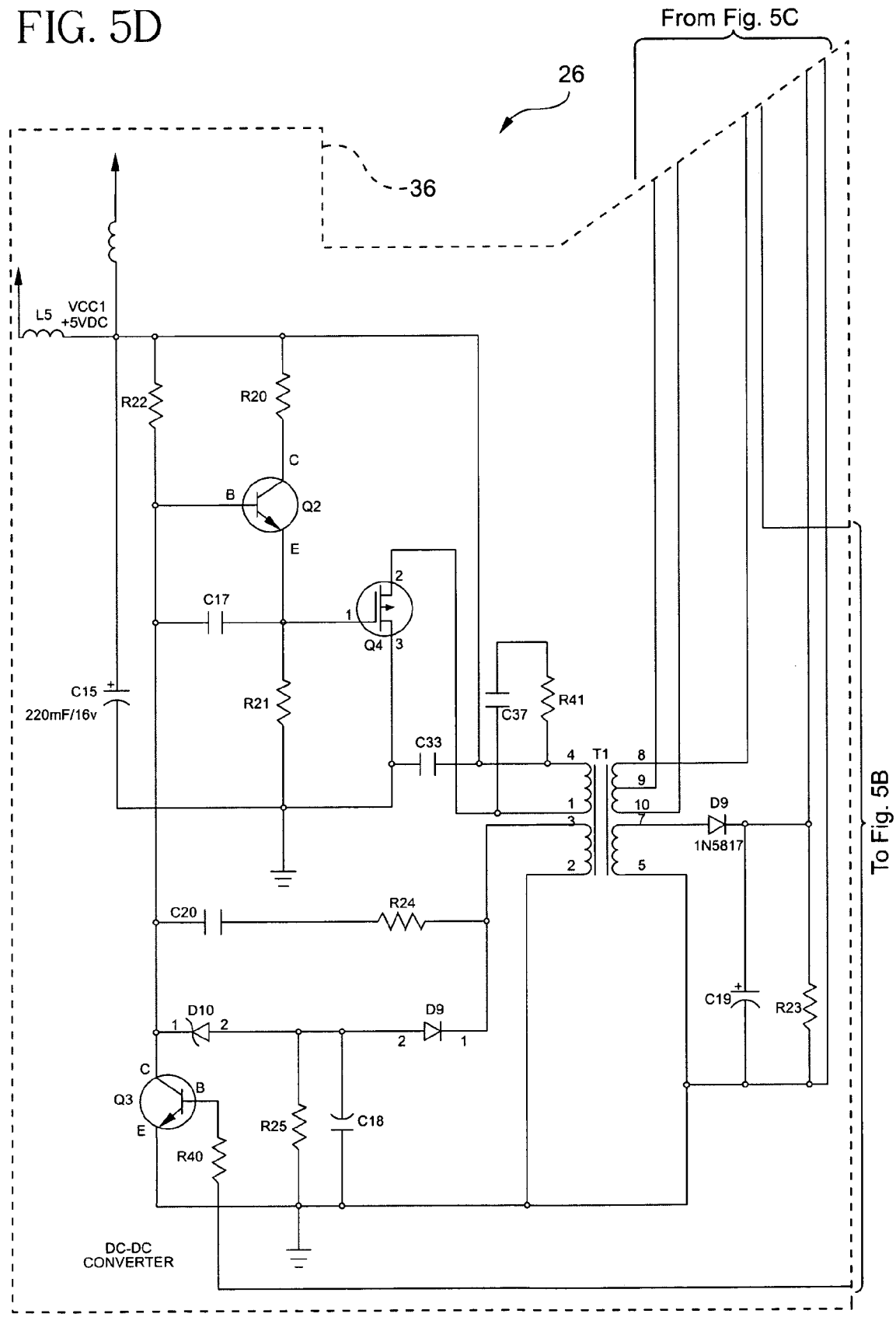
Figure 5E:
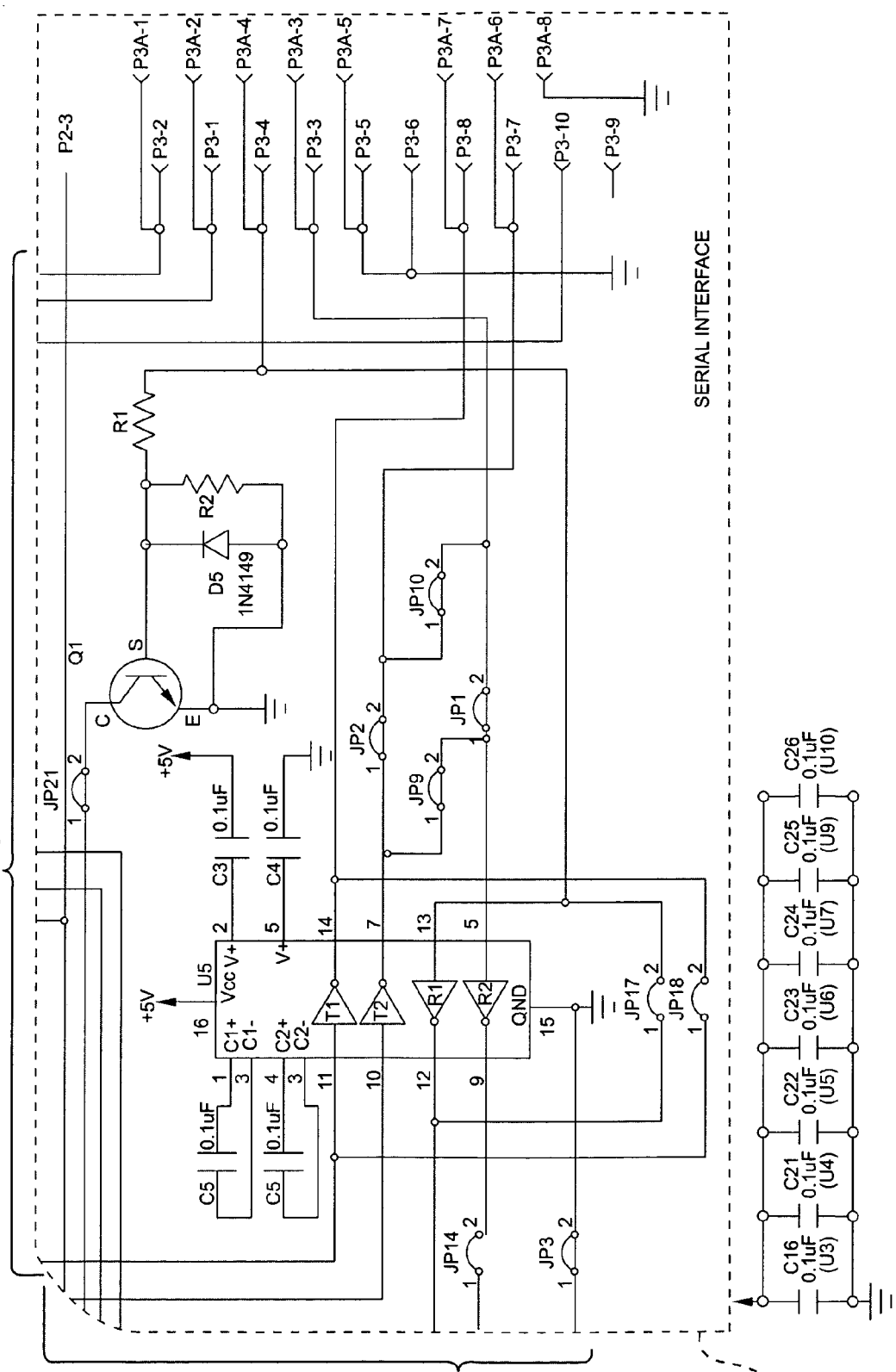
Figure 5F:
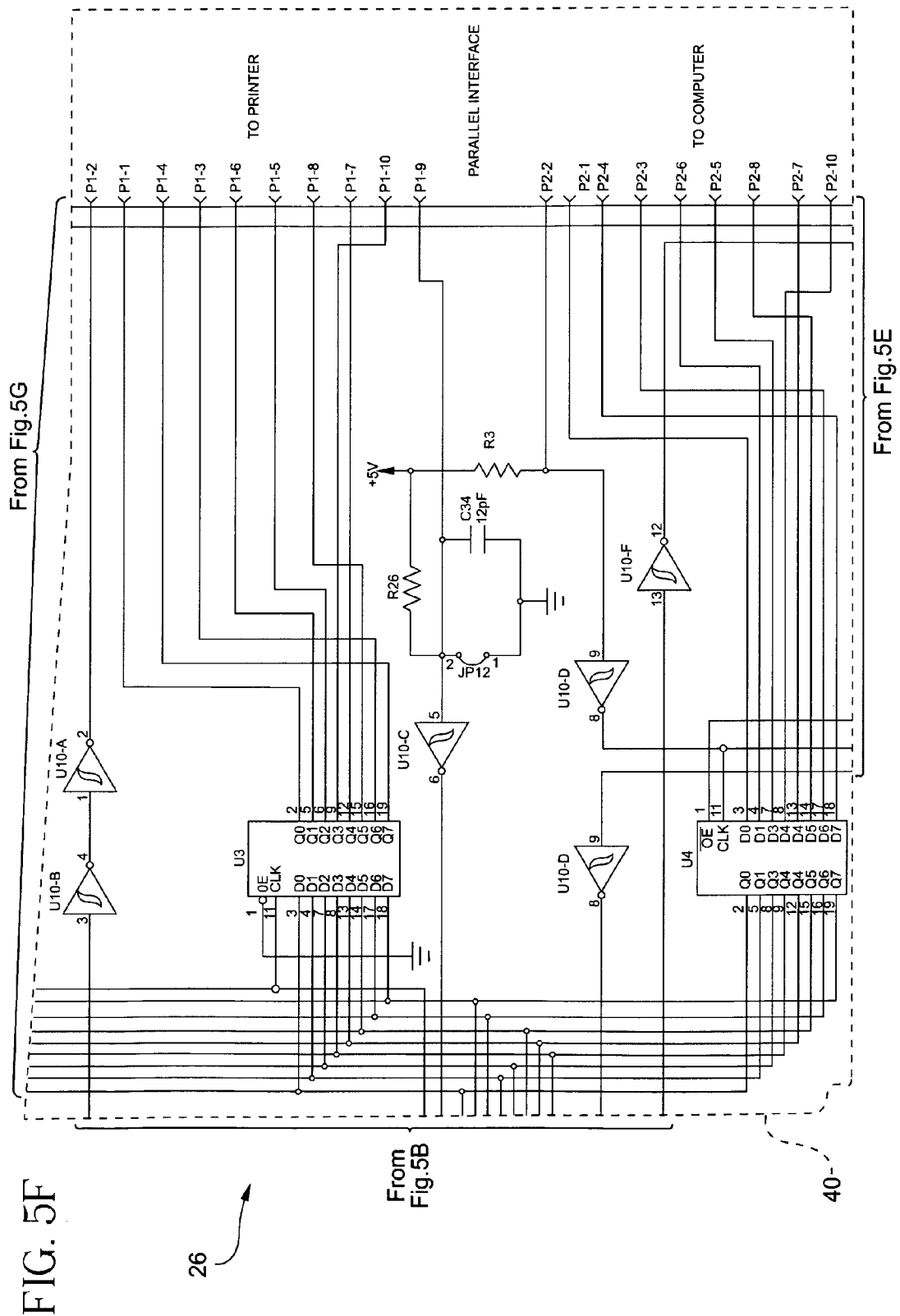
Figure 5F:
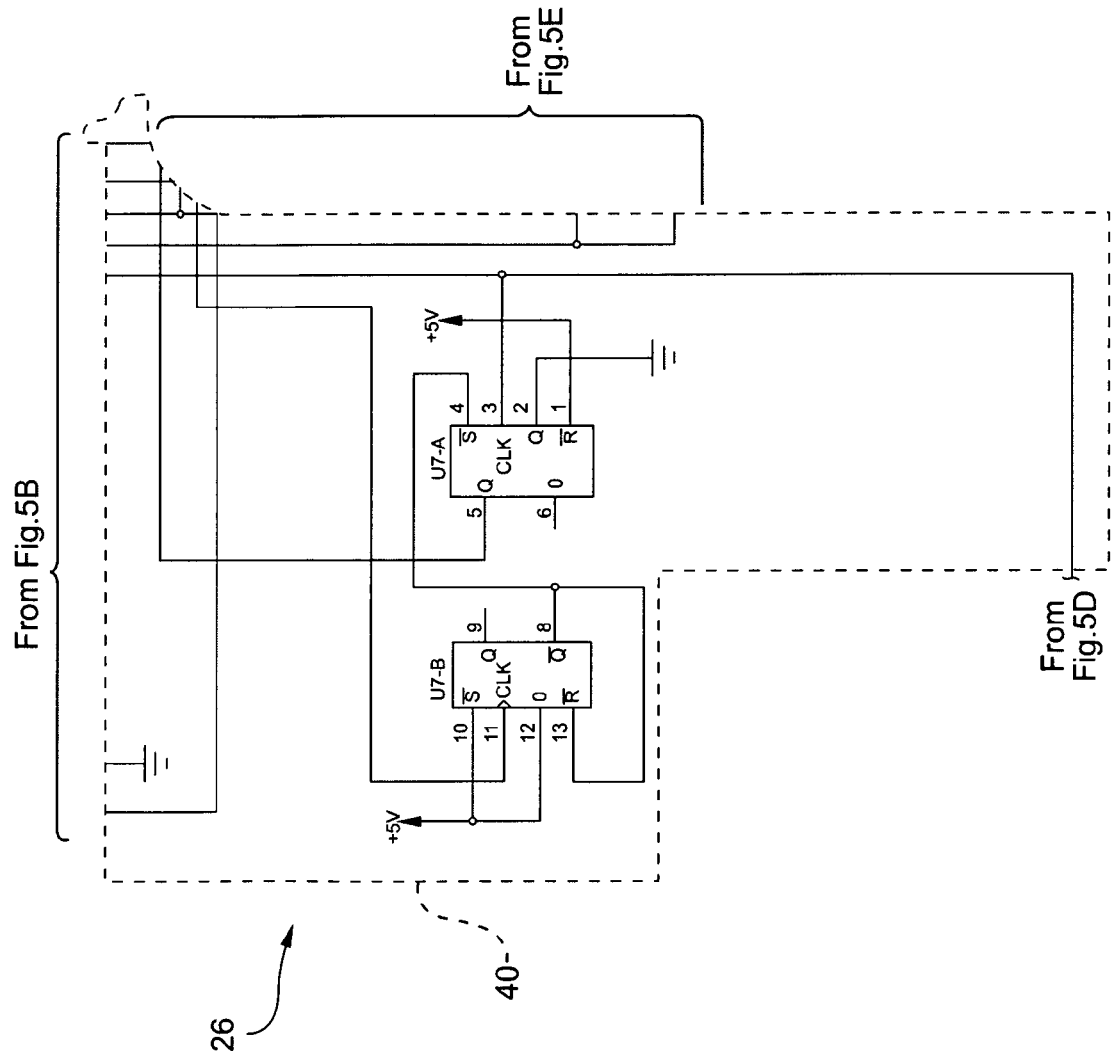
Figure 5G:
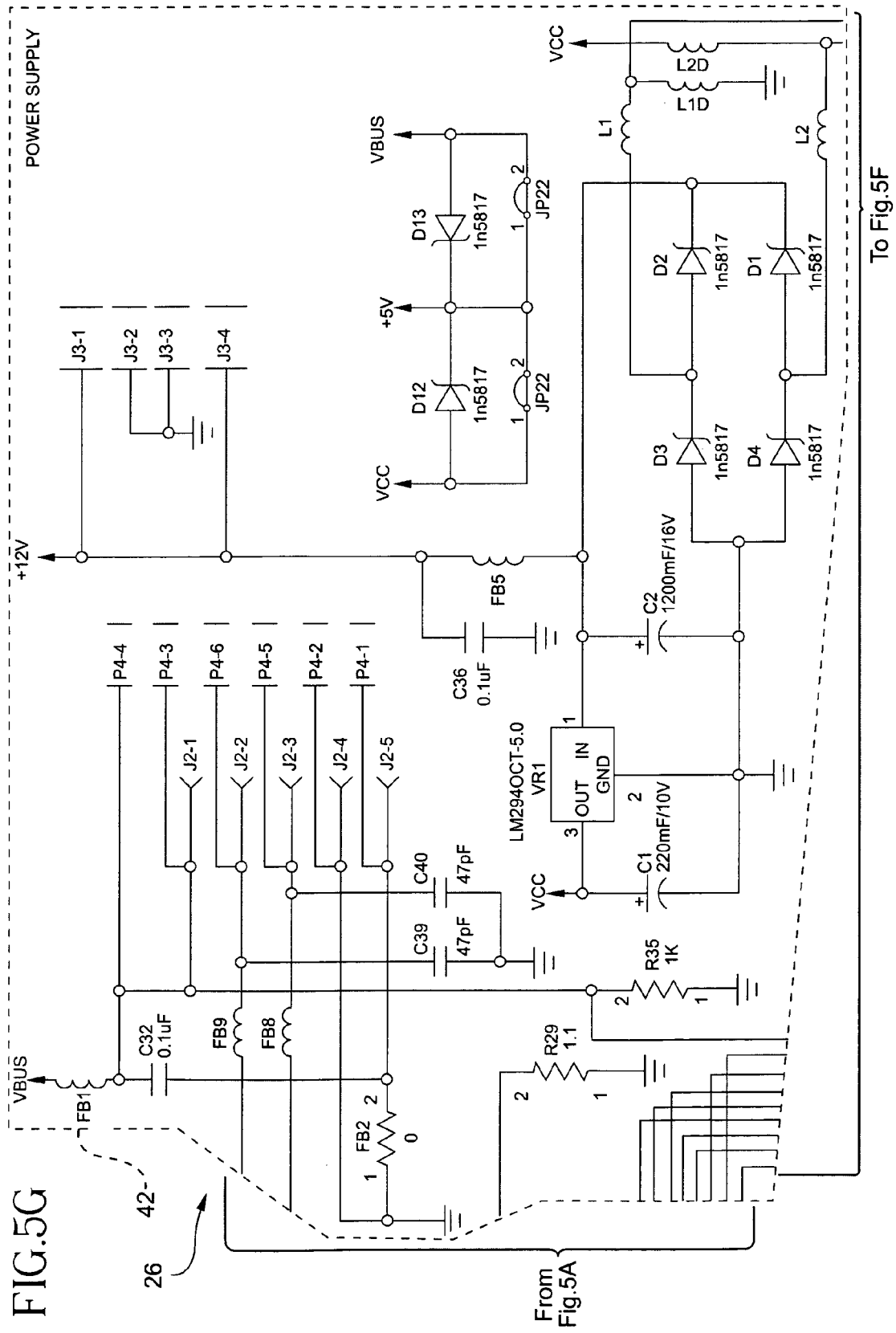

A block diagram of an embodiment of the customer pole display assembly with port powered USB interface is shown in FIG. 4 and is substantially less complex than that shown in the conventional approach of FIG. 2. The assembly of FIG. 4 essentially eliminates the power adaptor and AC rectifier and voltage regulator functional blocks shown in FIG. 2.

A USB interface circuit 30 is preferably coupled to a USB bus through an optional connector 31, which is connected between the POS computer terminal (not shown) and pole display assembly 26, and establishes USB compatibility for data passing between these components. The microcomputer circuit 32 preferably provides the appropriate data and commands to a display 34 in response to information received from the POS computer terminal. The USB bus preferably provides the 5VDC power required by the USB interface 30, microcontroller circuit 32, and a DC-DC converter circuit 34.

The DC-DC converter 36 preferably provides 4.7VAC and 40VDC required by the display 34 from the 5VDC or 12VDC obtained from the USB bus. A serial interface circuit 38 and a parallel interface circuit 40 are also optionally provided in the pole display assembly 26 to enable interfacing with a parallel port, such as a printer, and/or a serial port, such as an RS232 port. The display 34 is optionally connected to the microcontroller circuit 32 and converter circuit 36 through a connector 33 and the USB interface is optionally connected to the USB bus through a connector 31 to enable a portion of the assembly 26 to be provided as an in-line USB interface adapter.

However, in accordance with USB specifications, power available from the USB bus is limited to a maximum of 500 ma. Accordingly, the overall pole display assembly preferably operates efficiently such that the total current requirement is less than 500 ma. Thus, the DC-DC converter 34 is preferably implemented as a high-efficiency circuit, and the microcontroller 32 is preferably selected as a low-power consumption device. Reference to USB specifications herein is intended to refer to all existing as well as future Universal Serial Bus (USB) specifications including without limitation the current USB 2.0 specification.

FIG. 5 shows a schematic diagram of a preferred embodiment of the customer pole display assembly 26 shown in FIG. 4, which is provided for purposes of example only and is not in any way intended to limit the scope of the present invention. The pole display assembly 26 preferably includes the USB interface circuit 30, microcontroller circuit 32, display circuit 34, DC-DC controverter circuit 36, and power supply circuit 42. The optional serial interface circuit 38 and parallel interface circuit 40 may also be included in the assembly 26 as discussed above.

The microcontroller U6 is preferably implemented by an 8052 microcontroller U6, which is commercially available from Intel Corporation (www.intel.com) with various additional peripheral devices, such as an X24C16 serial eeprom, which is commercially available from Xicor Corporation (www.xicor.com), a watchdog reset circuit including resistors R4, R5, R6, and R17, capacitors C10, C11, C12, C13, C14, diodes D6, D7, and and-gates U9B, U9C, and various jumpers JP4-8, which are preferably used to configure the display.

The microcontroller circuit 32 provides information to the display 34, which is preferably implemented using a DN2029A vacuum fluorescent display with built-in drivers, which is commercially available from Noritake Corporation (www.noritake-itron.com). The USB interface circuit 30 is preferably implemented using a PD1USBD12 USB interface device U1, which is commercially available from Philips Semiconductor Corporation (www.semiconductors.philips.com) with various additional discrete components, such as the resistor, capacitor, and inductors shown in FIG. 5.

The optional serial interface circuit 38 is preferably implemented using an RS232 transceiver U5 in conjunction with additional discrete capacitors, resistors, diodes, transistors, and jumpers. The serial interface circuit 38 is controlled by the microcontroller circuit 32 and provides bidirectional transfer capability between the microcontroller circuit 32 and an external serial device in accordance with RS232 protocol. The optional parallel interface circuit 40 is also preferably controlled by the microcontroller circuit 32 and implemented using tri-state buffers U3, U4, invertors U10A-E, and flip-flops U7A, B. The parallel interface circuit 40 provides the capability of transferring parallel data to and from an external parallel device, such as a printer or computer.

As shown in FIG. 5, the DC-DC converter 36 includes transistors Q3, Q4 and transistor T1, which are its primary components. Transistors Q3 and Q4 preferably convert the 5VDC, 12VDC, or 24VDC input voltage obtained from the USB interface to an AC voltage signal, which is then provided to the transformer T1. Transformer T1 is preferably adapted to simultaneously provide 4.7VAC and 40VDC, through operation of the network including diode D8, capacitor C19 and resistor R23, to the display 34.

Pin 4 of transformer T1 is preferably connected to pin 1 of transformer T1 through resistor R41 and capacitor C37. Pin 4 of transformer T1 is also connected to the 5VDC and 12VDC power sources, which may be obtained from the USB bus, through inductors L5 and FB4, respectively. Pin 1 of transformer T1 is preferably connected to the drain terminal (pin 2) of transistor Q4, and the source terminal of transistor Q4 is connected to pin 4 of transformer T1 through capacitor C33. The source terminal of transistor Q4 is also connected to ground and the 12VDC supply through capacitor C15 and inductor FB4.

Pin 3 of transformer T1 is preferably connected to the 12VDC supply through resistor R24, capacitor C20, resistor R22, and inductor FB4. Pin 4 of transformer T1 is preferably connected to the 12VDC supply through capacitor C33, resistor R21, capacitor C17, resistor R22, and inductor FB4. The collector of transistor Q2 is connected to the 12VDC supply through resistor R20 and inductor FB4. The base of transistor Q2 is preferably connected to the 12VDC supply through resistor R22 and inductor FB4. The collector of transistor of Q2 is preferably connected to the gate terminal of transistor Q4 and the 12VDC supply through capacitor C17, resistor R22, and inductor FB4.

Pin 3 of transformer T1 is connected through diodes D9, D10, resistor R22, and inductor FB4 to the 12VDC supply. Resistor R25 and capacitor C18 are preferably connected from a point between the back-to-back connected anodes of diodes D9 and D10 to ground. Pins 2 and 5 of transformer T1 are connected to ground. Pin 7 of transformer T1 is preferably connected to the anode of diode D8 and the cathode of diode of D8 is connected to ground through the parallel combination of capacitor C19 and resistor R23.

Pin 9 of the microcontroller U6 is preferably coupled to the base of transistor Q3. This enables the DC-DC converter to be selectively disabled by the microcontroller U6 to conserve power and remain within the maximum power guidelines provided for in the USB specification.

One of the benefits of the USB is bus-powered devices, that is, devices which obtain power from the bus and require no external plug packs or additional cables. However, there are limitations to this feature.

A USB device specifies its power consumption, which is expressed in 2 mA units, in a configuration descriptor. A device cannot increase its power consumption, greater than what it specifies during enumeration, even if it looses external power. Enumeration is the process of deterring what device has just been connected to the bus and what parameters it requires, such as power consumption. There are three classes of USB functions; low-power bus powered functions, high-power bus powered functions, and self-powered functions.

Low-power bus powered functions draw all power from the USB bus and cannot draw any more than one unit load. The USB specification defines a unit load as 100 mA. Low-power bus powered functions must also be designed to work down to a voltage of 4.40V and up to a maximum voltage of 5.25V measured at an upstream plug of the device. High-power bus powered functions draw all power from the bus and cannot draw more than one unit load (100 mA max) until configuration or enumeration has been completed, after which it can then drain 5 unit loads (500 mA max) provided the device requests this power in its descriptor. Thus, since the typical bus powered device cannot draw more than 100 mA before enumeration, the microcontroller U6 preferably disables the DC-DC converter 36 by turning transistor Q3 on. Following enumeration, the microcontroller U6 turns transistor Q3 off, which enables the pole display assembly to draw up to a maximum of 500 mA.

Additional information concerning the design of DC-DC converter circuits is provided in G. Ledwich, *DC-DC Converter Basics*, pp. 1-12 (1998), and Application Note 2031, *DC-DC Converter Tutorial*, Dallas Semiconductor Corporation, pp. 1-8 (2000), which are incorporated herein by reference.

The pole display assembly 26 is preferably adapted to operate with different configurations for flexibility during production. Thus, the assembly 26 is capable of operating with the USB interface circuit 30, the serial interface circuit 38, and/or the parallel interface circuit 40. Since the serial and parallel interface circuits 38, 40 require an external power source, the power supply 42 incorporates a bridge rectifier circuit, which includes diodes D1-D4, and a voltage regulator VR1 to provide the power requirements for these configurations.

If the USB interface is to be used exclusively, the bridge and voltage regulator VR1 are not required and need not be installed. In this case, the DC input power is preferably obtained directly from the USB port connector as discussed above. Since the USB specification requires that power consumption cannot be more than 500 mA, the power supplied to the display 34 is preferably controlled by the microcontroller U6. This is preferably achieved by controlling the operation of the DC-DC converter 36 using a control signal from the microcontroller U6 that is connected to the base of transistor Q3 as discussed above.

It is to be understood that the pole display assembly 26 shown in FIG. 6 could as well be implemented using different devices, such as without limitation one or more microprocessors, application specific integrated circuits (ASIC), programmable logic devices, programmable logic arrays, discrete components, integrated circuits, and the like while remaining within the scope of the present invention.

An assembly code listing of the programs that direct operation of the microcontroller in the display assembly 26 in accordance with the present invention are incorporated in this document and provided as appendix. This material is subject to copyright ownership by Logic Controls, Inc. The file <Ascfont.dat> includes all character font data; the file <D12cmd.h> includes all USB IC command codes; the file <DN2029A.ASM> includes glass scanning subroutines; the file <INIT_INT.ASM> includes all initialization subroutines and interrupt subroutines; the file <IO.ASM> includes all input/output subroutines; the file <LD9UsbTb.dat> includes USB Descriptors and Strings table; the file <Ldcmd.h> includes constant definitions; and the file <LDO.asm> includes main loop subroutine and others.

Thus, the advantages provided by the customer pole display with port-powered USB interface formed in accordance with the present invention include the following:

1. eliminating the need for an external power adaptor;
2. eliminating the need for an AC-DC power converter internal to the pole display;
3. reducing system power consumption;
4. reducing the number of internal components, which drastically improves cooling and reliability, and simplifies manufacture and assembly;
5. reducing product cost; and
6. replacing the outdated RS232 interface by the newer, widely accepted USB interface, which has many inherent advantages, such as plug-and-play capability.

Although illustrative embodiments of the present invention have been described herein with reference to the accompanying drawing, it is to be understood that the invention is not limited to those precise embodiments, and that various other changes and modifications may be affected therein by one skilled in the art without departing from the scope or spirit of the invention.

APPENDIX
Copyright © 2005 Logic Controls, Inc.
All rights reserved

```
;================================================================================
; Fiel Name: <Ascfont.dat>
; 5X7 ASCII code font for glass scanning.
; USED IN: 80C52
; AUTHORS:     Peter Li
; Begining date: 02-06-2002
;================================================================================
;================================================================
Ascii_Tbl:
        DB      000H,000H,000H,000H,000H ; 20H
        DB      084H,010H,002H,000H,001H ; 21H
        DB      04AH,029H,000H,000H,000H ; 22H
        DB      04AH,07DH,0F5H,095H,002H ; 23H
        DB      0C4H,017H,047H,01FH,001H ; 24H
        DB      063H,022H,022H,032H,006H ; 25H
        DB      026H,015H,051H,093H,005H ; 26H
        DB      084H,010H,000H,000H,000H ; 27H
        DB      088H,008H,021H,008H,002H ; 28H
        DB      082H,020H,084H,088H,000H ; 29H
        DB      080H,054H,057H,009H,000H ; 2aH
        DB      080H,090H,04FH,008H,000H ; 2bH
        DB      000H,000H,060H,088H,000H ; 2cH
        DB      000H,080H,00FH,000H,000H ; 2dH
        DB      000H,000H,000H,08CH,001H ; 2eH
        DB      000H,022H,022H,002H,000H ; 2fH
        DB      02EH,0C6H,018H,0A3H,003H ; 30H
        DB      0C4H,010H,042H,008H,001H ; 31H
        DB      02EH,042H,044H,0C4H,007H ; 32H
        DB      01FH,011H,004H,0A3H,003H ; 33H
        DB      088H,0A9H,0F4H,011H,002H ; 34H
        DB      03FH,03CH,008H,0A3H,003H ; 35H
        DB      04CH,084H,017H,0A3H,003H ; 36H
        DB      01FH,022H,022H,084H,000H ; 37H
        DB      02EH,046H,017H,0A3H,003H ; 38H
        DB      02EH,046H,00FH,091H,001H ; 39H
        DB      0C0H,018H,060H,00CH,000H ; 3aH
        DB      0C0H,018H,060H,088H,000H ; 3bH
        DB      088H,088H,020H,008H,002H ; 3cH
        DB      000H,07CH,0F0H,001H,000H ; 3dH
        DB      082H,020H,088H,088H,000H ; 3eH
        DB      02EH,042H,044H,000H,001H ; 3fH
        DB      02EH,0F6H,0DAH,083H,007H ; 40H
        DB      044H,0C5H,0F8H,063H,004H ; 41H
        DB      04FH,04AH,027H,0E5H,003H ; 42H
        DB      02EH,086H,010H,0A2H,003H ; 43H
        DB      04FH,04AH,029H,0E5H,003H ; 44H
        DB      03FH,084H,017H,0C2H,007H ; 45H
        DB      03FH,084H,017H,042H,000H ; 46H
        DB      03EH,084H,01CH,0A3H,007H ; 47H
        DB      031H,0C6H,01FH,063H,004H ; 48H
        DB      08EH,010H,042H,088H,003H ; 49H
        DB      008H,021H,084H,092H,001H ; 4aH
        DB      031H,095H,051H,052H,004H ; 4bH
        DB      021H,084H,010H,0C2H,007H ; 4cH
        DB      071H,0D7H,01AH,063H,004H ; 4dH
        DB      071H,0CEH,09AH,073H,004H ; 4eH
        DB      03FH,0C6H,018H,0E3H,007H ; 4fH
        DB      02FH,0C6H,017H,042H,000H ; 50H
        DB      02EH,0C6H,058H,093H,005H ; 51H
        DB      02FH,0C6H,057H,052H,004H ; 52H
        DB      03EH,004H,007H,0E1H,003H ; 53H
        DB      09FH,010H,042H,008H,001H ; 54H
        DB      031H,0C6H,018H,0A3H,003H ; 55H
        DB      031H,0C6H,018H,015H,001H ; 56H
        DB      031H,0C6H,05AH,0ABH,002H ; 57H
        DB      031H,02AH,0A2H,062H,004H ; 58H
        DB      031H,046H,045H,008H,001H ; 59H
        DB      01FH,022H,022H,0C2H,007H ; 5aH
        DB      04EH,008H,021H,084H,003H ; 5bH
        DB      020H,008H,082H,020H,000H ; 5cH
```

```
          DB    00EH,021H,084H,090H,003H ; 5dH
          DB    044H,045H,000H,000H,000H ; 5eH
          DB    000H,000H,000H,0C0H,007H ; 5fH
          DB    082H,020H,000H,000H,000H ; 60H
          DB    000H,038H,0E8H,0A3H,007H ; 61H
          DB    021H,0B4H,019H,0E3H,003H ; 62H
          DB    000H,0B8H,010H,0A2H,003H ; 63H
          DB    010H,0DAH,01CH,0A3H,007H ; 64H
          DB    000H,0B8H,0F8H,083H,003H ; 65H
          DB    04CH,08AH,023H,084H,000H ; 66H
          DB    0C0H,0C7H,0E8H,0A1H,003H ; 67H
          DB    021H,0B4H,019H,063H,004H ; 68H
          DB    004H,018H,042H,088H,003H ; 69H
          DB    008H,030H,084H,092H,001H ; 6aH
          DB    021H,0A4H,032H,04AH,002H ; 6bH
          DB    086H,010H,042H,088H,003H ; 6cH
          DB    000H,0ACH,05AH,06BH,005H ; 6dH
          DB    000H,0B4H,019H,063H,004H ; 6eH
          DB    000H,0B8H,018H,0A3H,003H ; 6fH
          DB    000H,0BCH,0F8H,042H,000H ; 70H
          DB    000H,0F8H,0E8H,021H,004H ; 71H
          DB    000H,0B4H,019H,042H,000H ; 72H
          DB    000H,0B8H,0E0H,0E0H,003H ; 73H
          DB    042H,03CH,021H,024H,003H ; 74H
          DB    000H,0C4H,018H,0B3H,005H ; 75H
          DB    000H,0C4H,018H,015H,001H ; 76H
          DB    000H,0C4H,058H,0ABH,002H ; 77H
          DB    000H,044H,045H,054H,004H ; 78H
          DB    000H,0C4H,0E8H,0A1H,003H ; 79H
          DB    000H,07CH,044H,0C4H,007H ; 7aH
          DB    088H,010H,041H,008H,002H ; 7bH
          DB    084H,010H,042H,008H,001H ; 7cH
          DB    082H,010H,044H,088H,000H ; 7dH
          DB    054H,001H,000H,000H,000H ; 7eH
          DB    0ffH,0ffH,0ffH,0ffH,0ffH ; 7fH
ext_tbl:
Ext_Tbl0:                              ;0
          DB    04CH,086H,020H,099H,001H ;80
          DB    00AH,0C4H,018H,0B3H,005H ;81
          DB    088H,0B8H,0F8H,083H,003H ;82
          DB    044H,039H,0E8H,0A3H,007H ;83
          DB    00AH,038H,0E8H,0A3H,007H ;84
          DB    082H,038H,0E8H,0A3H,007H ;85
          DB    004H,038H,0E8H,0A3H,007H ;86
          DB    000H,030H,021H,018H,001H ;87
          DB    044H,0B9H,0F8H,083H,003H ;88
          DB    054H,0B9H,0F8H,083H,003H ;89
          DB    082H,0B8H,0F8H,083H,003H ;8A
          DB    00AH,018H,042H,088H,003H ;8B
          DB    044H,001H,047H,088H,003H ;8C
          DB    082H,000H,047H,088H,003H ;8D
          DB    00AH,010H,015H,07FH,004H ;8E
          DB    004H,010H,015H,07FH,004H ;8F
          DB    088H,0FCH,0F0H,0C2H,007H ;90
          DB    000H,02CH,0FAH,0CBH,007H ;91
          DB    0A2H,097H,05FH,04AH,007H ;92
          DB    044H,0B9H,018H,0A3H,003H ;93
          DB    00AH,0B8H,018H,0A3H,003H ;94
          DB    082H,0B8H,018H,0A3H,003H ;95
          DB    044H,081H,018H,0B3H,005H ;96
          DB    082H,0C4H,018H,0B3H,005H ;97
          DB    054H,0C5H,0E8H,0A1H,003H ;98
          DB    00AH,0FCH,018H,0E3H,007H ;99
          DB    00AH,080H,018H,0E3H,007H ;9A
          DB    000H,0BAH,03AH,00FH,000H ;9B
          DB    044H,089H,023H,0E4H,003H ;9C
          DB    051H,07DH,0F2H,009H,001H ;9D YEN
          DB    027H,09dH,05eH,008H,006H ;9E PT
          DB    098H,07CH,042H,088H,000H ;9F
          DB    088H,038H,0E8H,0A3H,007H ;A0
          DB    088H,000H,043H,088H,003H ;A1
          DB    088H,0B8H,018H,0A3H,003H ;A2
          DB    088H,0C4H,018H,0B3H,005H ;A3
          DB    054H,0B5H,019H,063H,004H ;A4
          DB    054H,0C5H,059H,073H,004H ;A5
```

```
DB    00EH,0FAH,0E8H,0C1H,007H ;A6
DB    0C0H,0C5H,0E8H,0C0H,007H ;A7
DB    004H,010H,011H,0A2H,003H ;A8
DB    000H,080H,01fH,002H,000H ;A9 \--
DB    000H,080H,00FH,021H,000H ;AA
DB    031H,015H,01DH,011H,006H ;AB
DB    031H,055H,0DDH,021H,004H ;AC
DB    080H,000H,042H,008H,001H ;AD
DB    000H,050H,055H,014H,005H ;AE
DB    000H,014H,045H,055H,001H ;AF
DB    010H,0daH,094H,0eaH,004H ; b0H
DB    04cH,03aH,029H,0ddH,000H ; b1H
DB    000H,034H,029H,0c4H,000H ; b2H
DB    000H,062H,02aH,0e3H,007H ; b3H
DB    02eH,086H,017H,0a2H,003H ; b4H
DB    04dH,04aH,009H,021H,004H ; b5H
DB    02eH,0c6H,01fH,0a3H,003H ; b6H
DB    020H,008H,0a2H,062H,004H ; b7H
DB    073H,0ceH,016H,042H,000H ; b8H
DB    05fH,029H,0a5H,054H,006H ; b9H
DB    02eH,0ceH,016H,042H,000H ; baH
DB    05cH,0b8H,018H,093H,001H ; bbH
DB    01fH,011H,021H,008H,002H ; bcH
DB    080H,0b8H,05aH,01dH,001H ; bdH
DB    02eH,0c6H,018H,0d5H,006H ; beH
DB    05fH,012H,044H,0e4H,007H ; bfH
DB    03eH,0b8H,0e8H,0e0H,003H ; c0H
DB    07fH,08cH,03fH,0c6H,007H ; c1H
DB    06fH,0ceH,077H,0d6H,004H ; c2H
DB    088H,010H,042H,088H,000H ; c3H
DB    01fH,044H,045H,054H,004H ; c4H
DB    010H,05eH,008H,001H,000H ; c5H
DB    04cH,022H,0e2H,001H,000H ; c6H
DB    00eH,032H,0e8H,000H,000H ; c7H
DB    092H,031H,009H,000H,000H ; c8H
DB    05eH,008H,021H,086H,000H ; c9H
DB    084H,07cH,042H,0c0H,007H ; caH
DB    000H,000H,000H,000H,000H ; cbH
DB    000H,000H,000H,000H,000H ; ccH
DB    000H,000H,000H,000H,000H ; cdH
DB    000H,000H,000H,000H,000H ; ceH
DB    000H,000H,000H,000H,000H ; cfH
DB    083H,0a8H,0f8H,063H,004H ; d0H
DB    0e3H,087H,017H,0c2H,007H ; d1H
DB    023H,0c6H,018H,0a3H,003H ; d2H
DB    0f1H,087H,017H,0c2H,007H ; d3H
DB    0d1H,011H,042H,088H,003H ; d4H
DB    08eH,0a8H,0f8H,063H,004H ; d5H
DB    0eeH,087H,017H,0c2H,007H ; d6H
DB    0ceH,011H,042H,088H,003H ; d7H
DB    0ceH,0c5H,018H,0a3H,003H ; d8H
DB    00eH,0c4H,018H,0a3H,003H ; d9H
DB    02fH,084H,017H,0e3H,003H ; daH
DB    03fH,086H,010H,042H,000H ; dbH
DB    04eH,029H,0a5H,07eH,004H ; dcH
DB    0b5H,03aH,0e2H,06aH,005H ; ddH
DB    02eH,042H,007H,0a3H,003H ; deH
DB    031H,0e7H,03aH,067H,004H ; dfH
DB    00eH,0e4H,05cH,0e7H,004H ; e0H
DB    098H,052H,04aH,0abH,004H ; e1H
DB    03fH,0c6H,018H,063H,004H ; e2H
DB    031H,046H,00fH,0e1H,003H ; e3H
DB    0e4H,0d7H,05aH,03fH,001H ; e4H
DB    029H,0a5H,094H,03eH,004H ; e5H
DB    031H,0c6H,00fH,021H,004H ; e6H
DB    0b5H,0d6H,05aH,0ebH,007H ; e7H
DB    0b5H,0d6H,05aH,03fH,004H ; e8H
DB    043H,008H,02fH,0a5H,007H ; e9H
DB    031H,0c6H,05bH,0ebH,005H ; eaH
DB    00fH,042H,00fH,0e1H,003H ; ebH
DB    0bdH,0d6H,05bH,06H,007H ; ecH
DB    03fH,0c6H,04fH,065H,004H ; edH
DB    000H,000H,000H,000H,000H ; eeH
DB    0a7H,01cH,000H,000H,000H ; efH
DB    010H,011H,0f1H,0c1H,007H ; f0H
```

```
DB    041H,010H,0f4H,0c1H,007H ; f1H
DB    000H,07dH,0f2H,005H,000H ; f2H
DB    084H,010H,042H,0c8H,007H ; f3H
DB    000H,0a8H,0aaH,000H,000H ; f4H
DB    000H,0a4H,02aH,001H,000H ; f5H
DB    0e0H,083H,00fH,03eH,000H ; f6H
DB    0c0H,0d5H,05fH,01dH,000H ; f7H
DB    0c0H,0c5H,01fH,01dH,000H ; f8H
DB    080H,088H,02fH,008H,000H ; f9H
DB    080H,0a0H,08fH,008H,000H ; faH
DB    0a1H,08cH,03fH,04aH,000H ; fbH
DB    090H,0e2H,08fH,029H,004H ; fcH
DB    04aH,029H,0a5H,094H,002H ; fdH
DB    000H,000H,000H,000H,000H ; feH
DB    000H,000H,000H,000H,000H ; ffH
```

Copyright © 2005 Logic Controls, Inc.
All rights reserved

```
;================================================================================
;This is firmware using Philips USB chip PDIUSBD12D and from PROGARM: barcode.asm
; and Mr3V80.asm.
; FUNCTIONS: Line diaplay firmware with USB port (chip PDIUSBD12D used)
; USED IN: 80C52
; AUTHORS:     Peter Li
; Begining date: 07-25-2001
;================================================================================
;MODIFY HISTORY:
;================================================================================
;VERSION:     V1.0
;================================================================================
;       USB chip PDIUSBD12D commands
;================================================================================
; Initialization Commands
        SET_EMB_ADDRESS_EN   EQU   0D0H    ;set th USB assigned address/enable function
        SET_EPOINT_EN        EQU   0D8H    ;set endpoint enable
        SET_EMB_MODE         EQU   0F3H    ;set mode
        SET_EMB_DMA                EQU    0FBH    ;set DMA
;--------------------------------
; Data Flow Commands
        READ_EMB_INT         EQU   0F4H    ;read interrupt registers
;---
        SEL_EPT_EP0_OUT            EQU    000H    ;select endpoint0
        SEL_EPT_EP1_IN       EQU   001H    ;select endpoint1
        SEL_EPT_EP2_OUT            EQU    002H    ;select endpoint2
        SEL_EPT_EP3_IN       EQU   003H    ;select endpoint3
        SEL_EPT_EP4_OUT            EQU    004H    ;select endpoint4
        SEL_EPT_EP5_IN       EQU   005H    ;select endpoint5
;---
        READ_LAST_EP0_OUT_ST EQU   040H    ;read endpoint0 last transaction status
        READ_LAST_EP1_IN_ST  EQU   041H    ;read endpoint1 last transaction status
        READ_LAST_EP2_OUT_ST EQU   042H    ;read endpoint2 last transaction status
        READ_LAST_EP3_IN_ST  EQU   043H    ;read endpoint3 last transaction status
        READ_LAST_EP4_OUT_ST EQU   044H    ;read endpoint4 last transaction status
        READ_LAST_EP5_IN_ST  EQU   045H    ;read endpoint5 last transaction status
;---
        READ_BUFFER                EQU    0F0H    ;read the selected endpoint buffer(Max. 130)
        WRITE_BUFFER         EQU   0F0H    ;write the selected endpoint buffer(Max. 130)
        CLEAR_BUF                  EQU    0F2H    ;clear the selected endpoint buffer
        VALIDATE_BUF         EQU   0FAH    ;validate the selectcted endpoint buffer
        ACK_SETUP                  EQU    0F1H    ;acknowledge setup the selected endpoint
;---
        SET_EMBF_EP0_OUT_ST  EQU   040H    ;set endpoint0 status
        SET_EMBF_EP1_IN_ST   EQU   041H    ;set endpoint1 status
        SET_EMBF_EP2_OUT_ST  EQU   042H    ;set endpoint2 status
        SET_EMBF_EP3_IN_ST   EQU   043H    ;set endpoint3 status
        SET_EMBF_EP4_OUT_ST  EQU   044H    ;set endpoint4 status
        SET_EMBF_EP5_IN_ST   EQU   045H    ;set endpoint5 status
;--------------------------------
; General Commands
        SEND_RESUME                EQU    0F6H    ;send an upstream resume for 10 mS
        READ_CURR_FRAME_NUM EQU    0F5H    ;read the current frame number
;================================================================================
;       USB chip PDIUSBD12D constants
;================================================================================
; Data offset
        USB_OFFSET_bmReqTyp  EQU   02H
        USB_OFFSET_bmReq           EQU    03H
        USB_OFFSET_wValue          EQU    04H
        USB_OFFSET_wIndex          EQU    06H
        USB_OFFSET_wLength   EQU   08H
;--------------------------------
; Set Report Type
        USB_TYPE_INPUT       EQU   01
        USB_TYPE_OUTPUT            EQU    02
        USB_TYPE_FEATURE           EQU    03
;--------------------------------
; Size of endpoint data packet
        USB_EP0_SIZE         EQU   08      ;16
        USB_EP1_SIZE         EQU   16
        USB_EP2_SIZE         EQU   32      ;64
```

Copyright © 2005 Logic Controls, Inc.
All rights reserved

```
;================================================================================
; Fiel Name: <DN2029A.ASM>
; USED IN: 80C52
; AUTHORS:      Peter Li
;================================================================================

;================================================================================
;Glass_Scan_DN2029A: refresh the glass displaying
;Input: (Display_Buf): 40 bytes, (Refresh_Pt_Reg), DimCtl0, DimCtl1, DimCtl2, DimCtl3
;Output: (Refresh_Pt_Reg)
;Used: A, Reg_Backup_3, BitMap1, BitMap2, BitMap3
;     BitMap4, BitMap5, Glass_Cnt1, Glass_Cnt2
;================================================================================
Glass_Scanning:

Glass_Scan_DN2029A:
        push    PSW                                     ;save PSW
        anl     PSW,#11100111B                          ;Select bank 0
        push    ACC                                     ;save ACC and BCC mov     C,DimCtl0
        mov     LD_GLASS_BLANK,C                        ;Set anode BK to control DIM djnz    Blink_Scaler,GlsScan_DN2029A2;Cal. blink time
        mov     Blink_Scaler,#BLINKSCALER
        djnz    Blink_Cnt_Val,GlsScan_DN2029A2
        mov     Blink_Cnt_Val,#DPBLKRATE
        cpl     Blink_Flag                              ;set blink flag GlsScan_DN2029A2:
        mov     Reg_Backup_3,Refresh_Pt_Reg;save the current character position JNB     Blink_Enable_F,GlsScan_DN2029A2a
        jnb     Blink_Flag,GlsScan_DN2029A2a
        mov     A,#' '                                  ;all character is blinking
        sjmp    GlsScan_DN2029A2b
GlsScan_DN2029A2a:
        MOV     A,@Refresh_Pt_Reg                       ;get a character from display buffer JNB     Ultimate_Flag,GlsScan_DN2029A2b
        JNB     ACC.7,GlsScan_DN2029A2b
        CLR     ACC.7
        JNB     Blink_Flag,GlsScan_DN2029A2b
        MOV     A,#' '                                  ;each character can be blinking,
only in Ultimate command set GlsScan_DN2029A2b:
        LCALL   Check_Font_DN2029A                      ;pick up font for the first line mov     C,DimCtl1
        mov     LD_GLASS_BLANK,C                        ;Set anode BK to control DIM clr     Scan_Cursor_F                           ; the first line cursor
        mov     A,Reg_Backup_3                          ; check the cursor position
        cjne    A,display_buf_pt,GlsScan_DN2029A3
        jnb     CURSOR_OnOff_F,GlsScan_DN2029A3         ; cursor on or off?
        setb    Scan_Cursor_F                           ; now, at cursor position
        LCALL   DN2029A_CursorFont GlsScan_DN2029A3:
        MOV     Refresh_Pt_Reg,#BitMap1                 ;The first byte(total 5 bytes)
        MOV     Glass_Cnt2,#4
        MOV     Glass_Cnt1,#20                          ;The first 40 bits sent to glass SI in total
GlsScan_DN2029A4:                                       ;The first line
        MOV     A,@Refresh_Pt_Reg
        RR      A
        MOVX    @Refresh_Pt_Reg,A                       ; two bits sent to glass SI
        RR      A
        MOVX    @Refresh_Pt_Reg,A
        MOV     @Refresh_Pt_Reg,A
        DJNZ    Glass_Cnt2,GlsScan_DN2029A4a
```

```
                MOV         Glass_Cnt2,#4
                INC         Refresh_Pt_Reg                      ;next byte
GlsScan_DN2029A4a:
                DJNZ        Glass_Cnt1,GlsScan_DN2029A4 mov         Refresh_Pt_Reg,Reg_Backup_3
                mov         A,Refresh_Pt_Reg                    ;2nd line scanning
                add         A,#20
                mov         Refresh_Pt_Reg,A JNB         Blink_Enable_F,GlsScan_DN2029A4b
                jnb         Blink_Flag,GlsScan_DN2029A4b
                mov         A,#' '                              ;all character is blinking
                sjmp        GlsScan_DN2029A4c
GlsScan_DN2029A4b:
                MOV         A,@Refresh_Pt_Reg                   ;get a character from display buffer JNB         Ultimate_Flag,GlsScan_DN2029A4c
                JNB         ACC.7,GlsScan_DN2029A4c
                CLR         ACC.7
                JNB         Blink_Flag,GlsScan_DN2029A4c
                MOV         A,#' '                              ;each character can be blinking,
only in Ultimate command set GlsScan_DN2029A4c:
                LCALL       Check_Font_DN2029A                  ;pick up font for second line mov         C,DimCtl2
                mov         LD_GLASS_BLANK,C                    ;Set anode BK to control DIM clr         Scan_Cursor_F                       ; the second line cursor
                mov         A,Reg_Backup_3                      ; check the cursor position
                add         A,#20
                cjne        A,display_buf_pt,GlsScan_DN2029A5
                jnb         CURSOR_OnOff_F,GlsScan_DN2029A5     ; cursor on or off?
                setb        Scan_Cursor_F                       ; now, at cursor position
                LCALL       DN2029A_CursorFont GlsScan_DN2029A5:
                MOV         Refresh_Pt_Reg,#BitMap1             ;The first byte of font(total 5 bytes)
                MOV         Glass_Cnt2,#4
                MOV         Glass_Cnt1,#8                       ;The next 16 bits sent to glass SI in total
GlsScan_DN2029A6:                                               ;The second line(1)
                MOV         A,@Refresh_Pt_Reg
                RR          A
                MOVX        @Refresh_Pt_Reg,A                   ; two bits sent to glass SI
                RR          A
                MOVX        @Refresh_Pt_Reg,A
                MOV         @Refresh_Pt_Reg,A
                DJNZ        Glass_Cnt2,GlsScan_DN2029A6a
                MOV         Glass_Cnt2,#4
                INC         Refresh_Pt_Reg                      ;next byte of font
GlsScan_DN2029A6a:
                DJNZ        Glass_Cnt1,GlsScan_DN2029A6

MOV         Glass_Cnt2,#4
                MOV         Glass_Cnt1,#12                      ;The next 24 bits sent to glass SI in total
GlsScan_DN2029A7:                                               ;The second line(2)
                MOV         A,Glass_Cnt1
                ADD         A,#Display_Buf+7
                CJNE        A,Reg_Backup_3,GlsScan_DN2029A7a
                SETB        DN2029A_GlsGSI
GlsScan_DN2029A7a:
                MOV         A,@Refresh_Pt_Reg
                RR          A
                MOVX        @Refresh_Pt_Reg,A                   ; two bits sent to glass SI
                RR          A
                MOVX        @Refresh_Pt_Reg,A
                CLR         DN2029A_GlsGSI
                MOV         @Refresh_Pt_Reg,A
                DJNZ        Glass_Cnt2,GlsScan_DN2029A7b
                MOV         Glass_Cnt2,#4
                INC         Refresh_Pt_Reg                      ;next byte of font
GlsScan_DN2029A7b:
                DJNZ        Glass_Cnt1,GlsScan_DN2029A7
```

```
                MOV         Glass_Cnt1,#8                   ;last 16 bits sent to glass SI in total
GlsScan_DN2029A8:
                MOV         A,Glass_Cnt1
                ADD         A,#Display_Buf-1
                CJNE        A,Reg_Backup_3,GlsScan_DN2029A8a
                SETB        DN2029A_GlsGSI
GlsScan_DN2029A8a:
                MOV         A,#0FFH
                MOVX        @Refresh_Pt_Reg,A               ; two bits sent to glass SI
                RL          A
                MOVX        @Refresh_Pt_Reg,A
                RL          A
                CLR         DN2029A_GlsGSI
                DJNZ        Glass_Cnt1,GlsScan_DN2029A8

;               mov         C,DimCtl3
;               mov         LD_GLASS_BLANK,C                ;Set anode BK to control DIM SETB        C
                MOV         LD_GLASS_BLANK,C                ;make anode BK lower mov         Refresh_Pt_Reg,Reg_Backup_3
                inc         Refresh_Pt_Reg                  ;Calculate the pointer value of the current
Grid
                cjne        Refresh_Pt_Reg,#Display_Buf+DISPLAY_BUF_2LEN,GlsScan_DN2029A9
                mov         Refresh_Pt_Reg,#Display_Buf
GlsScan_DN2029A9:
                setb        DN2029A_GlsLat
                clr         DN2029A_GlsLat POP         ACC                             ;restore ACC, PSW
                POP         PSW CLR         C
                MOV         LD_GLASS_BLANK,C                ;make anode BK high RET
;===========================================================================
;Check_Font_DN2029A: Pickup the font of a character. If the character displayed is
;       replaced with new download font, pickup the new font. If the
;       reversion flag (Font_Rev_Flag) is set, reverse the font.
;Input:     (A): ASCII code character, (FondCode), (Font_Rev_Flag)
;used: Refresh_Pt_Reg
;===========================================================================
Check_Font_DN2029A:
        mov     Refresh_Pt_Reg,#FondCode
        mov     Reg_Backup_2,@Refresh_Pt_Reg
        cjne    A,Reg_Backup_2,ChFont_DN2029A3 mov     Refresh_Pt_Reg,#UFondBuf;pick up download font
        mov     BitMap1,@Refresh_Pt_Reg
        inc     Refresh_Pt_Reg
        mov     BitMap2,@Refresh_Pt_Reg
        inc     Refresh_Pt_Reg
        mov     BitMap3,@Refresh_Pt_Reg
        inc     Refresh_Pt_Reg
        mov     BitMap4,@Refresh_Pt_Reg
        inc     Refresh_Pt_Reg
        mov     BitMap5,@Refresh_Pt_Reg
        sjmp    ChFont_DN2029A2

ChFont_DN2029A3:                                            ;pickup standard font
        CLR     C
        SUBB    A,#20H
        mov     B,#5
        mul     AB
        add     A,#LOW(Ascii_Tbl)
        mov     DPL,A
        mov     A,B
        addc    A,#HIGH(Ascii_Tbl)
        mov     DPH,A                                       ;((A)-#20H)*5+#Ascii_Tbl-
>(DPH,DPL)
        clr     A                                           ;pick up 5 bytes font data from font table
        movc    A,@A+DPTR
```

```
            mov     BitMap1,A
            mov     A,#1
            movc    A,@A+DPTR
            mov     BitMap2,A
            mov     A,#2
            movc    A,@A+DPTR
            mov     BitMap3,A
            mov     A,#3
            movc    A,@A+DPTR
            mov     BitMap4,A
            mov     A,#4
            movc    A,@A+DPTR
            mov     BitMap5,A
ChFont_DN2029A2:
            jnb     Font_Rev_Flag,ChFont_DN2029A4
            xch     A,BitMap1                           ;Display reverse font.
            cpl     A
            xch     A,BitMap1
            xch     A,BitMap2
            cpl     A
            xch     A,BitMap2
            xch     A,BitMap3
            cpl     A
            xch     A,BitMap3
            xch     A,BitMap4
            cpl     A
            xch     A,BitMap4
            xch     A,BitMap5
            cpl     A
            xch     A,BitMap5
ChFont_DN2029A4:
            ret
;================================================================
;DN2029A_CursorFont: Set cursor font in the BitMap1, BitMap2, BitMap3, BitMap4, BitMap5
;Output: BitMap1, BitMap2, BitMap3, BitMap4, BitMap5
;used: A
;================================================================
DN2029A_CursorFont:
            JNB     Blink_Flag,DN2029A_CursorFont2      ; Flash cursor
;           ORL     BitMap4,#0C0H
            ORL     BitMap4,#0FEH
            ORL     BitMap5,#07H
DN2029A_CursorFont2:
            RET
;================================================================
;           End
;================================================================
```

Copyright © 2005 Logic Controls, Inc.
All rights reserved

```
;==================================================================
; Fiel Name: <init_int.h>
; All initialization and interrupt subroutines in this file of line display.
; For Line diaplay firmware with USB port (chip PDIUSBD12D used), RS232 port and parallel port.
; USED IN: 80C52
; AUTHORS:      Peter Li
; Begining date: 04-24-2002
;==================================================================

;==============================================================
;TM0Proc: generate a timer(Timer #0 Interupt routing)
;Input (Hour), (Minute), (Second), (Ms10_Cnt)
;Output (Hour), (Minute), (Second), (Ms10_Cnt), (TIME_UPDATE_F)
;==============================================================
TM0Proc:
        JB      Timer0_12MHz,TM0Proc0a
        mov     TL0,#015H                           ;14.7456MHz
        mov     TH0,#0D0H                           ;(12288-21)=10mS
        SJMP    TM0Proc0
TM0Proc0a:
        mov     TL0,#0F0H                           ;12MHz--USB port
        mov     TH0,#0D8H                           ;(10000)=10mS
TM0Proc0:
        PUSH    ACC
        PUSH    PSW DEC     Scroll_Cnt_L                        ;scrolling counting DJNZ    Ms10_Cnt,TM0Proc_End                ;1 Second counter
        SETB    TIME_UPDATE_F                       ;update time
        MOV     Ms10_Cnt,#TIMESCALER                ;1 second counting
        MOV     A,Second
        ADD     A,#01
        DA      A
        MOV     Second,A INC     USB_CONNECT_Chk                     ;seconds counting for USB connection check CJNE    A,#60H,$+3
        JC      TM0Proc1
        MOV     Second,#00
        MOV     A,Minute
        ADD     A,#01
        DA      A
        MOV     Minute,A
TM0Proc1:
        MOV     A,Minute
        CJNE    A,#60H,$+3
        JC      TM0Proc2
        MOV     Minute,#00
        MOV     A,Hour
        ADD     A,#01
        DA      A
        MOV     Hour,A
TM0Proc2:
        MOV     A,Hour
        CJNE    A,#TIME_SCALE_12+1,$+3
        JC      TM0Proc_End
        MOV     Hour,#01

TM0Proc_End:
        POP     PSW
        POP     ACC
        RETI
;==============================================================
;RS232_Int: RS232 port communication interrupt processing
;==============================================================
RS232_Int:
        jbc     RI,RX_int
        jbc     TI,TX_int
        reti
;-----
```

```
;receive a byte from RS232 port
RX_int:
        JNB     USB_NOT_F,RX_int_end            ;if USB port is used?
        PUSH    PSW
        PUSH    ACC
        SETB    RS0                             ;select bank1
        CLR             RS1

MOV             A,RS232_St_Pter_Rg
        ADD             A,RS232_Cnter
        CJNE    A,#Rx_Buf+RS232_Buf_Len,RX_int1
        MOV             A,#Rx_Buf
RX_int1:
        MOV             RS232_St_Pter,A
        MOV             A,SBUF
        MOV             @RS232_St_Pter,A
        INC             RS232_Cnter ;       SETB    RS232_RxD_HS
        SETB    RS232_CTS_Out POP             ACC
        POP             PSW
RX_int_end:
        reti ;----
;Transmit a byte to TS232 port
TX_int:
        JB      RS232_TxD_HS,TX_int1

TX_int3:
        setb    Tx_Restart_flag
        sjmp    TX_int2
TX_int1:
        jb      RS232_CTS_In,TX_int3
TX_int4:
        MOV     SBUF,Tx_Buf
        CLR     RS232_TxD_HS TX_int2:
        reti
;==========================================================================
;Init_port: initialize registers and ports' valubles
;==========================================================================
Init_port:
        mov     P2,#11111100B           ; GlassLatch = P2.0, initialization = low
        mov     P2,#11111100B           ; GridSI = P2.1, initialization = low
                                       ; GlassBlank = P2.2, initialization = high
;----
        mov     TL0,#LOW(MAX_CNT-SCANRATE)
        mov     TH0,#HIGH(MAX_CNT-SCANRATE)

mov     TMOD,#00100001B        ; GATE C/T M1 M0   GATE C/T M1 M0
                                       ;  0 0 1 0    0 0 0 1
        mov     TCON,#01010001B        ; TF1 TR1 TF0 TR0 IE1 IT1 IE0 IT0  start timer
                                       ;  0 1 0 1 0 0 0 1
;----
;default status
;Single side mode or backside in double side
;mode without USB port
        CLR     DOUBLE_SIDE_F          ;single side
        CLR     Pass_Throu_F           ;not pass-throu
        SETB    USB_NOT_F              ;RS232 or Parallel port
        CLR     Timer0_12MHz           ;14.7456MHz MOV     C,USB_NOT_PORT         ;(JP21)
        ANL     C,Module_Port          ;(JP6)
        JC      Init_port1
;----
        MOV     C,USB_NOT_PORT
        ORL     C,Module_Port
        JNC     Init_port1a
;----
```

```
                JNB     USB_NOT_PORT,Init_port1b
;                                                                       ;(USB_NOT_PORT)=1,
(Module_Port)=0
;front side in Double side mode without USB port
                SETB    DOUBLE_SIDE_F           ;front side in double mode
                SETB    Pass_Throu_F            ; if it is double side.
                SETB    USB_NOT_F               ;RS232 or Parallel port
                LJMP    Init_port1
Init_port1b:                                    ;(USB_NOT_PORT)=0, (Module_Port)=1
;single mode or front side USB port in
;double mode with USB port
                SETB    DOUBLE_SIDE_F           ;front side in double mode or single mode
                SETB    Pass_Throu_F
                CLR     USB_NOT_F               ;USB port
                SETB    Timer0_12MHz            ;12MHz with USB port
                LJMP    Init_port1
;----
Init_port1a:                                    ;(USB_NOT_PORT)=0, (Module_Port)=0
;backside in double side mode with USB port
;(12MHz crystal must be used)
                CLR     DOUBLE_SIDE_F           ;back side mode in double mode with USB port
                CLR     Pass_Throu_F            ;single side
                SETB    USB_NOT_F               ;RS232 or Parallel port
                SETB    Timer0_12MHz            ;12MHz with RS232 port
Init_port1:                                     ;(USB_NOT_PORT)=1, (Module_Port)=1
;----
                JNB     USB_NOT_F,Init_port_USB ;USB port?
;----
;parallel port
                setb    ParaInBusyClr           ; Set the parallel port
                setb    ParaInLock
                setb    ParaOutStrobe
                clr     ParaOutLock CLR     ParaACK                 ;initialize parallel port ACK signal
                CLR     ParaInBusyClr           ;reset the busy line of parallel port
                NOP
                SETB    ParaInBusyClr Init_port_USB:
;----
;RS232 port setting
                CLR     RS232_CTS_Out           ;CTS to PC is high initially
                setb    Tx_Restart_flag
;----
                mov     IP,#00010000B           ; serial rx prioriy 1
                mov     IE,#10010010B           ; EA x ET2 ES ET1 EX1 ET0 EX0 enable int JNB     USB_NOT_F,Init_port_End
                MOV     RS232_St_Pter_Rg,#Rx_Buf;Initialize RS232 RxD buffer pointer and counter
                MOV     RS232_Cnter_Rg,#0
;----
Init_port_End:
                ret
;================================================================
;Reset_Var:  reset
;================================================================
Reset_Var:
                MOV     Ms10_Cnt,#TIMESCALER    ;1 second counting
                MOV     Hour,#00
                MOV     Minute,#00
                MOV     Second,#00
                MOV     FScroll_Begin_Pt,#SCROLL_CHAR_BUF
                MOV     FScroll_End_Pt,#SCROLL_CHAR_BUF
                MOV     Scroll_Dly_L,#FSCROLLSCALER_L
;----
                orl     Dimmer_Value,#00001111B   ;Set Dim control code
                anl     Dimmer_Value,#BRIGHTNESS100

;init line and msg flash,user font,comdot
        mov     display_buf_pt_reg,#FondCode+UCHRSIZE
Reset_Var0:                                     ;Clear the new font character buffer:
FondCode
                dec     display_buf_pt_reg
                mov     @display_buf_pt_reg,#0
```

```
                cjne    display_buf_pt_reg,#UFondBuf,Reset_Var0 mov     display_buf_pt_reg,#Display_Buf+DISPLAY_BUF_LEN
Reset_Var5:
                dec     display_buf_pt_reg          ;Clear the logo character
                mov     @display_buf_pt_reg,#' '
                cjne    display_buf_pt_reg,#Display_Buf,Reset_Var5

CLR     LONG_WORD_F
                CLR     FScroll_EndPt_F             ;
                CLR     FLASH_SCROLL_DL             ; initially no delay in flash scrolling
                CLR     FLASH_SCROLL                ; no flash scroll
                CLR     Ultimate_Flag               ; not Ultimate command
                CLR     Character_Blink_F           ; no character blinking initially
                CLR     Blink_Enable_F              ; no blinking initially
                CLR     Font_Rev_Flag               ; initially no inverse font
                CLR     TIME_UPDATE_F               ; initially no updating time
                CLR     TIME_OnOff_F                ; initially, not display time
                CLR     Scrl_One_Msg_F              ; initially, scroll multi-times
                CLR     Scrl_Msg_FLAG               ; stop scrolling a message on top line
                setb    IsVertical                  ; vertical for futaba RET
;================================================================
;Init_Var:   initialization
;================================================================
Init_Var:
;               CLR     RS232_RxD_HS                ;no data receive from RS232 initially
                CLR     RS232_TxD_HS                ;no data is ready for transmitting initially
;-----
                CLR     USB_EP1_DATA_RDY            ;=1: data sent to HOST is ready
                CLR     USB_EP2_DATA_RDY            ;=1: data sent to HOST is ready
                CLR     HOST_CHAR_F                 ;no character from USB HOST initially
;-----
                mov     Flag_Reg1,#0
                mov     Blink_Cnt_Val,#DPBLKRATE
                mov     Blink_Scaler,#BLINKSCALER MOV     CtlCode1,#AX_DIRECT_CODE1
                MOV     CtlCode2,#AX_DIRECT_CODE2
;-----
                CLR     OPOS_SCROLL_F               ;Initially, non-OPOS command set
;               CLR     VBUS_POWER_ON               ;initially USB VBUS off
                setb    CURSOR_OnOff_F              ; cursor is on initially
                CLR     DIRECT_DISP_F               ; display characters input
                CLR     Pass_Throu_F                ; No pass-throu initially
                JNB     DOUBLE_SIDE_F,Init_Var6
                SETB    Pass_Throu_F                ; if it is double side.
Init_Var6:
                SETB    BACK_FRONT_F                ;initially display on front or back or both sides ret
;================================================================
;Set_RS232:   Setup RS232 port
;       regs used: A
;================================================================
Set_RS232:
;               JNB     USB_NOT_F,Set_RS232_Ret
;RS232 port
                clr     TR1                         ; Stop Timer #1
                mov     SCON,#01010000B             ; 8 Bits UART mov     A,Dip_SWp                   ;
                anl     A,#00001110B                ; P0.1,P0.2,P0.3
                ORL     A,#00001000B
                rr      A
                call    pickbaudrate                ;
                mov     PCON,#00000000B             ; SMOD=0 --> Divided by 32
                jnb     ACC.0,srs5                  ;
                mov     PCON,#10000000B             ; Divided by 16
                mov     A,#0FCH                     ; 19200
srs5:
                mov     TH1,A                       ; Set Timer#1
                setb    TR1                         ; Enable Timer#1
```

```
Set_RS232_Ret:
        ret                                    ;
;===============================================================
;pickbaudrate: Get Baud rate Value for Timer # 1 *
;       14.7456MHz
;===============================================================
pickbaudrate:       ;       Get Baud rate
        inc    A    ;
        movc   A,@A+PC ;
        ret         ;
        DB    000H  ;     SMOD = 0   150
        DB    080H  ;     SMOD = 0   300
        DB    0C0H  ;     SMOD = 0   600
        DB    0E0H  ;     SMOD = 0   1200
        DB    0F0H  ;     SMOD = 0   2400
        DB    0F8H  ;     SMOD = 0   4800
        DB    0FCH  ;     SMOD = 0   9600
        DB    001H  ; 0FCH => SMOD = 1  19200
;===============================================================
;Disp_Logo:      to display a logo
;===============================================================
Display_Logo:
        JB            LogoSelPort,Disp_Logo0b
        LJMP          Disp_Logo5                      ;Display logo or not, according to JP13(P0.4)
Disp_Logo0b:
;--- get LOGO
        MOV           A,#LOW(Logo_Tbl)
        MOV           DPL,A
        MOV           A,#HIGH(Logo_Tbl)
        MOV           DPH,A
        MOV           B,#40
        MOV           display_buf_pt_reg,#Display_Buf+DISPLAY_BUF_LEN
Disp_Logo0:
        DEC           display_buf_pt_reg              ;Send logo characters into display buffer
        MOV           A,B
        DEC           A
        MOVC          A,@A+DPTR
        MOV           @display_buf_pt_reg,A
        DJNZ          B,Disp_Logo0
;--- get version number
;       MOV           A,#LOW(Ver_Num)
;       MOV           DPL,A
;       MOV           A,#HIGH(Ver_Num)
;       MOV           DPH,A
;       MOV           B,#4
;       MOV           display_buf_pt_reg,#Display_Buf+32
;Disp_Logo0a:
;       DEC           display_buf_pt_reg              ;Send version number characters into display buffer
;       MOV           A,B
;       DEC           A
;       MOVC          A,@A+DPTR
;       MOV           @display_buf_pt_reg,A
;       DJNZ          B,Disp_Logo0a
;--- get model numbers
;       MOV           display_buf_pt_reg,#Display_Buf+33
;       CLR           A                               ; get command selection code
;       mov           C,CmdSelPort0                   ; Set the command selection bits from
;       mov           ACC.0,C                         ; jumps(P2.3, JP4, JP5)
;       mov           C,CmdSelPort1
;       mov           ACC.1,C
;       mov           C,CmdSelPort2
;       mov           ACC.2,C
;       ADD           A,#'A'
;       MOV           @display_buf_pt_reg,A
;---
        clr           CURSOR_OnOff_F                  ;no cursor displayed
Disp_Logo1a:
        MOV           Ms10_Cnt,#TIMESCALER   ;1 second counting
        MOV           Hour,#00
        MOV           Minute,#00
        MOV           Second,#00

Disp_Logo1:
        LCALL    Glass_Scanning
```

```
                JNB             USB_NOT_F,Disp_Logo2b
;----
;RS232 or Parallel port
;       JB              RS232_RxD_HS,Disp_Logo3         ;Check if there is a character from RS232 port
        MOV             A,RS232_Cnter_Rg
        JNZ             Disp_Logo3                      ;Check if there is a character from RS232 port
        JNB             ParaInReady,Disp_Logo3          ;Check if there is a character from parallel port
        SJMP            Disp_Logo2a
Disp_Logo2b:
;----
;USB port
;       JNB             VBUS_POWER_ON,                  ;if VBUS power on?
        JNB             d12_VBUS,Disp_Logo2c            ;if VBUS power on?
        CLR             ET0                             ;disable Timer#0
        SETB            RS0                             ;select bank1
        CLR             d12_CS_PORT                     ;select USB chip
        LCALL           USB_SUBROUTINE
        SETB            d12_CS_PORT
        CLR             RS0                             ;restore bank0
        SETB            ET0                             ;enable timer#0 jnb             EMB_CONFIG,Disp_Logo2c          ;(EMB_CONFIG)=1: configured
        JB              HOST_CHAR_F,Disp_Logo3
Disp_Logo2c:

;--- detect (d12_OK_PORT) to turn on/off glass power
        JNB             d12_OK_PORT,Disp_Logo2d
        SETB            Power_Ctrl                      ;turn switch power off with USB port
        MOV             Second,#00
        jmp             Disp_Logo1                      ;waiting for USB connection
Disp_Logo2d:
        MOV             A,Second
        CJNE            A,#3,$+3
        jc              Disp_Logo1                      ;wait until USB connection is OK for at least 2 S
        CLR             Power_Ctrl                      ;turn switch power on with USB port Disp_Logo2a:
        MOV             A,Second
        CJNE            A,#LOGO_DISP_TIME,Disp_Logo1    ;display logo for n seconds JB              USB_NOT_F,Disp_Logo3
        JNB             d12_VBUS,Disp_Logo1a            ;if VBUS power on when USB port is used?

Disp_Logo3:
        mov             display_buf_pt_reg,#Display_Buf+DISPLAY_BUF_LEN
Disp_Logo4:
        dec             display_buf_pt_reg              ;Clear the logo character
        mov             @display_buf_pt_reg,#' '
        cjne            display_buf_pt_reg,#Display_Buf,Disp_Logo4
        setb            CURSOR_OnOff_F                  ;Display cursor MOV             USB_CONNECT_Chk,#00
;       SETB            ET0                             ;enable timer0 interrupt
Disp_Logo5:
        RET Logo_Tbl:
        DB      ' LOGIC CONTROLS ';
;       DB      '    V -        ';
;       DB      ' POS V -       ';
        DB      ' POS COMPONENTS ';
;=============================================================================
```

Copyright © 2005 Logic Controls, Inc.
All rights reserved

```
;================================================================================
; Fiel Name: <io.h>
; All input output subroutines in this file of line display.
; For Line diaplay firmware with USB port (chip PDIUSBD12D used), RS232 port and parallel port.
; USED IN: 80C52
; AUTHORS:      Peter Li
; Begining date: 04-24-2002
;================================================================================

;================================================================================
;read_char: Waiting for reading a byte from USB or RS232 buffer, or PRN port, and
;        scanning and scolling the glass while waiting.
;regs used:        A, R1
;input:  none
;output: (A)=a byte of data
;================================================================================
Read_Char:
        JB              USB_NOT_F,Read_Char_RS232_Para
        LJMP    Read_Char_USB                                   ;if USB port is used?
Read_Char_RS232_Para:
;----
;RS232 or Parallel port
        JNB             ParaInReady,read_char_prn               ;Check if there is data in the PRN port?
;----
        MOV             A,RS232_Cnter_Rg
        JZ              Read_Char2                              ;no data in RS232 RxD buffer
;check RS232 port input
Read_Char_RxD:
;       JNB             RS232_RxD_HS,Read_Char2
        CLR             ES
        PUSH    PSW
        SETB    RS0                                             ;select bank1
        CLR             RS1
        setb    Serial_Para_F                                   ;used in Pass-throu, RS232 port output MOV             RS232_St_Pter,RS232_St_Pter_Rg
        MOV             A,@RS232_St_Pter
        INC             RS232_St_Pter_Rg
        CJNE    RS232_St_Pter,#Rx_Buf+RS232_Buf_Len-1,Read_Char_RxD1
        MOV             RS232_St_Pter_Rg,#Rx_Buf
Read_Char_RxD1:

DEC             RS232_Cnter
        CJNE    RS232_Cnter,#0,Read_Char_RxD_End

;       CLR             RS232_RxD_HS
        CLR             RS232_CTS_Out                           ; the last character in RS232 RxD buffer processed
        MOV             RS232_St_Pter_Rg,#Rx_Buf
Read_Char_RxD_End:
        POP             PSW
        SETB    ES
        ret ;----
;check Parallel port input
read_char_prn:
;----
        LCALL   Glass_Scanning
        clr     Serial_Para_F                   ;used in Pass-throu, Parallel port output
        mov     ParaDataBus,#0FFH               ;shut off drain
        clr     ParaInLock
        mov     A,ParaDataBus                   ;read a character from PRN port
        setb    ParaInLock setb    ParaACK
NOP
NOP
NOP
```

```
NOP
NOP
        clr     ParaInBusyClr
;       NOP
        setb    ParaInBusyClr
NOP
NOP
NOP
NOP
NOP
        clr             ParaACK
        ret Read_Char2:
        LCALL   Glass_Scanning
;---
;scrolling processing
        JNB     FLASH_SCROLL_DL,read_char_Cnt_Delay1
        MOV     Scroll_Cnt_L,#FSCROLL_DISP              ;delay for displaying message in special scrolling
        CLR     FLASH_SCROLL_DL
read_char_Cnt_Delay1:
        JNB     FLASH_SCROLL,read_char_Cnt_Delay
        MOV     A,Scroll_Cnt_L
        JNZ     char_CK
        MOV     Scroll_Cnt_L,Scroll_Dly_L               ;delay shortly for special scrolling
        LJMP    read_char_Scroll
read_char_Cnt_Delay:
        jnb     Scrl_Msg_FLAG,char_CK
        MOV     A,Scroll_Cnt_L
        JNZ     char_CK
        MOV     Scroll_Cnt_L,#SCROLLSCALER_L            ;delay for regular scrolling
read_char_Scroll:
        SETB    LD_GLASS_BLANK                          ;dim the glass when scrolling a message
;       LCALL   To_Scroll_Message
        CLR     LD_GLASS_BLANK char_CK:
;       LCALL   Display_Time
        JNB     USB_NOT_F,Read_Char_USB
        LJMP    Read_Char_RS232_Para;if USB port is used?
;---
Read_Char_USB:
;--- detect (d12_OK_PORT) to turn on/off glass power
        JNB             d12_OK_PORT,USB_Check2b
        SETB    Power_Ctrl                              ;turn switch power off with USB port
        LJMP    START                                   ;Yes, restart
;       jmp             USB_Check2c
USB_Check2b:
;       CLR             Power_Ctrl                      ;turn switch power on with USB port
;USB_Check2c:

;---
;check USB buffer
        MOV     A,USB_Data_Len
        JZ      USB_Check
;---
USB_Char_Rdy:
        LCALL   Glass_Scanning
;---Get a byte from buffer
        MOV             B,Display_Buf_Pt_reg
        MOV             A,#USB_Packet_Buffer
        ADD             A,USB_DATA_Cnt
        MOV             Display_Buf_Pt_reg,A INC             USB_DATA_Cnt
        MOV             A,USB_DATA_Cnt
        CJNE    A,USB_Data_Len,USB_Char_Rdy2
        MOV             USB_Data_Len,#0
USB_Char_Rdy2:
        MOV             A,@Display_Buf_Pt_reg
        MOV             Display_Buf_Pt_reg,B
        RET
```

```
;---
;check USB port
USB_Check:
        JB          d12_VBUS,USB_Check1              ;if VBUS power off?
        LJMP        START                            ;Yes, restart USB_Check1:
        CLR         ET0                              ;disable timer#0
        SETB        RS0                              ;select bank1
        CLR         d12_CS_PORT                      ;select USB chip
        LCALL       USB_SUBROUTINE
        SETB        d12_CS_PORT
        CLR         RS0                              ;restore bank0
        SETB        ET0                              ;enable timer#0 jnb         EMB_CONFIG,USB_Check2a;(EMB_CONFIG)=1: configured
        JBC         HOST_CHAR_F,USB_Char_Rdy
        AJMP        USB_Check2

USB_Check2a:

USB_Check2:
;---
;checking USB port connection periodly
        MOV         A,USB_CONNECT_Chk
        CJNE        A,#1,$+3                         ;1 second after displaying LOGO
        JC          USB_Check1a
        MOV         USB_CONNECT_Chk,#00
        JNB         d12_OK_PORT,USB_Check1a CLR         ET0                              ;disable timer#0
        SETB        RS0                              ;select bank1
        CLR         d12_CS_PORT                      ;select USB chip
        LCALL       USB_Reconnect                    ;Yes, Initialize USB chip
        SETB        d12_CS_PORT
        CLR         RS0                              ;restore bank0
        SETB        ET0                              ;enable timer#0

;       LJMP        START                            ;Yes, restart
USB_Check1a:
        LJMP        Read_Char2
;===============================================================
;Pass_Data_Out: Put a byte into RS232 port TX buffer or parallel port
;input: (A), (USB_NOT_F), (Serial_Para_F)
;       (A) to RS232 port
;       Only (USB_NOT_F)=1 and (Serial_Para_F)=0: (A) to Parallel port and RS232 port
;===============================================================
Pass_Data_Out:
;---
;RS232 port transmitting
        sjmp        SPass_Data_Out5
SPass_Data_Out3:
        jnb    Tx_Restart_flag,SPass_Data_Out5
        clr    Tx_Restart_flag
        setb   TI SPass_Data_Out5:
        JNB         RS232_TxD_HS,SPass_Data_Out6

PUSH        ACC                              ;save the character in (A)
        LCALL       Glass_Scanning
        POP         ACC
        LJMP        SPass_Data_Out3
SPass_Data_Out6:
        MOV         Tx_Buf,A
        SETB        RS232_TxD_HS jbc    Tx_Restart_flag,SPass_Data_Out7
        LJMP        Pass_Data_Out1

SPass_Data_Out7:
        setb   TI
;---
Pass_Data_Out1:
        JNB         USB_NOT_F,Pass_Data_Out2         ;if USB port is used?
```

```
          jnb  · Serial_Para_F,LPass_Data_Out;if it is Parallel double side mode?
Pass_Data_Out2:
          ret
;----
;Parallel port transmiting
LPass_Data_Out:                                        ;output to parallel port
          jnb   ParaOutBusy,LPass_Data_Out1
          nop
          jnb   ParaOutBusy,LPass_Data_Out1  ;make sure no noise
          nop
          jnb   ParaOutBusy,LPass_Data_Out1  ;make sure no noise
          mov   ParaDataBus,A                ;(A) sent to PRN port
          setb  ParaOutLock
          nop
          clr   ParaOutLock
          nop
          clr   ParaOutStrobe
          nop
          setb  ParaOutStrobe
          ret LPass_Data_Out1:
          PUSH    ACC                                  ;save the character in (A)
          LCALL   Glass_Scanning
          POP     ACC
          LJMP    LPass_Data_Out
;================================================================================
;         End
;================================================================================
```

Copyright © 2005 Logic Controls, Inc.
All rights reserved

```
;================================================================================
; Fiel Name: <LD9UsbTb.dat>
; Bulk mode for line diaplay LD9000 firmware with USB port (chip PDIUSBD12 used)
; USED IN: 80C52
; AUTHORS:       Peter Li
; Begining date: 04-29-2002
;================================================================================
; idVendor, Vendor ID (Logic Controls Inc., 0FA8H)
; idProduct(Product ID: A090H)
;================================================================================
;       USB Descriptors and Strings table
;================================================================================
; Strings
;---
USBString0:
        ; String 0, LANGIDs
        db      04h                     ; bLength and bDescriptorType
        DB      03h                     ; String Descriptor
        dw      0904h                   ; String(0x0409: US English)
;---
;       Unicode Strings
USBString1:
        ;String 1, Manufacturer
        DB      manu_len; manufacturer, Descriptor Index = 01h
        DB      03h                     ; String Descriptor
        DB      'L',00,'o',00,'g',00,'i',00,'c',00,' ',00,'C',00,'o',00,'n',00
        db      't',00,'r',00,'o',00,'l',00,'s',00,',',00,' ',00,'I',00,'n',00,
        db      'c',00,'.',00,0
;---
USBString2:
        manu_len equ    USBString2-USBString1
;---
;       USB string 2, Product name
        DB      prod_len ; Product name, Descriptor Index = 02h
        DB      03h                     ; String Descriptor
        DB      'L',0,'i',0,'n',0,'e',0,' ',0,'D',0,'i',0,
        DB      's',0,'p',0,'l',0,'a',0,'y',0,' ',0,'L',0,
        DB      'D',0,'9',0,'0',0,'0',0,'0',0,0,0;Product name string
;---
USBString3:
        prod_len        equ     USBString3-USBString2
;---
;       USB string 3, Serial number
        DB      serial_len ; Serial number, Descritpor Index = 03h
        DB      03h                     ; String Descriptor
        DB      '0', 00         ; string value
        DB      '1', 00
USBStringEnd:
        serial_len      equ     USBStringEnd-USBString3
;================================================================================
;----Device Descriptor
USBDvcDsc:                              ;18 bytes in total
        db      12h                     ; bLength(device descriptor length=18 bytes)
        db      01h                     ; bDescriptorType(device type)
        dw      1001h                   ; bcdUSB(original: 0001h, USB spec. 1.00; now USB spec. 1.10)
        db      00h                     ; bDeviceClass(0)
        db      00h                     ; bDeviceSubClass(0)
        db      00h                     ; bDeviceProtocol(0), No specific protocol
        db      08h                     ; bMaxPacketSize(8), Max. packet size for EP0 IN/OUT(8 bytes)
        db      0A8H,0FH                ; idVendor, Vendor ID (Logic Controls Inc., 0FA8H)
        dw      90A0H                   ; idProduct(Product ID: A090H)
        dw      0102H                   ; bcdDevice(release number: 02.01)
        db      01h                     ; iManufacturer(index of string)
        db      02h                     ; iProduct(index of string)
        db      00      ;03h            ; iSerialNumber(index of string)
        db      01h                     ; bNumConfigurations
;----Configuration Descriptor
USBCnfDsc:
        db      09h                     ; bLength
        db      02h                     ; bDescriptorType
        db      LOW(USBCnf_lngh)        ; wTotalLength, low byte
```

```
            db      HIGH(USBCnf_lngh)       ; wTotalLength, high byte
            db      01h                     ; bNumInterfaces(1)
            db      01h                     ; bConfigurationValue(1)
            db      00h                     ; iConfiguration(index): Config. Name
            db      0C0H                    ; bmAttributes, Configuration (Self-powered)
            db      0                       ; MaxPower, 0mA
;----Interface Descriptor
USBInfDsc:
            db      09h                     ; bLength(9)
            db      04h                     ; bDescriptorType(4, Interface)
            db      00h                     ; bInterfaceNumber(0, Interface No.)
            db      00h                     ; bAlternateSetting(0)
            db      03                      ; bNumEndpoints(number of endpoints in the interface)
            db      0FFH                    ; bInterfaceClass(0FFH): vendor define interface class
            db      00h                     ; bInterfaceSubClass, Subclass code ()
            db      00h                     ; bInterfaceProtocol, Protocol code ()
            db      00h                     ; iInterface(0), Index of string() = Interface Name
;----Endpoint3 (EP#1 IN) Descriptor
USBEP3InDsc:
            db      07h                     ; bLength
            db      05h                     ; bDescriptorType
            db      81h                     ; bEndpointAddress, Address = IN(EP#1)
            db      03h                     ; bmAttributes(3)=Interrupt
            dw      0A00H                   ; wMaxPacketSize(10)=Maximum packet size
            DB      10                      ; bInterval, Poll interval time(10 mS)
;----Endpoint4 (EP#2 OUT) Descriptor
USBEP4InDsc:
            db      07h                     ; bLength
            db      05h                     ; bDescriptorType
            db      02h                     ; bEndpointAddress, Address = OUT(EP#2)
            db      02h                     ; bmAttributes(2)=Bulk
            dw      2000H                   ; wMaxPacketSize(32)=Maximum packet size
            DB      10                      ; bInterval, Poll interval time(10 mS)
;----Endpoint5 (EP#2 IN) Descriptor
USBEP5InDsc:
            db      07h                     ; bLength
            db      05h                     ; bDescriptorType
            db      82h                     ; bEndpointAddress, Address = IN(EP#2)
            db      02h                     ; bmAttributes(2)=Bulk
            dw      2000H                   ; wMaxPacketSize(32)=Maximum packet size
            DB      10                      ; bInterval, Poll interval time(10 mS)
;-----
USBdsc_end:
            USBCNF_lngh             equ     USBdsc_end-USBCnfdsc
```

Copyright © 2005 Logic Controls, Inc.
All rights reserved

```
;================================================================================
; Fiel Name: <ldcmd.h>
; All command set codes and constants data header file of line display.
; For Line diaplay firmware with USB port (chip PDIUSBD12D used), RS232 port and parallel port.
; USED IN: 80C52
; AUTHORS:      Peter Li
; Begining date: 02-06-2002
;================================================================================
        AX_DIRECT_CODE1             EQU     21H; control code1
        AX_DIRECT_CODE2             EQU     23H; control code2
;================================================================
;       Constant definition
;================================================================
        US_CODE                     EQU     1FH; <US>'s ASCII code
        ESC_CODE                    EQU     1BH; <ESC>'s ASCII code
        CR_CODE                     EQU     0DH; <Carriage return>'s ASCII code
        LF_CODE                     EQU     0AH; <line feed>'s ASCII code
        TIME_SCALE_12      EQU      12H; set 12 hour time scale DEMO_DELAY1                 EQU     08H; display demo message delay
        DEMO_DELAY2                 EQU     100; delay between characters
        DEMO_DELAY3                 EQU     05; brightness control delay
        BRIGHT_REPEAT      EQU      02; brightness control repeat Scroll_BEGIN_L     EQU      01H; begin message scrolling delay time
        SCROLLSCALER_L              EQU     20; for scrolling delay
        FSCROLLSCALER_L             EQU     03; for flash scrolling delay
        FSCROLL_DISP       EQU      200; display time in flash scrolling MAX_CNT            EQU      0       ; 65536
        MSG_BUF_LEN        EQU 45
        DISPLAY_BUF_LEN       EQU   40
        DISPLAY_BUF_2LEN      EQU   20
        RS232_BUF_LEN      EQU32
        SCANRATE           EQU 0400H   ; 512*0.8138=416.66 microS   1/(60*40)
        BLINKSCALER        EQU 74      ; 31MS for blinking
        DPBLKRATE          EQU 10      ; for blinking
        TIMESCALER         EQU 100     ; for timer
        LOGO_DISP_TIME     EQU      20          ; time(seconds) for displaying logo UFONDBSIZE         EQU      30
        UCHRSIZE           EQU      6
;----
;all Glass
        BRIGHTNESS100      EQU00000000B
        BRIGHTNESS60       EQU 00001100B
        BRIGHTNESS40       EQU 00001110B
        BRIGHTNESS20       EQU 00001111B
```

Copyright © 2005 Logic Controls, Inc.
All rights reserved

```
;================================================================================
; This is firmware using Philips USB chip PDIUSBD12D and from PROGARM: barcode.asm,
; LD9V62.ASM and LD9U15.ASM, and new glass DN2029A is used
; FUNCTIONS: Line diaplay firmware for all command sets and all ports:
;       USB port (chip PDIUSBD12D used), RS232 port and Parallel port.
; File Name: <LD9U**.ASM/HEX>
; This is the firmware of POS display used for testing New Glass 202-LD-57GONK
; USED IN: 80C52
; AUTHORS:      Peter Li
; Begining date: 02-07-2002
;================================================================================
;Modifying History:
;
;================================================================================
        $MOD52
        $TITLE(LineDisplay)
        $DATE(Jun-23-05)
        $PAGEWIDTH(132)
        $PAGELENGTH(60)
;================================================================================
        $INCLUDE(LDCMD.H)               ;Line Display command code set
        $INCLUDE(D12CMD.H)      ;Philips PDIUSBD12 chip command set
        $INCLUDE(MEMPUS.H)      ;internal RAM&Registers and I/O port for LD9 USB
;================================================================================
; INTERRUPT VECTOR TABLE
;================================================================================
        CSEG    AT      0000H
        ORG     0000H
        LJMP    START                   ;PROGRAM START
        ORG     0003H
        RETI
        ORG     000BH
        LJMP    TM0Proc
;       RETI
        ORG     0013H
        RETI
        ORG     001BH
        RETI
        ORG     0023H
        LJMP    RS232_Int
;       RETI
;       ORG     002BH                   ;no this in 80C51
;       RETI
;================================================================================
Ver_Num:
        DB      '2.40';
;================================================================================
; PROGRAM START
;================================================================================
        ORG     0050H
START:
        MOV     P0,#11111111B           ;INITIAL I/O PORT
        MOV     P1,#11111111B
        MOV     P2,#11111111B
        MOV     P3,#11111111B ;----
        MOV     SP,#STACK_BUF           ;SET STACK POINTER
;----Glass scanning initialization
        call    Reset_Var
        LCALL   Init_Var
        LCALL   Init_port ;CLR    DOUBLE_SIDE_F   ;Testing only, single side
;CLR    Pass_Throu_F    ;Testing only, single side
;SETB   DOUBLE_SIDE_F   ;Testing only, front side of double side device
;SETB   Pass_Throu_F    ;Testing only, it is double side.
;CLR    USB_NOT_F               ;Testing only, USB port
;SETB   USB_NOT_F               ;Testing only, RS232 or Parallel port
;SETB   ParaACK         ;ParaACK(P3.7=RD) is used in emulator, it can't be clear when emulator is used.
```

```
        call    Set_RS232
        JNB     USB_NOT_F,Init_USB
        LCALL   Display_Logo
        LJMP    Main_Loop
;================================================================================
Init_USB:
;
        JNB     d12_VBUS,Init_USB1        ;if VBUS power on?
        CLR     ET0                                               ;disable timer#0
        SETB    RS0                                               ;select bank1
        CLR     d12_CS_PORT                                       ;select USB chip
        ACALL   USB_Reconnect             ;Yes, Initialize USB chip
        SETB    d12_CS_PORT
        CLR     RS0                                               ;restore bank0
        SETB    ET0                                               ;enable timer#0
Init_USB1:
        LCALL   Display_Logo
        JNB     d12_VBUS,Init_USB
;       JNB     VBUS_POWER_ON,Init_USB
;================================================================================
Main_Loop:
;-- get LOGO
        MOV     A,#LOW(Logo_Tbl)
        MOV     DPL,A
        MOV     A,#HIGH(Logo_Tbl)
        MOV     DPH,A
        MOV     B,#40
        MOV     display_buf_pt_reg,#Display_Buf+DISPLAY_BUF_LEN
Main_Loop1:
        DEC     display_buf_pt_reg        ;Send logo characters into display buffer
        MOV     A,B
        DEC     A
        MOVC    A,@A+DPTR
        MOV     @display_buf_pt_reg,A
        DJNZ    B,Main_Loop1
        clr     CURSOR_OnOff_F            ;no cursor displayed
;================================================================================
Main_Loop2:

LCALL   Read_Char                 ; Get a character code from USB port mov     @display_buf_pt_reg,A
        inc     display_buf_pt_reg cjne    display_buf_pt_reg,#Display_Buf+DISPLAY_BUF_LEN,Main_Loop3
        mov     display_buf_pt_reg,#Display_Buf
Main_Loop3:
        LJMP    MAIN_LOOP2
;================================================================================
;================================================================================
;================================================================================
; SUBROUTINES
;================================================================================
;the following is USB port part
;be carefull if something has to be changed.
;================================================================================
        $INCLUDE(USB.asm)                 ;all USB part subroutines
;================================================================================
;================================================================================
;       The followings are Line Display subroutines
;================================================================================
        $INCLUDE(init_int.asm)    ;All initialization and interrupt subroutines
        $INCLUDE(io.asm)          ;all input and output subroutines
;================================================================================
        $INCLUDE(ASCFONT.DAT)     ;ASCII code font of (5X7) pixels
;================================================================================
;================================================================================
        $INCLUDE(LD9UsbTb.dat)    ;USB Descriptor and string table
        $INCLUDE(DN2029A.ASM)     ;Glass scanning
;================================================================================
        ;
        ;
        END
```

Copyright © 2005 Logic Controls, Inc.
All rights reserved

```
;================================================================================
; Fiel Name: <mempus.h>
; RAM registers, flags, variables, data buffers and I/O ports header file of line display.
; For Line diaplay firmware with USB port (chip PDIUSBD12D used), RS232 port and parallel port.
; USED IN: 80C52
; AUTHORS:      Peter Li
; Begining date: 02-06-2002
;================================================================================
;Modifying History:
;Date: 05-01-2002
;1. Add glass DN2025H IO pin definition.
;Date: 05-17-2002
;1. In initialization, not detect VBUS, and not use the flag (VBUS_POWER_ON)
;Date: 06-04-2002
;1. Solving losing data problem when huge data coming in with serial port
;    pass-through mode or double side mode.
;    use 32 bytes buffer for serial RxD data and an start pointer(RS232_St_Pter)
;    and a counter(RS232_Cnter).
;    (Rx_Buf)=72H, RS232 port RxD buffer(32 bytes)
;Date: 06-25-2002
;1. Use one pin sign name for glass blank(P2.2).
;Date: 09-03-2003
;1.In Aedex command set, one <LF> code MUST be dropped if it just after <CR>.
;    use the flag(AEDEX_LF_F) to indicate a <CR> code just received.
;Date: 04-23-2004
;1. In Logic Controls command set, A <CR> code is NOT necessary. After get hh:mm,
;    display timer on bottom. If there is a <CR> code after the command, drop the <CR> code.
;    Add a flag(LCCmd_TIMER_F) to indicator this event.
;================================================================================
;================================================================================
;      Memery Map     ;
;================================================================================
;        register asignment   ;
;        DPTR       used exclusively in DN2029A_Glass_Scan
;================================================================================
;--------------------------------------------------------------------------------
; Bank 0 used in Glass scanning and data processing
        Refresh_Pt          EQU    0       ;R0=0, initialized in: Init_Var
        Refresh_Pt_Reg      EQU    R0      ;used in: DN2029A_Glass_Scan, Check_Font
        Display_Buf_Pt      EQU    1       ;R1=1
        Display_Buf_Pt_reg  EQU    R1      ;initialized in: Init_Var and used in: Init_Var, Disp_Logo,
                                           ;Put_Display_Buf, BACKSPACE,
HORIZONTAL_TAB, LINEFEED,
                                           ;CARRIAGE_RETURN,
CURSOR_POSITION, Set_Left_Top_Scroll.
                                           ;Set_Right_Top_Scroll,
Set_Left_Bottom_Scroll, Set_Right_Bottom_Scroll,
                                           ;CLEAR_PART_DISPLAY, SCROLL
        ClrStart            EQU    02H     ; used in: CLEAR_PART_DISPLAY
        ClrEnd              EQU    03H     ; used in: CLEAR_PART_DISPLAY
        AXDispCharLen       EQU    03H     ; used in: AEDEX_Cmd
        Long_Word_Char      EQU    04H     ; a character in a long word
        Reg_Backup_3        EQU    05H     ; used in: DN2029A_Glass_Scan, Delete_DL_FONT,
UTE_DOWNLOAD_FONT
        Reg_Backup_2        EQU    06H     ; used in: To_Scroll_Message, Check_Font
        Reg_Backup_1        EQU    07H     ; used in: read_char, CLEAR_PART_DISPLAY,
SCROLL
;--------------------------------------------------------------------------------
; Bank 1 used in RS232 RxD processing;08H--09H
        RS232_St_Pter       EQU    R0      ; RS232 RxD buffer start pointer
        RS232_St_Pter_Rg    EQU    09H
        RS232_Cnter         EQU    R2      ; RS232 RxD buffer counter
        RS232_Cnter_Rg      EQU    0AH
; Bank 1 used in USB port processing;08H--0FH
        USB_Rel_R0          EQU    R0      ;general register for relative access
        USB_Pack_Len        EQU    R1      ;length of USB data packet
        USB_Req_Type        EQU    R2      ;USB request type
        USB_Req_Code        EQU    R3      ;USB request code
        USB_Req_Value       EQU    R4      ;USB request value(lower byte)
        USB_Req_Index       EQU    R5      ;USB request index(lower byte)
        USB_Req_Len                 EQU    R6      ;USB request length(lower byte)
```

```
            USB_Gene_Cnt         EQU    0FH       ;(R7)USB general counter
;----------------------------------
; Bank 2 used in Glass scanning and data processing
            Scroll_Dly_L         EQU    10H       ; special scrolling delay register
            Scrl_Msg_Buf_Pt      EQU    11H       ; R1=11H
            Scrl_Msg_Buf_Pt_reg  EQU    R1        ; used in: Put_Scroll_Msg, To_Scroll_Message, FScroll_Begin_Pt     EQU    12H       ; used in: To_Scroll_Message,Put_Scroll_Msg,
                                                          ;Get_FlasfScroll_Pt
            FScroll_End_Pt       EQU    13H       ; used in: To_Scroll_Message,Put_Scroll_Msg,
                                                          ;Get_FlasfScroll_Pt
            CtlCode1             EQU    14H       ; used in: AEDEX_Cmd, ULTIMATE_Cmd
            CtlCode2             EQU    15H       ; used in: AEDEX_Cmd, ULTIMATE_Cmd
            RW_COUNTER                  EQU    16H
;           Rx_Buf               EQU    16H       ; RS232 port RxD buffer
            Tx_Buf       EQU    17H               ; RS232 port TxD buffer
;----------------------------------
; Bank 3 used in Glass scanning and data processing
            Down_Font_Buf_Pt     EQU    R0        ; R0=18H,save the point value of FondCode. used in:
DOWNLOAD_FONT
            Ln_Output_Buf_Pt   EQU   19H    ; R1=19H
            Ln_Output_Buf_Pt_Reg  EQU           R1        ; used in: To_Scroll_Message USB_DATA_Cnt         DATA   1AH       ; used in MAIN_LOOP for USB input bytes counter BitMap1     EQU    1BH                ; used in: DN2029A_Glass_Scan, Check_Font, CursorFont
            BitMap2     EQU    1CH
            BitMap3     EQU    1DH
            BitMap4     EQU    1EH
            BitMap5     EQU    1FH ;---
;specially used in Glass 202-LD-57GONK
            BitMap_B1            EQU    1BH       ; used in: Glass_Scan, Pickup_Font,
CursorFont
            BitMap_B2                   EQU    1CH
            BitMap_B3                   EQU    1DH
            BitMap_B4                   EQU    1EH
            BitMap_B5                   EQU    1FH
;=================================================================================
;           RAM variables and flags
;=================================================================================
;----------------------------------
; RAM below is used in Glass scanning and data processing
            IsVertical           EQU    F0        ;=1: vertical scroll mode
                                                  ;=0: overwrite mode
            Flag_Reg0                   EQU    20H
            DOUBLE_SIDE_F        EQU    Flag_Reg0.0    ;=0: single side, =1: double side
            CURSOR_OnOff_F       EQU    Flag_Reg0.1    ;=1: display cursor
            Scan_Cursor_F        EQU    Flag_Reg0.2    ;=1: the cursor position has cursor
            Tx_Restart_flag      EQU    Flag_Reg0.3    ;
            OPOS_SCROLL_F        EQU    Flag_Reg0.4    ;=1: OPOS ScrollMsg
            Timer0_12MHz         EQU    Flag_Reg0.5    ;=1: 12MHz CPU clock
            Pass_Throu_F         EQU    Flag_Reg0.6    ;=1: pass through
            DIRECT_DISP_F        EQU    Flag_Reg0.7    ;=0: display characters input Flag_Reg1                   EQU    21H
            Serial_Para_F        EQU    Flag_Reg1.0    ;=1: Serial port, =0: parallel port
            Scrl_One_Msg_F       EQU    Flag_Reg1.1    ;=1: scroll message only onw time
            Scrl_Msg_FLAG        EQU    Flag_Reg1.2    ;=1: scroll message in SCROLL_CHAR_BUF
            Msg_Scroll_Line      EQU    Flag_Reg1.3    ;=0: Top; =1: bottom
            Msg_Scroll_Direct  EQU   Flag_Reg1.4    ;=0: left; =1: right
            Font_Rev_Flag        EQU    Flag_Reg1.5    ;=1: reverse all character font in Display_Buf
            Blink_Enable_F       EQU    Flag_Reg1.6    ;=1: enable blink
            Blink_Flag                  EQU    Flag_Reg1.7         ;used in DN2029A_Glass_Scan for
blinking Dimmer_Value         EQU    22H
            DimCtl0              EQU    Dimmer_Value.0   ;
            DimCtl1              EQU    Dimmer_Value.1
            DimCtl2              EQU    Dimmer_Value.2
            DimCtl3              EQU    Dimmer_Value.3   ;control glass brightness
            TIME_OnOff_F         EQU    Dimmer_Value.4   ;=1: display time
            TIME_UPDATE_F        EQU    Dimmer_Value.5   ;=1: update time data displayed
            UT_En_Sd_Mode_F             EQU    Dimmer_Value.6   ;=1: Ultimate enhanced command
set
```

|  |  |  |  |  |
|---|---|---|---|---|
| Ultimate_Flag | EQU | Dimmer_Value.7 | ;=1: blinking in Ultimate command set. | |
| Flag_Reg2 | | EQU | 23H | |
| Character_Blink_F | EQU | Flag_Reg2.0 | ;=1: characters falshing, used in UTL command |
| FLASH_SCROLL | EQU | Flag_Reg2.1 | ;=1: flash scroll in LCI | |
| FScroll_EndPt_F | EQU | Flag_Reg2.2 | ;=1: FScroll_End_Pt is set | |
| FLASH_SCROLL_DL | | EQU | Flag_Reg2.3 | ;=1: delay several seconds in flash scroll |
| BACK_FRONT_F | | EQU | Flag_Reg2.4 | ;=1: display on front or back or both sides. |
| LONG_WORD_F | | EQU | Flag_Reg2.5 | ;=1: a long word found in scroll Msg. |
| AEDEX_LF_F | | EQU | Flag_Reg2.6 | ;=1: just receive <CR> code |
| RS232_TxD_HS | EQU | Flag_Reg2.7 | ;=1: a byte is waiting for transmitting | |

;-------------------------------
; RAM below is used in USB part

|  |  |  |  |  |
|---|---|---|---|---|
| USB_FLAG | | DATA | 24H | ;general flag |
| USB_I2C_DATA_FAIL | BIT | USB_FLAG.0 | ;USB_I2C_DATA FAIL FLAG. | |
| VALIDATE_FLAG | BIT | USB_FLAG.1 | ;WRITE BUFFER FLAG | |
| HOST_CHAR_F | | BIT | USB_FLAG.2 | ;=1: a character fron USB HOST |
| LCCmd_TIMER_F | BIT | USB_FLAG.3 | ;=1: drop <CR> code after display Timer. | |
| EMB_CONFIG | | BIT | USB_FLAG.4 | ;1=EMB CONFIGURED |
| USB_EP1_DATA_RDY | BIT | USB_FLAG.5 | ;=1: a character sent to HOST is ready(EP#1 IN) | |
| USB_EP2_DATA_RDY | BIT | USB_FLAG.6 | ;=1: a character sent to HOST is ready(EP#2 IN) | |
| USB_NOT_F | | BIT | USB_FLAG.7 | ;=0: USB port, =1: RS232 port or Parallel port |
| EMB_STATUS | | DATA | 25H | ;FLAG AND STATUS |
| EMB_SELF_POWER | | BIT | EMB_STATUS.0;=0: BUS-POWERed | |
| EMB_REMOTE_WAKE | | BIT | EMB_STATUS.1;=0: no remote-wakeup | |
| EMB_EPT0_OUT_STALL | BIT | EMB_STATUS.2;1=stalled, EMB FUNCTION EPT0 OUT STALL FLAG | | |
| EMB_EPT0_IN_STALL | BIT | EMB_STATUS.3;1=stalled, EMB FUNCTION EPT0 IN STALL FLAG | | |
| EMB_EPT1_OUT_STALL | BIT | EMB_STATUS.4;1=stalled, EMB FUNCTION EPT1 OUT STALL FLAG | | |
| EMB_EPT1_IN_STALL | BIT | EMB_STATUS.5;1=stalled, EMB FUNCTION EPT1 IN STALL FLAG | | |
| EMB_EPT2_OUT_STALL | BIT | EMB_STATUS.6;1=stalled, EMB FUNCTION EPT2 OUT STALL FLAG | | |
| EMB_EPT2_IN_STALL | BIT | EMB_STATUS.7;1=stalled, EMB FUNCTION EPT3 IN STALL FLAG | | |
| Flag_Reg3 | | EQU | 26H | |
| ; | | EQU | Flag_Reg3.0 | ;=1: |
| ;---- | | | | |
| ; RW_COUNTER | | DATA | 26H | |
| EMB_ADDR | | DATA | 27H | ;ADDRESS OF THE EMBEDDED FUNCTION |
| USB_REPORT_TYPE | | DATA | 28H | ;the last report type code |
| EMB_BYTE_TO_SEND | | DATA | 29H | ; |
| EMB_MSG_DPH | | DATA | 2AH | ;buffer of DPTR |
| EMB_MSG_DPL | | DATA | 2BH | |

;-------------------------------
; RAM below is used in Glass scanning and data processing

|  |  |  |  |
|---|---|---|---|
| FontBitCnt | EQU | 2CH | ; used in: UTE_DOWNLOAD_FONT |
| BBitCnt | EQU | 2DH | ; used in: UTE_DOWNLOAD_FONT |
| ByteCnt | EQU | 2EH | ; used in: UTE_DOWNLOAD_FONT |
| ByteBackup | EQU | 2FH | ; used in: UTE_DOWNLOAD_FONT, Overwrite_Mode |

;-------------------------------
; RAM below is used in Glass scanning and data processing

|  |  |  |  |
|---|---|---|---|
| Display_Buf | EQU | 30H | ; 30H - 57H 40 bytes |
| Hour | EQU | 58H | ; used in: Disp_Logo, TM0Proc, PutTimeValue |
| Minute | EQU | 59H | ; used in: Disp_Logo, TM0Proc, PutTimeValue |
| Second | EQU | 5AH | ; used in: TM0Proc, PutTimeValue |
| Ms10_Cnt | EQU | 5BH | ; used in: TM0Proc |
| USB_CONNECT_Chk | EQU | 5CH | ; used in: Read_Char:, TM0Proc: |
| Long_Sec_Cnt | EQU | 5DH | ; used in right scroll subroutine |

;-------------------------------
; S/W USB_I2C_DATA CONTROL REGISTERS

```
            BYTE_CNT              DATA    5EH     ;BYTES TO BE PROCESSED BY
USB_I2C_DATA TX/RX
            CNT_BYTE              DATA    5FH     ;NUMBER OF BYTES TO BE
TRANSMITTED
            USB_Data_Len          EQU     60H     ; the number of bytes just coming.
;----------------------------------------
; RAM below is used in in Glass scanning and data processing
            Scroll_Cnt_L          EQU     61H     ;(lower)
            SCROLL_CHAR_CNT       EQU     62H     ;character scroll counter
            SCROLL_CHAR_BUF_Pt    EQU     63H     ; point to the current character in SCROLL_CHAR_BUF
            Glass_Cnt1            EQU     64H     ;used in DN2029A_Glass_Scan,
UTE_DOWNLOAD_FONT
            Glass_Cnt2            EQU     65H     ;used in DN2029A_Glass_Scan,
UTE_DOWNLOAD_FONT
            Pointer1              EQU     66H     ;used in SCROLL
            Pointer2              EQU     67H     ;used in SCROLL
            Blink_Scaler          EQU     68H     ;blinking time
            Blink_Cnt_Val         EQU     69H     ;blinking time
            R0TEMP                EQU     6AH     ; used in: UTE_DOWNLOAD_FONT
;---
;specially used in Glass 202-LD-57GONK
            BitMap_A1             EQU     6BH     ; used in: Glass_Scan, Pickup_Font,
CursorFont
            BitMap_A2             EQU     6CH
            BitMap_A3             EQU     6DH
            BitMap_A4             EQU     6EH
            BitMap_A5             EQU     6FH ;---
;used in RS232 RxD processing
            Rx_Buf                EQU     70H     ; RS232 port RxD buffer(32 bytes)
;----------------------------
; RAM below is used in USB part
            USB_Packet_Buffer     DATA    70H     ;USB_I2C_DATA TRANSMIT/RECEIVE DATA
BUFFER
                                                  ;70H-A1H 50 BYTES
;---
            SCROLL_CHAR_BUF       EQU     0A2H    ;A2H--CFH:(45 bytes) hold scrolling codes
            UFondBuf              EQU     0F0H    ;F0H--F4H: 5 bytes, download font, 5 bytes
each character
            FondCode              EQU     0F5H    ;F5H--F5H: 1 bytes, 1 ASCII characters of
new font
;----
            STACK_BUF             EQU     0D0H    ;D0H--EFH: 32bytes system stack
;=================================================================================
;           IO PORT Definition
;=================================================================================
;I/O ports for initial setting parameters
            Dip_SWp                       EQU     P0
            USB_NOT_PORT          EQU     P0.0    ;(open)=0: USB port, =1: RS232 port or Parallel port
                                          EQU     P0.1    ;(JP8) 1 0 1 0    ;0-3: 2400,
4800, 9600, 19200
                                          EQU     P0.2    ;(JP7) 1 1 0 0    ;MSD
            Module_Port                   EQU     P0.3    ;=0: (JP6)double sides line display
            LogoSelPort                   EQU     P0.4    ;=1: (JP13)display a logo
                                          EQU     P0.5
            CmdSelPort0                   EQU     P0.6    ;(JP5)
            CmdSelPort1                   EQU     P0.7    ;(JP4)
            CmdSelPort2                   EQU     P2.3    ;(JP16)
                                                  Select command set
;           JP16 JP4 JP5: 0 0 0           0: Logic controls command set(extended FUTABA)
;           JP16 JP4 JP5: 0 0 1           1: NORITAKI
;           JP16 JP4 JP5: 0 1 0           2: AEDEX
;           JP16 JP4 JP5: 0 1 1           3: EPSON
;           JP16 JP4 JP5: 1 0 0           4: ULTIMATE Enhanced
;           JP16 JP4 JP5: 1 0 1           5: Logic Controls OPOS
;           JP16 JP4 JP5: 1 1 0           6: ULTIMATE Standard
;           JP16 JP4 JP5: 1 1 1           7: Ultmate PD220XLT(Standard mode)
;----
            LD_GLASS_BLANK                EQU     P2.2    ;connected to glass BK1&2 pin
;I/O ports used in Glass 202-LD-57GONK scanning
            LD_57GONK_GlsSI2      EQU     P0.6    ;connected to glass SI2 pin
            LD_57GONK_GlsSI1      EQU     P0.7    ;connected to glass SI1 pin
            LD_57GONK_GlsLat      EQU     P2.0    ;connected to glass LAT1&2 pin
            ;                             EQU     P2.1
```

```
            LD_57GONK_GlsClk        EQU     P3.6        ;connect to glass CLK1&2 pin, and watch dog trigger
;I/O ports used in Glass DN2029A scanning
            DN2029A_GlsSI           EQU     P0.7        ;connected to glass SI1 pin
            DN2029A_GlsLat          EQU     P2.0        ;connected to glass LAT1&2 pin
            DN2029A_GlsGSI          EQU     P2.1        ;connected to glass Grid SI pin
            DN2029A_GlsClk          EQU     P3.6        ;connect to glass CLK1&2 pin, and watch dog trigger
;I/O ports used in Glass DN2025H scanning
            DN2025H_GlsSI           EQU     P0.7        ;connected to glass SI pin
            DN2025H_GlsLat          EQU     P2.0
            DN2025H_GlsClk          EQU     P3.6        ;connect to glass CLK pin, and watch dog trigger
;----
;I/O ports for RS232 port and Parallel port
            ParaDataBus             EQU     P1          ; parallel port data bus ParaInLock              EQU     P2.4        ; parallel port data lock pin
            ParaOutBusy             EQU     P2.5        ; parallel port output busy pin
            ParaOutStrobe           EQU     P2.6        ; parallel port output strobe pin
            ParaOutLock             EQU     P2.7        ; parallel port output lock pin RS232Rx                 EQU     P3.0        ; RS232 Rx pin
            RS232Tx                 EQU     P3.1        ; RS232 Tx pin
            ParaInReady             EQU     P3.2        ;=0: there is data ready in the parallell port.
            ParaInBusyClr           EQU     P3.3        ; parallel port busy line clear pin
            RS232_CTS_In            EQU     P3.4        ; RS232 CTS pin(In from Pass-Throu device)
            RS232_CTS_Out           EQU     P3.5        ; RS232 CTS pin(Out to PC)
            ParaACK                 EQU     P3.7        ; parallel port ACK signal pin.
;----
;I/O ports for USB chip accessing
            d12_Data_Bus            EQU     P1          ;PDIUSBD12D Chip data bus
            d12_CS_PORT             BIT     P2.4        ;PDIUSBD12D Chip Select PIN
            d12_OK_PORT             BIT     P2.5        ;PDIUSBD12D suspend PIN
            d12_INT_PORT            BIT     P2.6        ;PDIUSBD12D INTERRUPT PIN
            d12_VBUS                BIT     P2.7        ;PDIUSBD12D VBUS detect pin
            d12_ADDR                BIT     P3.0        ;PDIUSBD12D Address pin
            d12_WR                  BIT     P3.5        ;PDIUSBD12D WR pin
            d12_RD                  BIT     P3.7        ;PDIUSBD12D RD pin
;---
            Power_Ctrl              BIT     P3.3        ;=1: switch power on, =0: off
```

Copyright © 2005 Logic Controls, Inc.
All rights reserved

```
;===============================================================================
; Fiel Name: <USB.h>
; All USB part subroutines in this file of line display.
; For Line diaplay firmware with USB port (chip PDIUSBD12D used), RS232 port and parallel port.
; USED IN: 80C52
; AUTHORS:     Peter Li
; Begining date: 04-24-2002
;===============================================================================
;MODIFY HISTORY:
;Date: 04-24-2002
; Come from <LD9U174.ASM.h>
;Date: 05-20-2002
;1. When a Reset command code is accepted, the USB unput data buffer(USB_Packet_Buffer)
;   and data length (USB_Data_Len) MUST NOT be cleared. Their initialization
;   is done in USB reconnect subroutine(USB_Reconnect:).
;Date: 06-18-2002
;1. Clear the last byte in USB buffer after get a packet from USB port.(USB_EP2_OUTPUT:)
;Date: 06-25-2002
;1. Delete handling DN2029A_GlsBK in USB_SUBROUTINE:.
;02-24-2003
;1. Change the sequence of set D12 address and send back a zero-length packet
;   in Device_Set_Address:.
;Date: 05-22-2003
;1. Change USB Endpoints descriptor: in (USBEP4InDsc:) to 10mS
;2. Get the EP2_OUTPUT second buffer data if there is data in it.
;   Add subroutine: USB_EP2_PREV_OUTPUT:.
;===============================================================================
;===============================================================================
; USB connection SETTING
;===============================================================================
USB_Reconnect:
        MOV     USB_Packet_Buffer,#SET_EMB_MODE;0F3H: set USB mode
        MOV     USB_Packet_Buffer+1,#06H
        MOV     USB_Packet_Buffer+2,#43H    ;12 MHZ CLOCK OUTPUT, normal interrupt mode
        ACALL   WRITE_TWO_BYTE
;-----
        MOV     USB_Packet_Buffer,#SET_EMB_DMA;0FBH: set USB DMA
        MOV     USB_Packet_Buffer+1,#00H  ;
        ACALL   WRITE_ONE_BYTE                          ;
;-----
        ACALL   DELAY_500MS                             ;wait until the chip set USB_Connect:                                            ;called in RESTART_D12:
        MOV     EMB_STATUS,#0                           ;bus-powered
        MOV     EMB_ADDR,#00H                           ;default address
;-----
        MOV     USB_Packet_Buffer,#SET_EMB_MODE;0F3H, RECONNECT SOFTCONNECT
        MOV     USB_Packet_Buffer+1,#3EH  ;3CH     ;INITIALIZE D12 as interrupt pipe work
        MOV     USB_Packet_Buffer+2,#43H  ;12 MHZ CLOCK OUTPUT, normal interrupt mode
        ACALL   WRITE_TWO_BYTE mov     display_buf_pt_reg,#USB_Packet_Buffer+DISPLAY_BUF_LEN
USB_Init_Var:
        dec     display_buf_pt_reg          ;Clear USB buffer
        mov     @display_buf_pt_reg,#0
        cjne    display_buf_pt_reg,#USB_Packet_Buffer,USB_Init_Var MOV     USB_DATA_Cnt,#0
        MOV     USB_Data_Len,#0

RET
;===============================================================================
;===============================================================================
DELAY_500MS:
        MOV     USB_Gene_Cnt,#250                       ;100
;-----
DELAY_5MS:

LCALL   Glass_Scanning

DJNZ    USB_Gene_Cnt,DELAY_5MS
```

```
        RET
;================================================================================
;send a string in (DPTR)&(EMB_BYTE_TO_SEND) to I2C buffer
;================================================================================
SEND_TO_HOST:
        MOV     A,@USB_Rel_R0           ;SEND DATA LENGTH(EMB_BYTE_TO_SEND)
        CLR     C                       ;R0 = BYTE_TO_SEND
        SUBB    A,#USB_EP0_SIZE
        JNC     SEND_TO_HOST1
        MOV     A,@USB_Rel_R0           ;(EMB_BYTE_TO_SEND)
        MOV     USB_Pack_Len,A          ;NUMBER BYTES TO SEND
        ADD     A,#2
        MOV     RW_COUNTER,A            ;TOTAL BYTES TO SEND
        MOV     EMB_BYTE_TO_SEND,#0     ;REMAIN BYTES TO SEND
        AJMP    SEND_TO_HOST2
;-----
SEND_TO_HOST1:
        MOV     EMB_BYTE_TO_SEND,A      ;REMAIN BYTES
        MOV     USB_Pack_Len,#USB_EP0_SIZE
        MOV     RW_COUNTER,#USB_EP0_SIZE+2 ;TOTAL BYTES TO SEND
;-----
SEND_TO_HOST2:
        MOV     USB_Packet_Buffer,#WRITE_BUFFER ;F0H, COMMAND
        MOV     USB_Packet_Buffer+1,#0  ;FIRST BYTE SHOULD BE ZERO
        MOV     USB_Packet_Buffer+2,USB_Pack_Len ;DATA LENGTH
;---
        MOV     USB_Rel_R0,#USB_Packet_Buffer+3
;---
SEND_TO_HOST3:
        CLR     A
        MOVC    A,@A+DPTR
        MOV     @USB_Rel_R0,A           ;fill data into buffer
        INC     USB_Rel_R0
        INC     DPTR
        DJNZ    USB_Pack_Len,SEND_TO_HOST3
;---
        MOV     EMB_MSG_DPH,DPH         ;save the current position
        MOV     EMB_MSG_DPL,DPL
;---
        ACALL   WRITE_N_BYTE            ;write into I2C buffer
;---
        RET
;================================================================================
;================================================================================
SEND_ZERO_PACKET:
        MOV     EMB_BYTE_TO_SEND,#0
        MOV     A,#SEL_EPT_EP1_IN       ;01H, select EP#0 IN endpoint
        LCALL   Outportb_Cmd
;---
        MOV     USB_Packet_Buffer,#WRITE_BUFFER ;F0H
        MOV     USB_Packet_Buffer+1,#0
        MOV     USB_Packet_Buffer+2,#0
        MOV     USB_Packet_Buffer+3,#0
        ACALL   WRITE_THREE_BYTE
        RET
;================================================================================
;================================================================================
INT_WRITE_N_BYTE:                       ;INTERRUPT PIPE TO HOST
        MOV     A,#SEL_EPT_EP3_IN       ;003H, SELECT EMB EP#0 IN(endpoint3)
        LCALL   Outportb_Cmd MOV     USB_Packet_Buffer,#WRITE_BUFFER
;--------                               ;WRITE COMMAND
        SETB    d12_ADDR                ;select command address
        MOV     CNT_BYTE,#1             ;NUMBER OF BYTES TO BE SENT
        LCALL   WRITE_d11_POINT         ;READ 1 BYTES
;--------                               ;WRITE DATA
        CLR     d12_ADDR                ;select data address
        MOV     CNT_BYTE,RW_COUNTER
        LCALL   WRITE_d11
;----
        MOV     A,#VALIDATE_BUF         ;0FAH,READY DATA TO SEND
        LCALL   Outportb_Cmd
;---
INT_RET:
```

```
        RET
;================================================================================
;================================================================================
WRITE_NINE_BYTE:
        MOV     RW_COUNTER,#9
        AJMP    WRITE_TO_d11
;================================================================================
WRITE_SIX_BYTE:
        MOV     RW_COUNTER,#6
WRITE_N_BYTE:
        AJMP    WRITE_TO_d11
;================================================================================
WRITE_THREE_BYTE:
        MOV     RW_COUNTER,#3
        AJMP    WRITE_TO_d11
;================================================================================
WRITE_FOUR_BYTE:
        MOV     RW_COUNTER,#4
        AJMP    WRITE_TO_d11
;================================================================================
WRITE_TWO_BYTE:
        MOV     RW_COUNTER,#2
        AJMP    WRITE_TO_d11
;================================================================================
WRITE_ONE_BYTE:
        MOV     RW_COUNTER,#1
        AJMP    WRITE_TO_d11
;================================================================================
;================================================================================
;================================================================================
;================================================================================
;================================================================================
;Inportb_Data: get a byte from D12 data bus
;Output: (A)
;================================================================================
Inportb_Data:
        CLR     d12_ADDR                ;select data address
        CLR     d12_RD
        NOP
        MOV     A,P1                    ;RECEIVE A DATA BYTE
        SETB    d12_RD
        RET
;================================================================================
;Outportb_Data: Send a byte to D12 data bus
;Input: (A)
;================================================================================
Outportb_Data:
        CLR     d12_ADDR                ;select data address
        MOV     P1,A                    ;SEND a DATA BYTE.
        CLR     d12_WR
        NOP
        SETB    d12_WR
        RET
;================================================================================
;Outportb_Cmd: Send a command byte to D12 command bus
;Input: (A)
;================================================================================
Outportb_Cmd:
        SETB    d12_ADDR                ;select command address
        MOV     P1,A                    ;SEND a command BYTE.
        CLR     d12_WR
        NOP
        SETB    d12_WR
        RET
;================================================================================
;Receive_N_Bytes_D12: Receive (N) bytes from D12 data bus
;Input: (RW_COUNTER)=N
;Output: (USB_Packet_Buffer)=bytes
;Used: A, USB_Rel_R0(bank1), BYTE_CNT
;================================================================================
Receive_N_Bytes_D12:
        CLR     d12_ADDR                ;select data address
        MOV     USB_Rel_R0,#USB_Packet_Buffer   ;SET FIRST RECEIVE DATA BUFFER ADDRESS
        MOV     BYTE_CNT,RW_COUNTER
```

```
Receive_N_Bytes_LOOP:
        CLR     d12_RD
        NOP
        MOV     A,P1                            ;RECEIVE A DATA BYTE
        SETB    d12_RD
        MOV     @USB_Rel_R0,A                   ;PUT RECEIVED DATA TO BUFFER
        INC     USB_Rel_R0                      ;PREPARE NEXT BYTE
        DJNZ    BYTE_CNT,Receive_N_Bytes_LOOP   ;REPEAT UNTIL ALL BYTES RECEIVED
        RET
;================================================================================
;Transmit_N_Bytes_D12: Transmit (N) bytes in (USB_Packet_Buffer) to D12 bus
;Input: (RW_COUNTER)=N, (USB_Packet_Buffer)=bytes
;Used: A, USB_Rel_R0(bank1), BYTE_CNT
;================================================================================
Transmit_N_Bytes_D12:
        CLR     d12_ADDR                        ;select data address
        MOV     USB_Rel_R0,#USB_Packet_Buffer   ;SET FIRST RECEIVE DATA BUFFER ADDRESS
        MOV     BYTE_CNT,RW_COUNTER
Transmit_N_Bytes_LOOP:
        MOV     A,@USB_Rel_R0                   ;Get a byte from buffer
        MOV     P1,A                            ;SEND a DATA BYTE.
        CLR     d12_WR
        NOP
        SETB    d12_WR
        INC     USB_Rel_R0                      ;PREPARE NEXT BYTE
        DJNZ    BYTE_CNT,Transmit_N_Bytes_LOOP  ;REPEAT UNTIL ALL BYTES RECEIVED
        RET
;================================================================================
; WRITE DATA INTO ENDPOINT 0 INPUT
;================================================================================
WRITE_TO_d11:
        CLR     VALIDATE_FLAG                   ;IS WRITE BUFFER COMMAND?
        MOV     A,USB_Packet_Buffer
        XRL     A,#WRITE_BUFFER
        JNZ     WRITE_TO_d11_1
        SETB    VALIDATE_FLAG
;
        MOV     A,#SEL_EPT_EP1_IN               ;01H, select EP#0 IN endpoint
        LCALL   Outportb_Cmd MOV     USB_Packet_Buffer,#WRITE_BUFFER
;----------
WRITE_TO_d11_1:                                 ;WRITE COMMAND
        SETB    d12_ADDR                        ;select command address
        MOV     CNT_BYTE,#1                     ;NUMBER OF BYTES TO BE SENT
        ACALL   WRITE_d11_POINT                 ;READ 1 BYTES
;----------                                     ;WRITE DATA
        CLR     d12_ADDR                        ;select data address
        MOV     CNT_BYTE,RW_COUNTER
        ACALL   WRITE_d11
;---
        JNB     VALIDATE_FLAG,WRITE_RET         ;ONLY WRITE BUFFER NEED VALIDATE BUFFER
        MOV     A,#VALIDATE_BUF                 ;0FAH, READY DATA TO SEND
        LCALL   Outportb_Cmd
;---
WRITE_RET:
        RET
;================================================================================
;================================================================================
WRITE_d11_POINT:
        MOV     USB_Rel_R0,#USB_Packet_Buffer   ;SET FIRST RECEIVE DATA BUFFER ADDRESS
WRITE_d11:
        MOV     BYTE_CNT,CNT_BYTE
;---
WRITE_DATA_LOOP:
;---
        MOV     A,@USB_Rel_R0                   ;GET DATA BYTE FROM BUFFER.
        MOV     P1,A                            ;SEND NEXT DATA BYTE.
        CLR     d12_WR
        NOP
        SETB    d12_WR
        INC     USB_Rel_R0                      ;ADVANCE BUFFER POINTER.
        DJNZ    BYTE_CNT,WRITE_DATA_LOOP        ;ALL BYTES SENT?
        RET
;================================================================================
```

```
;================================================================================
USB_SUBROUTINE:
        JNB     d12_INT_PORT,USB_INT_Proc;wait for USB interrupt
        LJMP    USB_EP2_PREV_OUTPUT     ; check if there data in another buffer of EP2_OUTPUT
;----
USB_INT_Proc:
        MOV     A,#READ_EMB_INT                 ;0F4H, READ INTERRUPT REGISTER
        LCALL   Outportb_Cmd
        LCALL   Inportb_Data            ;Interrupt register byte 1
;-----
        JB      ACC.0,USB_EP0_OUTPUT_P          ;EP#0 Control Output Endpoint(index0)
        JB      ACC.1,USB_EP0_INPUT_P   ;EP#0 Control In Endpoint(index1)
        JB      ACC.2,USB_EP1_OUTPUT_P          ;EP#1 Generic Out Endpoint(index2)
        JB      ACC.3,USB_EP1_INPUT_P   ;EP#1 Generic In Endpoint(index3)
        JB      ACC.4,USB_EP2_OUTPUT_P          ;EP#2 Generic Out Endpoint(index4)
        JB      ACC.5,USB_EP2_INPUT_P   ;EP#2 Generic In Endpoint (index5)
;----
USB__BUS_RESET:
        JB      ACC.6,RESTART_D12               ;BUS reset
d11_RET:
        RET
;----
USB_EP0_OUTPUT_P:
        LJMP    USB_EP0_OUTPUT
USB_EP0_INPUT_P:
        LJMP    USB_EP0_INPUT
USB_EP1_OUTPUT_P:
        LJMP    USB__BUS_RESET
USB_EP1_INPUT_P:
        LJMP    USB_EP1_INPUT
USB_EP2_OUTPUT_P:
        LJMP    USB_EP2_OUTPUT
USB_EP2_INPUT_P:
        LJMP    USB_EP2_INPUT
;================================================================================
RESTART_D12:
        MOV     USB_Packet_Buffer,#SET_EMB_ADDRESS_EN;0D0H, ENABLE EMBED ADDRESS
        MOV     USB_Packet_Buffer+1,#080H ;default address=0
        ACALL   WRITE_ONE_BYTE
;--
        MOV     USB_Packet_Buffer,#SET_EPOINT_EN;0D8H, ENABLE INTERRUPT ENDPOINT
        MOV     USB_Packet_Buffer+1,#01H
        ACALL   WRITE_ONE_BYTE
;--
        ACALL   USB_Connect
        RET
;================================================================================
;       EP#0 IN(Endpoint1) send a string to Host
;================================================================================
USB_EP0_INPUT:
        MOV     A,#READ_LAST_EP1_IN_ST          ;41H, clear int reg and signaling at int pin
        LCALL   Outportb_Cmd
        LCALL   Inportb_Data
;------
        MOV     A,#SEL_EPT_EP1_IN               ;01H, select EP#0 IN endpoint
        LCALL   Outportb_Cmd
        LCALL   Inportb_Data
        ANL     A,#00000001B                    ;if IS BUFFER EMPTY?
        JNZ     USB_EP0_INPUT_RET
;------
        MOV     USB_Rel_R0,#EMB_BYTE_TO_SEND
        MOV     A,@USB_Rel_R0
        JZ      USB_EP0_INPUT_RET               ;if the length of the string = 0?
        MOV     DPH,EMB_MSG_DPH                 ;No, assign the current position into
DPTR
        MOV     DPL,EMB_MSG_DPL
        ACALL   SEND_TO_HOST
USB_EP0_INPUT_RET:
        RET
;================================================================================
;       EP#0 OUT(Endpoint0) Receive a packet from Host
;================================================================================
USB_EP0_OUTPUT:
        MOV     A,#READ_LAST_EP0_OUT_ST         ;040H, clr int reg and signaling at int pin
        LCALL   Outportb_Cmd
```

```
            LCALL   Inportb_Data
            ANL     A,#00100000B
            JNZ     EMB_READ_DATA_Packet        ;if the packet with a SETUP token?
            MOV     A,#SEL_EPT_EP0_OUT          ;00H,
            LCALL   Outportb_Cmd
            LCALL   Inportb_Data
            ANL     A,#00000001B
            JNZ     CHK_NON_SETUP_REQ           ;if the buffer is full?
                                                ;No.
                                                ;NO TOKEN COMING, MAYBE OUT TOKEN
            RET
;---Processing OUT Token Non-SETUP request
CHK_NON_SETUP_REQ:
;---get the packet
            MOV     A,#SEL_EPT_EP0_OUT          ;00H, select EP#0 OUT endpoint
            LCALL   Outportb_Cmd MOV     A,#READ_BUFFER              ;0F0H, read FIFO buffer(10 bytes)
            LCALL   Outportb_Cmd
            MOV     RW_COUNTER,#10
            LCALL   Receive_N_Bytes_D12

MOV     A,#CLEAR_BUF                ;F2H, release fifo
            LCALL   Outportb_Cmd
;----
;---used for testing
            MOV     A,USB_Packet_Buffer+1       ;READ TOTAL HOW MANY BYTES
            JZ      CHK_NON_SETUP_REQ1
            NOP
CHK_NON_SETUP_REQ1:
            NOP
            RET
;================================================================================
;---Get the request packet
EMB_READ_DATA_Packet:
;----
            MOV     A,#READ_BUFFER              ;0F0H, read FIFO buffer(10 bytes)
            LCALL   Outportb_Cmd
            MOV     RW_COUNTER,#10
            LCALL   Receive_N_Bytes_D12
;---
            MOV     A,#CLEAR_BUF                ;F2H, release fifo
            LCALL   Outportb_Cmd
;----
            MOV     A,USB_Packet_Buffer+1                   ;READ TOTAL HOW MANY BYTES
            CJNE    A,#8,Wrong_Request_Ret                  ;NOT CORRECT COMMAND FROM HOST
;---Assign the request data into registers
            MOV     USB_Req_Type,USB_Packet_Buffer+USB_OFFSET_bmReqTyp      ; 1 byte
            MOV     USB_Req_Code,USB_Packet_Buffer+USB_OFFSET_bmReq                     ; 1 byte
            MOV     USB_Req_Value,USB_Packet_Buffer+USB_OFFSET_wValue       ; 2 bytes
            MOV     USB_Req_Index,USB_Packet_Buffer+USB_OFFSET_wIndex       ; 2 bytes
            MOV     USB_Req_Len,USB_Packet_Buffer+USB_OFFSET_wLength        ; 2 bytes
;----
            MOV     A,#SEL_EPT_EP1_IN           ;01H, select EP#0 IN endpoint
            LCALL   Outportb_Cmd MOV     A,#ACK_SETUP                ;to ack it
            LCALL   Outportb_Cmd
;----
            MOV     A,#SEL_EPT_EP0_OUT          ;00H, select EP#0 OUT endpoint
            LCALL   Outportb_Cmd MOV     A,#ACK_SETUP                ;to ack it
            LCALL   Outportb_Cmd
;---Detect if the request is correct or not.
            MOV     A,USB_Req_Type              ; bmReqTyp
            ANL     A,#80H
            JNZ     EMB_DECODE_REQUEST  ;Device_To_Host
            MOV     A,USB_Packet_Buffer+USB_OFFSET_wLength+1; 2 bytes
            ORL     A,USB_Packet_Buffer+USB_OFFSET_wLength
            JZ      EMB_DECODE_REQUEST  ;(wLength)=0?
            CJNE    USB_Req_Len,#09,$+3
            JNC     Wrong_Request_Ret           ;(wLength)>8?
            MOV     A,USB_Packet_Buffer+USB_OFFSET_wLength+1; 2 bytes
            JNZ     Wrong_Request_Ret
```

```
                RET                             ;USB_RECEIVE

;----
EMB_DECODE_REQUEST:
        MOV     A,USB_Req_Type          ; bmReqTyp
        ANL     A,#01111111B            ;check recipient code: 0-2
        CJNE    A,#03,$+3
        JC      EMB_DECODE_REQUEST2     ;if it's standard request?
        ANL     A,#01100000B            ;check type code: 1-2
        CJNE    A,#01000000B,EMB_DECODE_REQUEST1
        MOV     A,#04                   ;Request[6]=1: Vendor request
        AJMP    EMB_DECODE_REQUEST2
EMB_DECODE_REQUEST1:
        CJNE    A,#00100000B,Wrong_Request_Ret
        MOV     A,#03                   ;Request[5]=1: Class request EMB_DECODE_REQUEST2:                    ;0-deivce,1-interface,2-endpoint,3-class,4-vendor
;---Cal. index of Request_Table
        SWAP    A
        MOV     B,A MOV     A,USB_Req_Code          ; bmReqCode
        ANL     A,#00001111B            ; request code: 0-12
        ORL     A,B
        RL      A                       ;AJMP used
        MOV     DPTR,#Request_Table
        JMP     @A+DPTR                 ;execute a command
;----
Wrong_Request_Ret:
        AJMP    STALL_EP0
;================================================================================
Request_Table:
;---First 16 requests are for the Device
        AJMP Device_Get_Status          ;0
        AJMP Device_Clear_Feature       ;1
        AJMP Invalid_Req                ;2
        AJMP Device_Set_Feature         ;3
        AJMP Invalid_Req                ;4
        AJMP Device_Set_Address         ;5
        AJMP Get_Descriptor             ;6
        AJMP Set_Descriptor             ;7
        AJMP Get_Configuration          ;8
        AJMP Set_Configuration          ;9
        AJMP Invalid_Req                ;10
        AJMP Invalid_Req                ;11
        AJMP Invalid_Req                ;12
        AJMP Invalid_Req                ;13
        AJMP Invalid_Req                ;14
        AJMP Invalid_Req                ;15
;---Next 16 requests are for the Interface
        AJMP Interface_Get_Status       ;0
        AJMP Interface_Clear_Feature    ;1
        AJMP Invalid_Req                ;2
        AJMP Interface_Set_Feature      ;3
        AJMP Invalid_Req                ;4
        AJMP Invalid_Req                ;5
        AJMP Get_Class_Descriptor       ;6
        AJMP Set_Class_Descriptor       ;7
        AJMP Invalid_Req                ;8
        AJMP Invalid_Req                ;9
        AJMP Get_Interface              ;10
        AJMP Set_Interface              ;11
        AJMP Invalid_Req                ;12
        AJMP Invalid_Req                ;13
        AJMP Invalid_Req                ;14
        AJMP Invalid_Req                ;15
;---Next 16 requests are for the Endpoint
        AJMP Endpoint_Get_Status        ;0
        AJMP Endpoint_Clear_Feature     ;1
        AJMP Invalid_Req                ;2
        AJMP Endpoint_Set_Feature       ;3
        AJMP Invalid_Req                ;4
        AJMP Invalid_Req                ;5
        AJMP Invalid_Req                ;6
        AJMP Invalid_Req                ;7
```

```
            AJMP Invalid_Req            ;8
            AJMP Invalid_Req            ;9
            AJMP Invalid_Req            ;10
            AJMP Invalid_Req            ;11
            AJMP Endpoint_Sync_Frame ;12
            AJMP Invalid_Req            ;13
            AJMP Invalid_Req            ;14
            AJMP Invalid_Req            ;15
;---Next 16 requests are Class Requests
            AJMP Invalid_Req            ;0
            AJMP Invalid_Req            ;1
            AJMP Invalid_Req            ;2
            AJMP Invalid_Req            ;3
            AJMP Invalid_Req            ;4
            AJMP Invalid_Req            ;5
            AJMP Invalid_Req            ;6
            AJMP Invalid_Req            ;7
            AJMP Invalid_Req            ;8
            AJMP Invalid_Req            ;9
            AJMP Invalid_Req            ;10
            AJMP Invalid_Req            ;11
            AJMP Invalid_Req            ;12
            AJMP Invalid_Req            ;13
            AJMP Invalid_Req            ;14
            AJMP Invalid_Req            ;15
;---Next 16 requests are Vendor Requests
            AJMP Invalid_Req            ;0
            AJMP Invalid_Req            ;1
            AJMP Invalid_Req            ;2
            AJMP Invalid_Req            ;3
            AJMP Invalid_Req            ;4
            AJMP Invalid_Req            ;5
            AJMP Invalid_Req            ;6
            AJMP Invalid_Req            ;7
            AJMP Invalid_Req            ;8
            AJMP Invalid_Req            ;9
            AJMP Invalid_Req            ;10
            AJMP Invalid_Req            ;11
            AJMP Invalid_Req            ;12
            AJMP Invalid_Req            ;13
            AJMP Invalid_Req            ;14
            AJMP Invalid_Req            ;15
;==============================================================================
;All request service subroutines
;==============================================================================
;---Many requests are INVALID for this example
Set_Descriptor:                 ; Our Descriptors are static
Set_Class_Descriptor:           ; Our Descriptors are static
Get_Class_Descriptor:
;---
Set_Interface:                  ; We only have one Interface
Interface_Set_Feature:          ; We have no features that can be set or cleared
Interface_Clear_Feature:        ; We have no features that can be set or cleared
Endpoint_Sync_Frame:            ; We are not an Isonchronous device
;---
Invalid_Req:                    ; Invalid Request made, STALL the Endpoint
;---STALL the Endpoints EP#0 IN and EP#0 OUT
STALL_EP0:
            MOV    USB_Packet_Buffer,#SET_EMBF_EP1_IN_ST;41H, STALL ctrl IN
            MOV    USB_Packet_Buffer+1,#01H
            ACALL  WRITE_ONE_BYTE MOV    USB_Packet_Buffer,#SET_EMBF_EP0_OUT_ST;40H, STALL ctrl OUT
            MOV    USB_Packet_Buffer+1,#01H
            ACALL  WRITE_ONE_BYTE RET
;==============================================================================
;---Device Requests subroutines
;==============================================================================
Device_Get_Status:
            MOV    USB_Packet_Buffer,#WRITE_BUFFER  ;F0H
            MOV    USB_Packet_Buffer+1,#0
            MOV    USB_Packet_Buffer+2,#2   ;return 2 byte status
            MOV    USB_Packet_Buffer+3,#0
```

```
                MOV     USB_Packet_Buffer+4,#0
                MOV     A,EMB_STATUS
                ANL     A,#00000011B
                MOV     USB_Packet_Buffer+3,A       ;STATUS OF BUS-POWER AND DISABLE REMOTE WAKEUP
                LJMP    WRITE_FOUR_BYTE             ;WRITE FOUR BYTES TO D11
;---------
Device_Clear_Feature:
                CLR     EMB_REMOTE_WAKE
                MOV     USB_Packet_Buffer,#SET_EMB_MODE;#0F3H
                MOV     USB_Packet_Buffer+1,#3EH  ;3CH    ;INITIALIZE D12 as interrupt pipe work
                MOV     USB_Packet_Buffer+2,#43H  ;12 MHZ CLOCK OUTPUT, normal interrupt mode
                ACALL   WRITE_TWO_BYTE LJMP    SEND_ZERO_PACKET
;---------
Device_Set_Feature:
                CLR     EMB_REMOTE_WAKE
                MOV     USB_Packet_Buffer,#SET_EMB_MODE;0F3H, RECONNECT SOFTCONNECT
                MOV     USB_Packet_Buffer+1,#3EH  ;3CH    ;INITIALIZE D12 as interrupt pipe work
                MOV     USB_Packet_Buffer+2,#43H  ;12 MHZ CLOCK OUTPUT, normal interrupt mode
                ACALL   WRITE_TWO_BYTE
                LJMP    SEND_ZERO_PACKET
;------
Device_Set_Address:
                MOV     A;USB_Req_Value
                ORL     A,#080H
                MOV     EMB_ADDR,A                  ;USB_Packet_Buffer+USB_OFFSET_wValue
;---
SET_EMB_ADDR:
                MOV     USB_Packet_Buffer,#SET_EMB_ADDRESS_EN;0D0H, WRITE NEW ADDRESS TO HUB
                MOV     USB_Packet_Buffer+1,EMB_ADDR
                ACALL   WRITE_ONE_BYTE
;---
                MOV     A,#READ_LAST_EP1_IN_ST      ;41H, clear int reg and signaling at int pin
                LCALL   Outportb_Cmd
                LCALL   Inportb_Data
;---
                ACALL   SEND_ZERO_PACKET
                RET
;---------
;----Get descriptor of device, string, configuration
Get_Descriptor:
        :       MOV     A,USB_Req_Value             ;USB_Packet_Buffer+USB_OFFSET_wValue
        ;       JNZ     STALL_EP02                  ;(R4) is used in String Descriptor MOV     A,USB_Packet_Buffer+USB_OFFSET_wValue+1;Index of descriptors
EMB_CHK_DEV_DESC:
                CJNE    A,#01,EMB_CHK_CONF_DESC
                MOV     DPTR,#USBDvcDsc             ;Device descriptor(18 bytes)
                MOV     USB_Rel_R0,#USB_Packet_Buffer+USB_OFFSET_wLength;get device's descriptor length
                INC     USB_Rel_R0
                MOV     A,@USB_Rel_R0               ;length(high byte)
                JNZ     EMB_CHK_DEV_DESC1
                DEC     USB_Rel_R0
                MOV     A,@USB_Rel_R0               ;length(lower byte)
                CLR     C
                SUBB    A,#18
                JC      SEND_DESCRIPTOR             ;
EMB_CHK_DEV_DESC1:
                MOV     @USB_Rel_R0,#18             ;IF HOST ISSUE OVER 18 BYTES, send 18 bytes only
                AJMP    SEND_DESCRIPTOR
;---
EMB_CHK_CONF_DESC:
                CJNE    A,#02,EMB_CHK_STRING_DESC
                MOV     DPTR,#USBCnfDsc             ;Configuration descriptor
                MOV     USB_Rel_R0,#USB_Packet_Buffer+USB_OFFSET_wLength
                INC     USB_Rel_R0                  ;IF OVER 256 BYTES
                MOV     A,@USB_Rel_R0               ;length(high byte)
                JNZ     EMB_CHK_CONF_DESC1
                DEC     USB_Rel_R0
                MOV     A,@USB_Rel_R0               ;length(lower byte)
                CLR     C
;;;             SUBB    A,#25
                SUBB    A,#USBCNF_lngh
                JC      SEND_DESCRIPTOR
```

```
EMB_CHK_CONF_DESC1:
        MOV     @USB_Rel_R0,#USBCNF_lngh        ;IF HOST ISSUE OVER 34 BYTES, send 34 bytes only
;---
SEND_DESCRIPTOR:
        AJMP    SEND_TO_HOST
;---
EMB_CHK_STRING_DESC:
        CJNE    A,#03,STALL_EP02
        MOV     A,USB_Req_Value                 ;index of string descriptors
        JZ      LANG_ID                         ;iLANGID[n]=0
        dec     a
        jz      manu_desc                       ;iManufactor=1
        dec     a
        jz      prod_desc                       ;iProduct=2
        dec     a
        jz      seri_desc                       ;iSerialNum=3
        AJMP    STALL_EP0                       ;no support configuration string and interface string
;---
LANG_ID:                                        ;language ID string
        MOV     DPTR,#USBString0
        MOV     USB_Rel_R0,#USB_Packet_Buffer+USB_OFFSET_wLength
        INC     USB_Rel_R0
        MOV     A,@USB_Rel_R0                   ;length(high byte)
        JNZ     LANG_ID1
        DEC     USB_Rel_R0
        MOV     A,@USB_Rel_R0                   ;length(lower byte)
        CLR     C
        SUBB    A,#04
        JC      SEND_DESCRIPTOR
LANG_ID1:
        MOV     @USB_Rel_R0,#04                 ;IF HOST ISSUE OVER 4 BYTES, send 4 bytes only
        AJMP    SEND_DESCRIPTOR
;---
MANU_DESC:                                      ;manufacturer string
        MOV     DPTR,#USBString1
        MOV     USB_Rel_R0,#USB_Packet_Buffer+USB_OFFSET_wLength
        INC     USB_Rel_R0
        MOV     A,@USB_Rel_R0                   ;length(high byte)
        JNZ     MANU_DESC1
        DEC     USB_Rel_R0
        MOV     A,@USB_Rel_R0                   ;length(lower byte)
        CLR     C
        SUBB    A,#manu_len
        JC      SEND_DESCRIPTOR
MANU_DESC1:
        MOV     @USB_Rel_R0,#manu_len           ;IF HOST ISSUE OVER #manu_len BYTES,
        AJMP    SEND_DESCRIPTOR                 ; send #manu_len bytes only
;---
PROD_DESC:
        MOV     DPTR,#USBString2                ;Product string
        MOV     USB_Rel_R0,#USB_Packet_Buffer+USB_OFFSET_wLength
        INC     USB_Rel_R0
        MOV     A,@USB_Rel_R0                   ;length(high byte)
        JNZ     PROD_DESC1
        DEC     USB_Rel_R0
        MOV     A,@USB_Rel_R0                   ;length(lower byte)
        CLR     C
        SUBB    A,#prod_len
        JC      SEND_DESCRIPTOR
PROD_DESC1:
        MOV     @USB_Rel_R0,#prod_len           ;IF HOST ISSUE OVER #prod_len BYTES
        AJMP    SEND_DESCRIPTOR                 ; send #prod_len bytes only
;---
SERI_DESC:
        MOV     DPTR,#USBString3                ;Series string
        MOV     USB_Rel_R0,#USB_Packet_Buffer+USB_OFFSET_wLength
        INC     USB_Rel_R0
        MOV     A,@USB_Rel_R0                   ;length(high byte)
        JNZ     SERI_DESC1
        DEC     USB_Rel_R0
        MOV     A,@USB_Rel_R0                   ;length(lower byte)
        CLR     C
        SUBB    A,#6
        JC      SEND_DESCRIPTOR
```

```
SERI_DESC1:
        MOV     @USB_Rel_R0,#6                  ;IF HOST ISSUE OVER 6 BYTES, send 6 bytes only
        AJMP    SEND_DESCRIPTOR
;---
SEND_DESCRIPTOR1:
        AJMP    SEND_TO_HOST
STALL_EP02:
        AJMP    STALL_EP0
;-------
Get_Configuration:
        MOV     USB_Packet_Buffer,#WRITE_BUFFER  ;WRITE BUFFER COMMAND
        MOV     USB_Packet_Buffer+1,#0
        MOV     USB_Packet_Buffer+2,#1
        MOV     USB_Packet_Buffer+3,#0
        JB      EMB_CONFIG,EMB_HAD_CONFIG
EMB_GET_CONFIG_1:
        ACALL   WRITE_THREE_BYTE
        RET
EMB_HAD_CONFIG:
        MOV     USB_Packet_Buffer+3,#1           ;the device has been configured
        AJMP    EMB_GET_CONFIG_1
;-------
Set_Configuration:
        CLR     EMB_EPT0_IN_STALL                ;UNSTALLED
        CLR     EMB_EPT1_OUT_STALL
        CLR     EMB_EPT1_IN_STALL
        CLR     EMB_EPT2_OUT_STALL
        CLR     EMB_EPT2_IN_STALL
;---
        MOV     A,USB_Req_Value
        JZ      EMB_DISABLE_CONFIG
        CJNE    A,#1,STALL_EP03                  ;WRONG_SET_CONFIG?
        SETB    EMB_CONFIG
        MOV     USB_Packet_Buffer,#SET_EPOINT_EN;0D8H, enable interrupt endpoint
        MOV     USB_Packet_Buffer+1,#01h         ;enable the function generic endpoints
        ACALL   WRITE_ONE_BYTE
;---
EMB_SET_CONFIG_1:
        ACALL   SEND_ZERO_PACKET
        RET
;---
EMB_DISABLE_CONFIG:
        CLR     EMB_CONFIG
        AJMP    EMB_SET_CONFIG_1

STALL_EP03:
        LJMP    STALL_EP0
;================================================================================
;---Interface Request subroutines
;================================================================================
Interface_Get_Status:
        MOV     USB_Packet_Buffer,#WRITE_BUFFER  ;F0H
        MOV     USB_Packet_Buffer+1,#0
        MOV     USB_Packet_Buffer+2,#2           ;return 2 byte status
        MOV     USB_Packet_Buffer+3,#0
        MOV     USB_Packet_Buffer+4,#0
        AJMP    WRITE_FOUR_BYTE                  ;WRITE FOUR BYTES TO D11
;---------
Get_Interface:
        MOV     USB_Packet_Buffer,#WRITE_BUFFER  ;WRITE BUFFER COMMAND
        MOV     USB_Packet_Buffer+1,#0
        MOV     USB_Packet_Buffer+2,#1
        MOV     USB_Packet_Buffer+3,#0
        AJMP    WRITE_THREE_BYTE
;================================================================================
;---Endpoint Request subroutines
;================================================================================
Endpoint_Get_Status:
        MOV     USB_Packet_Buffer,#WRITE_BUFFER  ;F0H
        MOV     USB_Packet_Buffer+1,#0
        MOV     USB_Packet_Buffer+2,#2           ;return 2 byte status
        MOV     USB_Packet_Buffer+3,#0
        MOV     USB_Packet_Buffer+4,#0

MOV     A,USB_Req_Index                  ;endpoint number(Index)
```

```
            JZ       EMB_EPT0_OUT            ;(EP#0 OUT)Control OUT, SHOULD BE UN_STALL
            XRL      A,#080H
            JZ       EMB_EPT0_IN             ;(EP#0 IN)Control IN
            MOV      A,USB_Req_Index
            XRL      A,#081H
            JZ       EMB_EPT1_IN             ;(EP#1 IN)Interrupt IN
            MOV      A,USB_Req_Index
            XRL      A,#02H
            JZ       EMB_EPT2_OUT            ;(EP#2 OUT)Bulk OUT
            MOV      A,USB_Req_Index
            XRL      A,#082H
            JZ       EMB_EPT2_IN             ;(EP#2 IN)Bulk IN
;---
            AJMP     STALL_EP0
;---
EMB_EPT0_IN:                                 ;endpoint1
            MOV      C,EMB_EPT0_IN_STALL
RTN_EP_ST:
            CLR      A
            RLC      A
            MOV      USB_Packet_Buffer+3,A
;---
EMB_EPT0_OUT:                                ;endpoint0
            LJMP     WRITE_FOUR_BYTE         ;WRITE FOUR BYTES TO D11
;---
EMB_EPT1_IN:                                 ;endpoint3
            MOV      C,EMB_EPT1_IN_STALL
            AJMP     RTN_EP_ST
;---
EMB_EPT2_OUT:                                ;endpoint4
            MOV      C,EMB_EPT2_OUT_STALL
            AJMP     RTN_EP_ST
;---
EMB_EPT2_IN:                                 ;endpoint5
            MOV      C,EMB_EPT2_IN_STALL
            AJMP     RTN_EP_ST
;---------
Endpoint_Clear_Feature:
            MOV      A,USB_Req_Index         ;endpoint number(Index)
            JZ       EMB_CLR_EP0_OUT         ;(EP#0 OUT)Control OUT, SHOULD BE UN_STALL
            XRL      A,#080H
            JZ       EMB_CLR_EP0_IN          ;(EP#0 IN)Control IN
            MOV      A,USB_Req_Index
            XRL      A,#081H
            JZ       EMB_CLR_EP1_IN          ;(EP#1 IN)Interrupt IN
            MOV      A,USB_Req_Index
            XRL      A,#02H
            JZ       EMB_CLR_EP2_OUT         ;(EP#2 OUT)Bulk OUT
            MOV      A,USB_Req_Index
            XRL      A,#082H
            JZ       EMB_CLR_EP2_IN          ;(EP#2 IN)Bulk IN AJMP     STALL_EP0
;---
EMB_CLR_EP0_IN:                              ;Endpoint1
            CLR      EMB_EPT0_IN_STALL       ;clear ctrl IN STALL FLAG for Get_Status command
            MOV      USB_Packet_Buffer,#SET_EMBF_EP1_IN_ST    ;41H, Unstall ctrl IN(EP#0 IN)
EP_UNSTALL:
            MOV      USB_Packet_Buffer+1,#0
            ACALL    WRITE_ONE_BYTE
EMB_CLR_EP0_OUT:                             ;Endpoint0
            LCALL    SEND_ZERO_PACKET
            RET
;---
EMB_CLR_EP1_IN:                              ;endpoint3
            CLR      EMB_EPT1_IN_STALL       ;clear Bulk IN STALL FLAG for Get_Status command
            MOV      USB_Packet_Buffer,#SET_EMBF_EP3_IN_ST;43H, Unstall Bulk IN
            AJMP     EP_UNSTALL
;---
EMB_CLR_EP2_OUT:                             ;endpoint4
            CLR      EMB_EPT2_OUT_STALL      ;clear Bulk OUT STALL FLAG for Get_Status command
            MOV      USB_Packet_Buffer,#SET_EMBF_EP4_OUT_ST;44H, Unstall Bulk OUT
            AJMP     EP_UNSTALL
;---
EMB_CLR_EP2_IN:                              ;endpoint5
```

```
            CLR     EMB_EPT2_IN_STALL           ;clear Bulk IN STALL FLAG for Get_Status command
            MOV     USB_Packet_Buffer,#SET_EMBF_EP5_IN_ST;45H, Unstall Bulk OUT
            AJMP    EP_UNSTALL
;--------
Endpoint_Set_Feature:
            MOV     A,USB_Req_Index             ;endpoint number(Index)
            JZ      EMB_SET_EPT0_OUT            ;(EP#0 OUT)Control OUT, SHOULD BE UN_STALL
            XRL     A,#080H
            JZ      EMB_SET_EPT0_IN             ;(EP#0 IN)Control IN
            MOV     A,USB_Req_Index
            XRL     A,#081H
            JZ      EMB_SET_EPT1_IN             ;(EP#1 IN)Interrupt IN
            MOV     A,USB_Req_Index
            XRL     A,#02H
            JZ      EMB_SET_EPT2_OUT            ;(EP#2 OUT)Bulk OUT
            MOV     A,USB_Req_Index
            XRL     A,#082H
            JZ      EMB_SET_EPT2_IN             ;(EP#2 IN)Bulk IN

AJMP    STALL_EP0

EMB_SET_EPT0_IN:                                ;Endpoint1
            SETB    EMB_EPT0_IN_STALL           ;set ctrl IN STALL FLAG for Get_Status command
            MOV     USB_Packet_Buffer,#SET_EMBF_EP1_IN_ST   ;41H, Stall ctrl IN
EP_STALL:
            MOV     USB_Packet_Buffer+1,#1
            ACALL   WRITE_ONE_BYTE
EMB_SET_EPT0_OUT:                               ;Endpoint0
            LCALL   SEND_ZERO_PACKET
            RET
;---
EMB_SET_EPT1_IN:                                ;endpoint3
            SETB    EMB_EPT1_IN_STALL           ;set Interrupt IN STALL FLAG for Get_Status command
            MOV     USB_Packet_Buffer,#SET_EMBF_EP3_IN_ST;43H, Stall Bulk IN
            AJMP    EP_STALL
;---
EMB_SET_EPT2_OUT:                               ;endpoint4
            SETB    EMB_EPT2_OUT_STALL          ;set Bulk OUT STALL FLAG for Get_Status command
            MOV     USB_Packet_Buffer,#SET_EMBF_EP4_OUT_ST;44H, Stall Bulk OUT
            AJMP    EP_STALL
;---
EMB_SET_EPT2_IN:                                ;endpoint5
            SETB    EMB_EPT2_IN_STALL           ;set Bulk OUT STALL FLAG for Get_Status command
            MOV     USB_Packet_Buffer,#SET_EMBF_EP5_IN_ST;45H, Stall Bulk OUT
            AJMP    EP_STALL
;=================================================================================
;---Class request subroutines
;=================================================================================

;=================================================================================
;---Vender class request subroutines
;=================================================================================
Vendor_Req1:
            AJMP    EP_STALL
;=================================================================================
;USB_EP1_INPUT: EP#1 IN(Endpoint3)Translate ASCII codes to USB codes, and
;       send them to host USB port when (USB_EP1_DATA_RDY)=1(Interrupt Pipe)
;Input: (USB_EP1_DATA_RDY)=1: ASCII code data is OK.
;=================================================================================
USB_EP1_INPUT:
            jb      USB_EP1_DATA_RDY,EP4_INT_Proc
USB_EP1_INPUT_RET:                              ;ASCII data is not ready yet.
            RET
;
EP4_INT_Proc:
            MOV     A,#READ_LAST_EP3_IN_ST ;043H
            LCALL   Outportb_Cmd
            LCALL   Inportb_Data
;-----
            MOV     A,#SEL_EPT_EP3_IN           ;003H
            LCALL   Outportb_Cmd
            LCALL   Inportb_Data
            ANL     A,#00000001B                ;IS BUFFER EMPTY?
            JNZ     USB_EP1_INPUT_RET           ;not empty, return
;-----
```

```
            MOV     RW_COUNTER,#0CH                    ;TOTAL BYTES TO SEND = data length + 2
            mov     USB_Rel_R0,#USB_Packet_Buffer      ;fill 10 byte data
            mov     USB_Gene_Cnt,#10                   ;all zero
EP4_DATA_FILL:
            inc     USB_Rel_R0
            mov     @USB_Rel_R0,#0
            djnz    USB_Gene_Cnt,EP4_DATA_FILL
;----
            MOV     USB_Packet_Buffer+1,#01    ;(1 byte)the number of characters
            MOV     USB_Packet_Buffer+2,#31H;1 character MOV     RW_COUNTER,#10
            LJMP    USB_WRITE_EP_DATA                  ;send a data packet to host
;================================================================================
;USB_EP2_OUTPUT:
;================================================================================
USB_EP2_OUTPUT:
            MOV     A,#READ_LAST_EP4_OUT_ST            ;044H
            LCALL   Outportb_Cmd
            LCALL   Inportb_Data
;-----
USB_EP2_OUTPUT1:
            MOV     A,#SEL_EPT_EP4_OUT                 ;004H
            LCALL   Outportb_Cmd
            LCALL   Inportb_Data
            ANL     A,#00000001B
            JNZ     USB_EP2_OUTPUT_Get_Data            ;if the buffer is full?
            RET ;---get the data packet
USB_EP2_OUTPUT_Get_Data:
            MOV     A,#READ_BUFFER                     ;F0H, read out the content from fifo
            LCALL   Outportb_Cmd
            LCALL   Inportb_Data                       ;reserved byte
            LCALL   Inportb_Data                       ;number of data bytes MOV     USB_Data_Len,A
            JZ      USB_EP2_OUTPUT_End SETB    HOST_CHAR_F                        ;get a character
            MOV     USB_DATA_Cnt,#0
;----
            MOV     RW_COUNTER,A
            LCALL   Receive_N_Bytes_D12

CLR     A
            MOV     @USB_Rel_R0,A                      ;clear the last byte in USB buffer
;---
USB_EP2_OUTPUT_End:
            MOV     A,#CLEAR_BUF                       ;F2H, release fifo
            LCALL   Outportb_Cmd
            RET
;================================================================================
;USB_EP2_PREV_OUTPUT:
;Output: (HOST_CHAR_F)=1: USB data available
;        (USB_Data_Len)=the length of data in USB buffer
;================================================================================
USB_EP2_PREV_OUTPUT:
            MOV     A,#SEL_EPT_EP4_OUT                 ;004H
            LCALL   Outportb_Cmd
            LCALL   Inportb_Data
            ANL     A,#00000001B
            JZ      USB_EP2_PREV_End2                  ;if the buffer is full?

MOV     A,#READ_BUFFER                     ;F0H, read out the content from fifo
            LCALL   Outportb_Cmd
            LCALL   Inportb_Data                       ;reserved byte
            LCALL   Inportb_Data                       ;number of data bytes MOV     USB_Data_Len,A
            JZ      USB_EP2_PREV_End1

SETB    HOST_CHAR_F                        ;get a character
            MOV     USB_DATA_Cnt,#0
```

```
        ;---
                MOV     RW_COUNTER,A
                LCALL   Receive_N_Bytes_D12

CLR     A
                MOV     @USB_Rel_R0,A                   ;clear the last byte in USB buffer
        ;---
        USB_EP2_PREV_End1:
                MOV     A,#CLEAR_BUF                    ;F2H, release fifo
                LCALL   Outportb_Cmd USB_EP2_PREV_End2:
                RET
        ;=============================================================================
        ;USB_EP2_INPUT: EP#2 IN(Endpoint5)
        ;       send a data string to host USB port when (USB_EP1_DATA_RDY)=1(Bulk Pipe)
        ;Input: (USB_EP1_DATA_RDY)=1: ASCII code data is OK.
        ;=============================================================================
        USB_EP2_INPUT:
                JB      USB_EP2_DATA_RDY,EP2_INT_Proc
        USB_EP2_INPUT_RET:                              ;ASCII data is not ready yet.
                RET
        ;---
        EP2_INT_Proc:
                MOV     A,#READ_LAST_EP5_IN_ST ;045H
                LCALL   Outportb_Cmd
                LCALL   Inportb_Data
        ;-----
                MOV     A,#SEL_EPT_EP5_IN               ;005H
                LCALL   Outportb_Cmd
                LCALL   Inportb_Data
                ANL     A,#00000001B                    ;IS BUFFER EMPTY?
                JNZ     USB_EP2_INPUT_RET               ;not empty, return
        ;-----
                mov     USB_Rel_R0,#USB_Packet_Buffer   ;fill 10 byte data
                mov     USB_Gene_Cnt,#10                ;all zero
        EP2_DATA_FILL:
                inc     USB_Rel_R0
                mov     @USB_Rel_R0,#0
                djnz    USB_Gene_Cnt,EP2_DATA_FILL
        ;-----
                MOV     USB_Packet_Buffer+1,#01         ;length of data
                MOV     USB_Packet_Buffer+2,#31H;1 character MOV     RW_COUNTER,#010                 ;TOTAL BYTES TO SEND = data length + 2
                LJMP    USB_WRITE_EP_DATA               ;send a data packet to host
        ;=============================================================================
        ;USB_WRITE_EP_DATA: Send a string of data to HOST
        ;Input: (RW_COUNTER)=total number of bytes, (USB_Packet_Buffer)=data
        ;Output: none
        ;Used: A, USB_Rel_R0(bank1), BYTE_CNT
        ;=============================================================================
        USB_WRITE_EP_DATA:
                SETB    d12_ADDR                        ;select command address
                MOV     P1,#WRITE_BUFFER                ;F0H, Cmd
                CLR     d12_WR
                NOP
                SETB    d12_WR
                MOV     BYTE_CNT,RW_COUNTER
                CLR     d12_ADDR                        ;select data address
                MOV     USB_Rel_R0,#USB_Packet_Buffer   ;SET FIRST RECEIVE DATA BUFFER ADDRESS
        ;---
        USB_WRITE_DATA_LOOP:
        ;-----
                MOV     A,@USB_Rel_R0                   ;GET DATA BYTE FROM BUFFER.
                MOV     P1,A                            ;SEND NEXT DATA BYTE.
                CLR     d12_WR
                NOP
                SETB    d12_WR
                INC     USB_Rel_R0                      ;ADVANCE BUFFER POINTER.
                DJNZ    BYTE_CNT,USB_WRITE_DATA_LOOP    ;ALL BYTES SENT?
                RET
        ;=============================================================================
```

What is claimed is:

1. A method of providing power to a customer pole display comprising:
   translating a power signal input from a Universal Serial Bus to a display power signal, the display power signal providing power to a point-of-sale display, the translating being performed by a DC-DC converter;
   disabling the DC-DC converter by a processing device before enumeration to disconnect power from the point-of-sale display before enumeration;
   enabling the DC-DC converter by the processing device following enumeration, thereby limiting the point-of-sale display to 100 mA before enumeration and limiting the point-of-sale display to 500 mA after enumeration, thereby conserving power and remaining within a maximum power guideline provided for in a Universal Serial Bus specification;
   coupling the processing device, DC-DC converter, and a Universal Serial Bus interface to the Universal Serial Bus directly through a first connector; and
   coupling the point-of-sale display to the processing device, DC-DC converter, and Universal Serial Bus interface directly through a second connector, thereby providing an in-line Universal Serial Bus interface adapter comprising the processing device, DC-DC converter, and the Universal Serial Bus interface.

2. The method of providing power to a customer pole display as defined by claim 1, wherein the display power signal comprises substantially 40VDC.

3. The method of providing power to a customer pole display as defined by claim 1, wherein the display power signal comprises substantially 4.7VAC.

4. The method of providing power to a customer pole display as defined by claim 1, wherein the power signal input from the Universal Serial Bus comprises at least one of 5VDC, 12VDC, and 24VDC.

5. The method of providing power to a customer pole display as defined by claim 1, further comprising selectively enabling the converter in accordance with power specifications defined in a Universal Serial Bus specification.

6. An in-line Universal Serial Bus-compatible interface adapter to provide power to a customer pole display comprising:
   a processing device;
   a DC-DC converter coupled to the processing device, the DC-DC converter translating a power signal input from a Universal Serial Bus to a display power signal, the display power signal providing power to a point-of-sale display, the DC-DC converter being disabled before enumeration, the DC-DC converter being enabled following enumeration, thereby limiting the point-of-sale display to 100 mA before enumeration and limiting the point-of-sale display to 500 mA after enumeration, thereby conserving power and remaining within a maximum power guideline provided for in a Universal Serial Bus specification;
   a first connector directly coupling the processing device, DC-DC converter, and Universal Serial Bus interface to the Universal Serial Bus; and
   a second connector directly coupling the processing device, DC-DC converter, and Universal Serial Bus interface to the point-of-sale display, thereby providing an in-line Universal Serial Bus interface adapter comprising the processing device, DC-DC converter, and the Universal Serial Bus interface.

7. The in-line Universal Serial Bus-compatible interface adapted to provide power to a customer pole display as defined by claim 6, wherein the display power signal comprises substantially 40VDC.

8. The in-line Universal Serial Bus-compatible interface adapted to provide power to a customer pole display as defined by claim 6, wherein the display power signal comprises substantially 4.7VAC.

9. The in-line Universal Serial Bus-compatible interface adapted to provide power to a customer pole display as defined by claim 6, wherein the power signal input from the Universal Serial Bus comprises at least one of substantially 5VDC, 12VDC, and 24VDC.

10. The in-line Universal Serial Bus-compatible interface adapted to provide power to a customer pole display as defined by claim 6, further comprising a controller, the controller selectively enabling the converter in accordance with power specifications defined in the Universal Serial Bus specification.

11. The in-line Universal Serial Bus-compatible interface adapted to provide power to a customer pole display as defined by claim 10, wherein the controller further comprises at least one of a microprocessor, application specific integrated circuit (ASIC), programmable logic device, programmable logic array, discrete component, and integrated circuit.

12. The in-line Universal Serial Bus-compatible interface adapted to provide power to a customer pole display as defined by claim 6, further comprising a Universal Serial Bus interface, the Universal Serial Bus interface being operatively connected to the processing device and adapted to provide an electrical interface between the Universal Serial Bus and the processing device.

13. A customer pole display assembly comprising:
    a display;
    a processing device;
    a DC-DC converter operatively coupled to the processing device, the DC-DC converter translating a power signal input from a Universal Serial Bus to a display power signal, the display power signal providing power to the display, the DC-DC converter being disabled before enumeration, the DC-DC converter being enabled following enumeration, thereby limiting the point-of-sale display to 100 mA before enumeration and limiting the point-of-sale display to 500 mA after enumeration, thereby conserving power and remaining within a maximum power guideline provided for in a Universal Serial Bus specification;
    a first connector directly coupling the processing device, DC-DC converter, and Universal Serial Bus interface to the Universal Serial Bus; and
    a second connector directly coupling the processing device, DC-DC converter, and Universal Serial Bus interface to the display, thereby providing an in-line USB interface adapter comprising the processing device, DC-DC converter, and the Universal Serial Bus interface.

14. The customer pole display assembly as defined by claim 13, wherein the processing device selectively enables the converter in accordance with power specifications defined in the Universal Serial Bus specification.

15. The customer pole display assembly as defined by claim 13, further comprising a Universal Serial Bus interface, the Universal Serial Bus interface being operatively connected to the processing device and adapted to provide an electrical interface between the Universal Serial Bus and the controller.

* * * * *